United States Patent
Nobukuni et al.

(10) Patent No.: US 7,408,852 B2
(45) Date of Patent: Aug. 5, 2008

(54) REWRITABLE OPTICAL RECORDING MEDIUM, RECORDING METHOD ON THE SAME, AND OPTICAL DISC RECORDING/RETRIEVING APPARATUS

(75) Inventors: Natsuko Nobukuni, Kanagawa (JP); Takashi Ohno, Kanagawa (JP); Masae Kubo, Kanagawa (JP); Michikazu Horie, Kanagawa (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 49 days.

(21) Appl. No.: 11/698,530

(22) Filed: Jan. 26, 2007

(65) Prior Publication Data

US 2007/0177477 A1    Aug. 2, 2007

Related U.S. Application Data

(62) Division of application No. 10/866,216, filed on Jun. 10, 2004, now Pat. No. 7,333,414, which is a division of application No. 10/756,871, filed on Jan. 13, 2004, now Pat. No. 7,027,371, which is a division of application No. 09/573,319, filed on May 18, 2000.

(30) Foreign Application Priority Data

| May 19, 1999 | (JP) | ................................. | 11-138066 |
| Sep. 19, 1999 | (JP) | ................................. | 11-263595 |
| Dec. 19, 1999 | (JP) | ................................. | 11-350676 |

(51) Int. Cl.
*G11B 5/09* (2006.01)

(52) U.S. Cl. ............... 369/47.19; 369/47.51; 369/59.11

(58) Field of Classification Search ............... 369/47.19, 369/47.51, 59.11; *G11B 5/09, 7/00*
See application file for complete search history.

(56) References Cited

U.S. PATENT DOCUMENTS 673,377 A    5/1901    Eguchi et al.

(Continued)

FOREIGN PATENT DOCUMENTS

EP    0 294 489    12/1988

(Continued)

OTHER PUBLICATIONS

"CD-ROM Professional" published in the United States, Sep. 1996, Hugh Bennett, pp. 29-44.

(Continued)

*Primary Examiner*—Aristotelis M Psitos
(74) *Attorney, Agent, or Firm*—Katten Muchin Rosenman LLP

(57) ABSTRACT

In a rewritable compact disc having a wobble groove on a substrate, crystal and amorphous states of a phase-change recording layer are an unrecorded/erased state and a recorded state, respectively. When the recording layer is exposed to recording light, amorphous marks assuming the recorded state are formed. At any of 2-, 4- and 8-times velocities with respect to a reference velocity (1-times velocity) whose linear velocity is 1.2-1.4 m/s, modulation $m_{11}$ of a recorded signal when the recording light of approximately 780 nm in wavelength irradiates the recording layer via an optical system with NA=0.5 or 0.55 is 60-80%. A topmost level $R_{top}$ of reflectivity of the eye pattern of the recorded signal during retrieving at the 1-times velocity is 15-25%, and a jitter of the individual length of marks and inter-mark spaces during retrieving at 1-times velocity is 35 ns or less. Recording at 8-times or higher velocities is thereby realized without any risk of impairing the read-compatibility with the conventional CD-RW specifications at least at 4-times velocity.

11 Claims, 32 Drawing Sheets

U.S. PATENT DOCUMENTS

| | | | |
|---|---|---|---|
| 4,763,053 A | 8/1988 | Rabe | |
| 4,984,227 A | 1/1991 | Yoshimaru | |
| 5,221,588 A | 6/1993 | Morimoto et al. | |
| 5,234,737 A | 8/1993 | Ueno et al. | |
| 5,254,382 A | 10/1993 | Ueno et al. | |
| 5,463,604 A | 10/1995 | Naito | |
| 5,608,710 A | 3/1997 | Minemura et al. | |
| 5,709,978 A | 1/1998 | Hirotsune et al. | |
| 5,761,179 A | 6/1998 | Iwasaki et al. | |
| 5,789,055 A | 8/1998 | Yoon | |
| 5,818,808 A | 10/1998 | Takada et al. | |
| 5,848,043 A | 12/1998 | Takada et al. | |
| 5,862,123 A | 1/1999 | Horie et al. | |
| 5,946,279 A | 8/1999 | Okada et al. | |
| 6,004,646 A | 12/1999 | Ohno et al. | |
| 6,088,311 A | 7/2000 | Katoh | |
| 6,108,295 A | 8/2000 | Ohno et al. | |
| 6,115,352 A | 9/2000 | Ohno et al. | |
| 6,115,353 A | 9/2000 | Horie et al. | |
| 6,143,468 A | 11/2000 | Ohno et al. | |
| 6,177,166 B1 | 1/2001 | Ohno et al. | |
| 6,181,655 B1 | 1/2001 | Gushima | |
| 6,231,945 B1 | 5/2001 | Miyamoto et al. | |
| 6,246,649 B1 | 6/2001 | Ohta et al. | |
| 6,256,282 B1 | 7/2001 | Yamagami et al. | |
| 6,268,034 B1 | 7/2001 | Kitaura et al. | |
| 6,280,810 B1 | 8/2001 | Nakamura et al. | |
| 6,292,458 B1 | 9/2001 | Eguchi et al. | |
| 6,294,310 B1 | 9/2001 | Ohno et al. | |
| 6,388,978 B1 | 5/2002 | Ogawa et al. | |
| 6,426,929 B1 | 7/2002 | Watabe et al. | |

FOREIGN PATENT DOCUMENTS

| | | |
|---|---|---|
| EP | 0 797 193 | 12/1988 |
| EP | 0 834 874 A2 | 4/1998 |
| EP | 1 054 393 | 11/2000 |
| JP | 62-62474 | 3/1987 |
| JP | 62-209701 | 9/1987 |
| JP | 01014083 | 1/1989 |
| JP | 01063195 | 3/1989 |
| JP | 01303643 | 12/1989 |
| JP | 04028587 | 1/1992 |
| JP | 04212735 | 8/1992 |
| JP | 05016528 | 1/1993 |
| JP | 05062193 | 3/1993 |
| JP | 5-229259 | 9/1993 |
| JP | 6-12674 | 1/1994 |
| JP | 9-138947 | 5/1997 |
| JP | 9-282661 | 10/1997 |
| JP | 9293269 | 11/1997 |
| JP | 10112028 | 4/1998 |
| JP | 10-172179 | 6/1998 |
| JP | 10326436 | 12/1998 |
| JP | 11-115313 | 4/1999 |
| JP | 11-504462 | 4/1999 |
| JP | 11-144310 | 5/1999 |
| JP | 2000-137928 | 5/2000 |
| JP | 2000-233576 | 8/2000 |
| JP | 2001-126252 | 5/2001 |
| JP | 2002-197804 | 7/2002 |
| WO | 97/30444 | 8/1997 |

OTHER PUBLICATIONS

Y. Kageyama. et al. of R&D Center "CD-Erasable (CD-E) with Ag—In—Sb—Te Phase Change Recording Material" R&D Group, Ricoh Co. Ltd. (Assembly of Manuscripts for Phase-Change Optical Recording Symposium, Nov. 30-Dec. 1, 1995, pp. 41-45).
European Search Report dated Feb. 16, 2006.
Partial European Search Report dated May 10, 2006.
Notification of Reasons for Rejection mailed Feb. 14, 2006.
Decision of Rejection mailed Aug. 16, 2006.
Appeal Decision mailed Jun. 13, 2006.
European Search Report dated Aug. 10, 2006.
OSTA "Universal Disk Format TM Specification, Revision 1.50", Feb. 4, 1997, OSTA, XP002386923.
Notice of Rejection mailed Jun. 26, 2007, from the corresponding Japanese Application.
Notification of Reason(s) for Refusal mailed Apr. 3, 2007, from the corresponding Japanese Application.

FIG. 1(b) WHEN m=n-1
FIG. 1(c) WHEN m=n-2

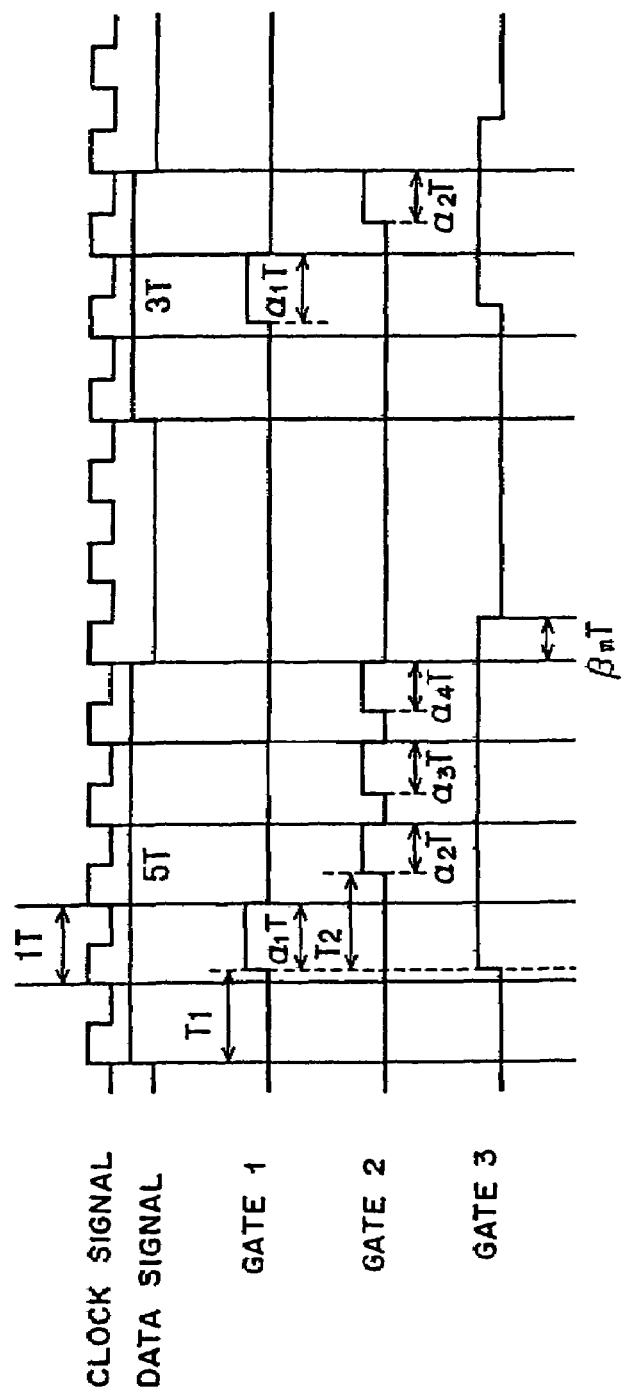

3T MARK JITTER

3T SPACE JITTER $In_8Ge_5Sb_{66.4}Te_{20.6}$ $In_8Ge_5Sb_{65.6}Te_{21.4}$ $In_8Ge_5Sb_{64.7}Te_{22.3}$

NA = 0.5

NA = 0.55

4-TIMES VELOCITY

10-TIMES VELOCITY

4-TIMES VELOCITY

10-TIMES VELOCITY

4-TIMES VELOCITY

8-TIMES VELOCITY

10-TIMES VELOCITY

4-TIMES VELOCITY

8-TIMES VELOCITY

10-TIMES VELOCITY

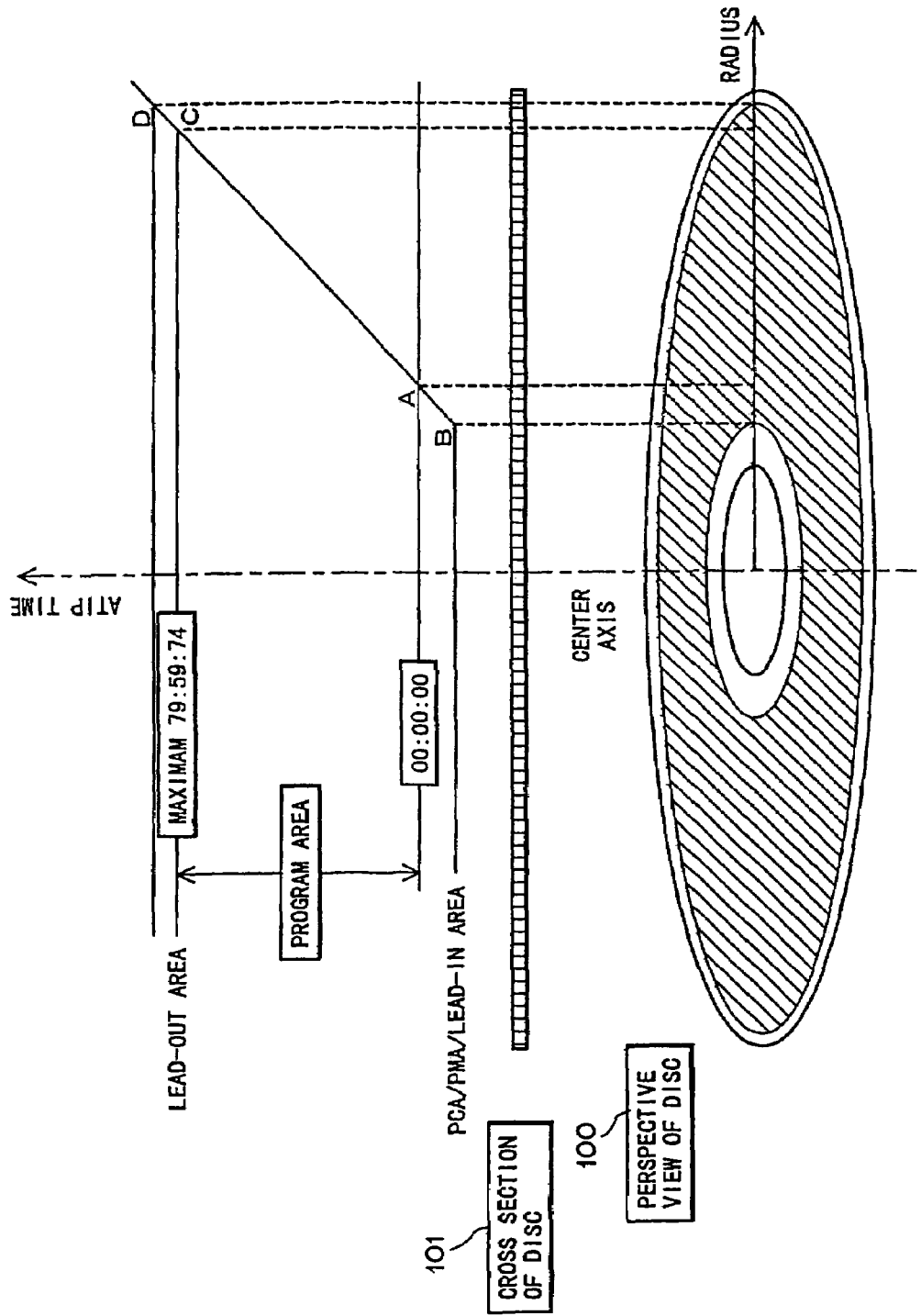

REWRITABLE OPTICAL RECORDING MEDIUM, RECORDING METHOD ON THE SAME, AND OPTICAL DISC RECORDING/RETRIEVING APPARATUS

CROSS-REFERENCE TO RELATED APPLICATIONS

This application is a divisional of U.S. application Ser. No. 10/866,216, filed Jun. 10, 2004, now U.S. Pat. No. 7,333,414, which is a divisional of U.S. application Ser. No. 10/756,871 filed Jan. 13, 2004, now U.S. Pat. No. 7,027,371, which is a divisional of U.S. application Ser. No. 09/573,319 filed May 18, 2000, now pending, and which claims priority from Japanese Patent Application Numbers HEI 11-138066 filed May 19, 1999, HEI 11-263595 filed Sep. 17, 1999 and HEI 11-350676 filed Dec. 9, 1999, the contents of which are herein incorporated by reference.

BACKGROUND OF THE INVENTION

1. Field of the Invention

The present invention relates to a rewritable phase-change medium read-compatible with a compact disc, a recording method and a recording/retrieving apparatus for the medium. More particularly the invention concerns an improvement of overwriting performance at the 4-times or higher velocity.

2. Description of the Related Art

Generally compact discs (CD) are mediums to and from which a binary signal is recorded and a tracking signal is detected utilizing modulation of reflectivity resulting from interference of reflected light from the bottoms of phase-depth modulated pits and the mirror surface.

Recently, as a medium read-compatible with CD, a rewritable compact disc (CD-RW, CD-Rewritable) of phase-change type has been used ("CD-ROM Professional" published in the United States, September 1996, pp. 29-44 or Assembly of Manuscripts for Phase-Change Optical Recording Symposium, 1995, pp. 41-45).

The phase-change CD-RW detects a recorded information signal utilizing the change in reflectivity due to the refractivity difference between the crystal and amorphous states. The usual phase-change medium has a multi-layer structure including a lower protective layer, a phase-change recording layer, an upper protective layer and a reflective layer, which are disposed on a substrate one over another; utilizing multiple interference of these layers, the reflectivity difference and the phase difference are controlled to give a read-compatibility with CD. In CD-RW, the term "recording" means overwriting that is to erase existing data by writing new data, namely, to erase and record at the same time.

To this end, although the read-compatibility with CD inclusive of as high a reflectivity as 70% or more is difficult to achieve, the read-compatibility with CD can be secured in respect of the recorded signal and groove signal as long as the requirement for the reflectivity is allowed to be above 15% and below 25%. If an amplifier system for covering lowness of the reflectivity is added to a retrieving system, it is possible to realize retrieving by the current CD drive.

One of the common problems with CD-RW is slowness of the recording speed and data transfer rate.

The reference velocity (hereinafter also called the 1-times velocity) during recording/retrieving of CD is a linear velocity of from 1.2 to 1.4 m/s. For CD-ROM, high-speed retrieving of roughly 40-times velocity at maximum has already been realized; low-speed retrieving of 1-times velocity is limited to retrieving of music and image. Generally, for up to 16-times velocity, retrieving is made in a constant linear velocity (CLV) mode, which is the original mode of CD, and for 24- to 40-times velocities, retrieving is made in a constant angular velocity (CAV) mode to make a remarkable increase in data transfer rate and user data area and decrease seek time on the outer periphery of the recording area.

Attempts have been made to increase the recording speed in CD-RW. To this end, recording in CLV mode has become possible at only 1- through 4-times velocities. Usually, with CD-RW, it takes 74 minutes (or 63 minutes) to make recording throughout the entire recording area at the 1-times velocity, and it still takes 20 minutes to do so even at the 4-times velocity. But it takes only 10 minutes or less to record at the 8-times velocity or more, widening applications of CD-RW to recording of bulk data such as music and video.

External storage devices of the current computers are chiefly in the form of magneto-optical recording mediums (MO) whose data transfer rate is fast; if the data transfer rate of CD-RW could be increased, it is likely that such usage would be extended.

Consequently a phase-change medium with which faster recording is possible and a recording method for the medium have been cherished.

However, such CD-RW enabling recording at higher linear velocities has not yet been realized. It has been technically difficult to realize a medium that enables overwriting through a wide linear velocity range, whose low speed end is 1- and 2-times velocities and high speed end is 8- to 10-times velocities, without any risk of impairing the read-compatibility with existing CD-RW recording system overwritable at between 1- and 4-times velocity. This is true because the current medium and the recording method respectively encounter the following two problems:

The first problem is that it is difficult to resolve a trade-off in short-time erasure requirement by high-speed crystallization of amorphous marks and archival stability requirement of amorphous marks.

For example, AgInSbTe popular as material of the recording layer of CD-RW for recording at 1- through 4-times velocities could allow high-speed crystallization and hence 8-times-velocity recording if the content of Sb is relatively increased.

But according to studies of the present inventors, simply increasing the content of Sb would seriously impair the archival stability of amorphous marks so that the amorphous marks would disappear so as to be no longer retrievable within 1 or 2 years in room temperature and otherwise within several days in a high-temperature environment of 50-80° C. inside the recording apparatus. More serious, it turned out that amorphous marks would begin to disappear when retrieving has been repeated hundreds to thousands times by irradiation with laser beam with the power below 1 mW so that reliability for a recording medium could not be guaranteed.

Additionally, CD-RW has to be read-compatible in retrieving with the widely popular retrieving-dedicated CD-ROM drive. For example, for read-compatibility, it would be essential to satisfy high modulation in a range of 55-70% and reflectivity in a range of 15-25% as well as other servo signal characteristics.

The second problem is that according to CD-RW specifications, fairly strict recording pulse strategies (divided pulse method) are standardized. For example, recording at a wide range of linear velocities, from 4-times velocity to 8- through 10-times velocities must be carried out by the recording pulse strategy of FIG. 4, or a modified pulse strategy which is an analogy and does not require a considerable reconstruction of the current recording pulse strategy generation IC circuit, according to CD-RW specifications as normalized by Orange Book Part 3, Version 2.0.

In FIG. 1, (a) depicts the data signal having EFM-modulated time lengths of 3T through 11T, and (b) depicts the laser power of actual recording light generated based on the data signal. Pw is the recording power for forming amorphous marks by melting and then rapidly cooling the recording layer, and Pe is the erasure power for erasing by crystallizing amorphous marks. Usually, the bias power Pb is substantially the same as the retrieving power Pr of retrieving light.

When mark-length-modulated information is recorded on a phase-change medium in terms of different mark lengths, the ratio of the maximum to the minimum of the linear velocities in use is limited to nearly 2 times when the recording pulse strategy is strictly fixed.

Since many of the current CD-RW writers recordable at 4-times velocity can generate only a fixed waveform in accordance with the recording pulse strategy defined in the above-mentioned specifications, it was very difficult to realize high-speed recording at least at 8- through 10-times velocities without any risk of impairing the read-compatibility with these existing writers.

SUMMARY OF THE INVENTION

With the foregoing problems in view, it is a first object of the present invention to provide a rewritable medium having a read-compatibility with CD with respect to the recorded signal format by recording the mark lengths of amorphous marks by EFM modulation, namely, by combining mark lengths and inter-mark lengths of 3T through 11T with the data reference clock period T, and also a recording method for the medium.

Another object of the present invention to provide a rewritable compact disc which enables high-speed recording at 8-times or higher velocity with retaining the most feasible read-compatibility with the conventional CD-RW specifications for at least 4-times velocity, and also a recording method for the medium.

Here the "most feasible" read-compatibility means the ability such as to cope with recording at least 4-times velocity only by changing firmware rather than changing hardware.

According to a first aspect of the present invention, there is provided a rewritable optical recording medium comprising a substrate having a wobble groove, and a phase-change recording layer, wherein a crystal state of the recording layer is an unrecorded or erased state and an amorphous state of the recording layer is a recorded state, and amorphous marks corresponding to the recorded state are formed by recording light after an EFM-modulated signal is recorded by an overwriting operation ten times in the recording layer at the 8-times velocity V as high as eight times of a reference velocity (1-times velocity) $V_1$, which is a linear velocity of 1.2 m/s, with a data reference clock period T retained so as to satisfy $VT=V_1T_1$ (where $T_1$ is 231 ns) under one selected from various conditions of the following recording method 1:

a modulation $m_{11}$ of an eye pattern of the recorded signal obtained as retrieved at the 1-times velocity is 60-80%, a topmost level $R_{top}$ of reflectivity of the eye pattern of the recorded signal obtained as retrieved at the 1-times velocity is 15-25%, and a jitter of the individual length of marks and inter-marks obtained as retrieved at the 1-times velocity are equal to or less than 35 ns.

According to a second aspect of the present invention, a rewritable optical recording medium comprising a substrate having a wobble groove, and a phase-change recording layer, wherein a crystal state of the recording layer is an unrecorded or erased state and an amorphous state of the recording layer is a recorded state, and amorphous marks corresponding to the recorded state are formed by recording light after an EFM-modulated signal is recorded by an overwriting operation ten times in the recording layer at a 10-times velocity V as high as 10 times of a reference velocity (1-times velocity) $V_1$, which is a linear velocity of 1.2 m/s, with a data reference clock period T retained so as to satisfy $VT=V_1T_1$ (where $T_1$ is 231 ns) under one selected from various conditions of the following recording method 1', a modulation $m_{11}$ of an eye pattern of the recorded signal obtained as retrieved at the 1-times velocity is 60-80%, a topmost level $R_{top}$ of reflectivity of the eye pattern of the recorded signal obtained as retrieved at the 1-times velocity is 15-25%, and a jitter of the individual length of amorphous marks and inter-marks obtained as retrieved at the 1-times velocity are equal to or less than 35 ns.

The recording method 1' is carried out by exposing the recording layer to recording light of a 780 nm wavelength via an optical system whose numerical aperture (NA) is 0.55 or 0.5, with the time length of the individual amorphous mark being nT (n is an integer within a range of from 3 to 11), in the following manner:

during that time, erasure power Pe, which is able to crystallize the individual amorphous-state portions, irradiates inter-mark portions between the individual recorded marks, for the recorded marks, the time length (n−j)T is divided into $\alpha_1T, \beta_1T, \alpha_2T, \beta_2T, \ldots, \alpha_mT, \beta_mT$ (where m=n−1, $\alpha_1=1.0, \alpha_i=0.5$ (i is an integer within a range of from 2 to m), $\beta_m$=from 0.25 to 0.75, $\alpha_i+\beta i-1=1.0$ (i is an integer within a range of from 2 to m)) in this sequence so as to satisfy $\Sigma_i(\alpha_i+\beta_i)=n-j$ (j is a real number within a range of from 0 to 2.0), within the time length $\alpha_iT$ (i is an integer within a range of from 1 to m), the recording light, whose record power Pw is enough to melt said recording layer, irradiates the recording layer (where Pw is 14 to 25 mW and Pe/Pw=0.5), and within the time length $\beta_iT$ (i is an integer within a range of from 1 to m), the recording light of bias power Pb of 0.8 mW irradiates the recording layer.

According to a third aspect of the present invention, there is provided a method of recording EFM-modulated information in terms of different mark lengths on a rewritable disc-shaped optical recording medium having a phase-change recording layer by CLV (constant linear velocity) operation, said method being carried out in the following manner:

when an individual recorded mark has a time length nT (T is the data reference clock period, and n is an integer within a range of from 3 to 11), recording light of erasure power Pe, which is able to crystallize an amorphous-state portion, irradiates inter-mark portions, for the recorded marks, the time length (n−j)T is divided into $\alpha_1T, \beta_1T, \alpha_2T, \beta_2T, \ldots, \alpha_mT, \beta_mT$ (where m=n−1 or m=n−2) in this sequence so as to satisfy $\Sigma_i(\alpha_i+\beta_i)=n-j$ (j is a real number within a range of $0.0 \leq j \leq 2.0$), and the recording light of recording power Pw (Pw>Pe), which is able to melt the recording layer within the time length $\alpha_iT$ ($1 \leq i \leq m$), irradiates the recording layer, and the recording light of bias power Pb ($0<Pb \leq 0.5Pe$) within the time length $\beta_iT$ ($1 \leq i \leq m$) the recording layer to overwrite; and when a linear velocity within a range of 1.2 m/s to 1.4 m/s is the reference velocity (1-times velocity) and 231 nsec (ns) is a reference clock period, (1) for the 4-times velocity, $\alpha_1$=from 0.3 to 1.5, $\alpha_i$=from 0.2 to 0.7 (2≦i≦m), $\alpha_i+\beta_{i-1}$=from 1 to 1.5 (3≦i≦m), (2) for the 1- or the 2-times velocity, $\alpha_1$=from 0.05 to 1.0, $\alpha_i$=from 0.05 to 0.5 (2≦i≦m), $\alpha_i+\beta_{i-1}$=from 1 to 1.5 (3≦i≦m), and (3) for any of 6-, 8-, 10- and 12-times velocities, $\alpha_1$=from 0.3 to 2, $\alpha_i$=from 0.3 to 1 (2≦i≦m), $\alpha_i+\beta_{i-1}$=from 1 to 1.5 (3≦i≦m).

According to a fourth aspect of the present invention, there is provided a method of recording various mark and inter-mark lengths in terms of EFM-modulated information on a rewritable disc-shaped optical recording medium having a predetermined recording area by CAV (constant angular velocity) operation, in which the recording medium is rotated at a constant angular velocity, said method being carried out in the following manner:

when a linear velocity within a range of from 1.2 m/s to 1.4 m/s is a reference velocity (1-times velocity), the disc-shaped optical recording medium is rotated in a way that a linear velocity at an outermost periphery of the recording area is as high as 10 times of the reference velocity, if a time length of an individual recorded mark is nT (T is a data reference clock period varying according to its radial position in a way that a product VT (V is a linear velocity in the radial position) is constant, and n is an integer within a range of from 3 to 11), recording light of erasure power Pe, which is able to crystallize an amorphous-state portion, irradiates inter-mark portions, for the recorded marks, the time length (n−j)T is divided into $\alpha_1 T, \beta_1 T, \alpha_2 T, \beta_2 T, \ldots, \alpha_m T, \beta_m T$ (where m=n−1, $\alpha_1$=from 0.75 to 1.25, $\alpha_i$=from 0.25 to 0.75 (2≦i≦m), $\alpha_i+\beta_{i-1}$=from 1 to 1.5 (3≦i≦m)) in this sequence so as to satisfy $\Sigma_i(\alpha_i+\beta_i)$=n−j (j is a real number within a range of 0.0≦j≦2.0), within the time length $\alpha_i T$ (1≦i≦m), the recording light, whose record power Pw (Pw>Pe) is enough to melt said recording layer, irradiates the recording layer, and within the time length $\beta_i T$ (1≦i≦m), the recording light of bias power Pb (0<Pb≦0.5Pe) irradiates the recording layer, and each of $\alpha_i$ and $\alpha_i+\beta_{i-1}$ (i=from 3 to m) is constant for any radial position, and $\alpha_i$ (i=from 3 to m) is reduced monotonically for the radially inner position.

According to a fifth aspect of the present invention, there is provided a method of recording various mark and inter-mark lengths in terms of EFM-modulated information on a rewritable disc-shaped optical recording medium having a predetermined recording area by CAV (constant angular velocity) operation, in which the recording medium is rotated at a constant angular velocity, said method being carried out in the following manner:

when a linear velocity within a range of from 1.2 m/s to 1.4 m/s is a reference velocity (1-times velocity), the disc-shaped optical recording medium is rotated in a way that a linear velocity at an outermost periphery of the recording area is as high as 10 times of the reference velocity, if a time length of an individual recorded mark is nT (T is a data reference clock period varying according to its radial position in a way that a product VT (V is a linear velocity in the radial position is constant, and n is an integer within a range of from 3 to 11), recording light of erasure power Pe, which is able to crystallize an amorphous-state portion, irradiates inter-mark portions, for the recorded marks, the time length (n−j)T is divided into $\beta_1 T, \beta_1 T, \alpha_2 T, \beta_2 T, \ldots, \alpha_m T, \beta_m T$ (where m=n−1, $\alpha_i/\alpha_1$=from 0.3 to 0.7 (i is an integer within a range of from 2 to m), $\alpha_i+\beta_{i-1}$=approximately 1 (3≦i≦m)) in this sequence so as to satisfy $\Sigma_i(\alpha_i+\beta_i)$=n−j (j is a real number within a range of 0.0≦j≦2.0), within the time length $\alpha_i T$ (1≦i≦m), the recording light, whose record power Pw (Pw>Pe) is enough to melt said recording layer, irradiates the recording layer, and within the time length $\beta_i T$ (1≦i≦m), the recording light of bias power Pb (0<Pb≦0.5Pe) irradiates the recording layer, and each of $\alpha_i T$ (i=from 2 to m) and $\alpha_i+\beta_{i-1}$ (i=from 3 to m) is constant for any radial position.

According to a sixth aspect of the present invention, there is provided an optical disc recording/retrieving apparatus comprising:

a motor for rotating a disc, which has a spiral groove with wobble which carrier frequency is constant in space frequency and meandering according to a signal modulated with a constant carrier frequency $f_{L0}$ and address information and also has a recording layer, at a constant angular velocity with a center of the disc being an axis of rotation, the disc having address information identifying each recording data block, which is a unit of recording information located at a specified position in the spiral groove, and a synchronization pattern identifying a head position of the recording data block;

an optical pick-up for generating a focused laser beam irradiating the disc for recording/retrieving;

a linear motor for moving the optical pick-up radially of the disc to a given address;

a focus servo circuit for focusing the focused laser beam on the recording layer;

a groove tracking servo circuit for scanning the spiral groove by the focused laser beam;

a detector and decoder circuit for detecting and decoding a carrier frequency $f_{A0}$, address information and block synchronization signal from the meandering groove geometry;

a data-sequence generation circuit for generating a recording data sequence, which is modulated in terms of mark length modulation, in synchronism with a data reference clock T which has a frequency $f_{d0}$ and a start position of the recording block;

a laser-power modulation circuit for modulating a recording laser power in accordance with the recording data sequence;

a reference signal generator for generating a data reference clock T which varies in reverse proportion to a radius position when the focused laser beam is moved radially of the disc to a given address recording block; and a data-sequence synchronization circuit for synchronizing a data sequence, which is to be written in the given recording block, with the start position of the recording block by comparing in phase between a reference signal $f_{R0}$, which is obtained by dividing the data reference clock at a particular radius by N (N is an integer), and the carrier frequency $f_{A0}$, which is detected at the given address from the meandering groove geometry, and also making a fine adjustment of r.p.m. (revolutions per minute) of the disc so as to satisfy a relation $f_{d0} = N \cdot f_{A0}$.

According to a seventh aspect of the present invention, there is provided an optical disc recording/retrieving method wherein recording of data to an information area is made at a constant angular velocity, irrespective of the radial position where the recording takes place.

According to an eighth aspect of the present invention, there is provided an optical disc recording/retrieving method wherein recording and retrieving to and from an information area are made each at a constant angular velocity.

According to a ninth aspect of the present invention, there is provided an optical disc recording/retrieving medium wherein recording and retrieving to and from an information area are made at the same angular velocity.

According to a tenth aspect of the present invention, there is provided a recording/retrieving apparatus for performing recording and retrieving on a rewritable optical recording medium having an application area that includes an application program area occupying a continuous specified part of the application area and storing a predetermined application program, and a user data area which occupies the remaining portion of the application area and in which user data relating to at least the application program is adapted to be recorded, the application program and the user data being recorded in fixed-length packet units each having a common file management structure for both the application program and the user data, and retrieving of the application program and recording of the user data relating to the application program being made each at a constant angular velocity (CAV), the apparatus comprising:

program execution means for executing the application program content by having user data area to the specified part of the application program in the rewritable optical recording medium to retrieve the application program data with keeping the medium, which is in the form of a disc, in CAV rotation at a first predetermined angular velocity;

information input means for inputting necessary information according to the application program to be executed by the program executing means; and recording means for having user data area to the user data area with keeping the disc in CAV rotation at a second predetermined angular velocity and for recording in the user data area the necessary information, which is inputted by the information input means, as user data.

BRIEF DESCRIPTION OF THE DRAWINGS

FIGS. 5, (a) through (e), illustrates how to generate pulses according to a recording method of the present invention;

FIG. 25 is a diagram showing data arrangement along ATIP addresses;

DESCRIPTION OF THE PREFERRED EMBODIMENTS

1. Characteristics of Recording Medium

Figure 1A:
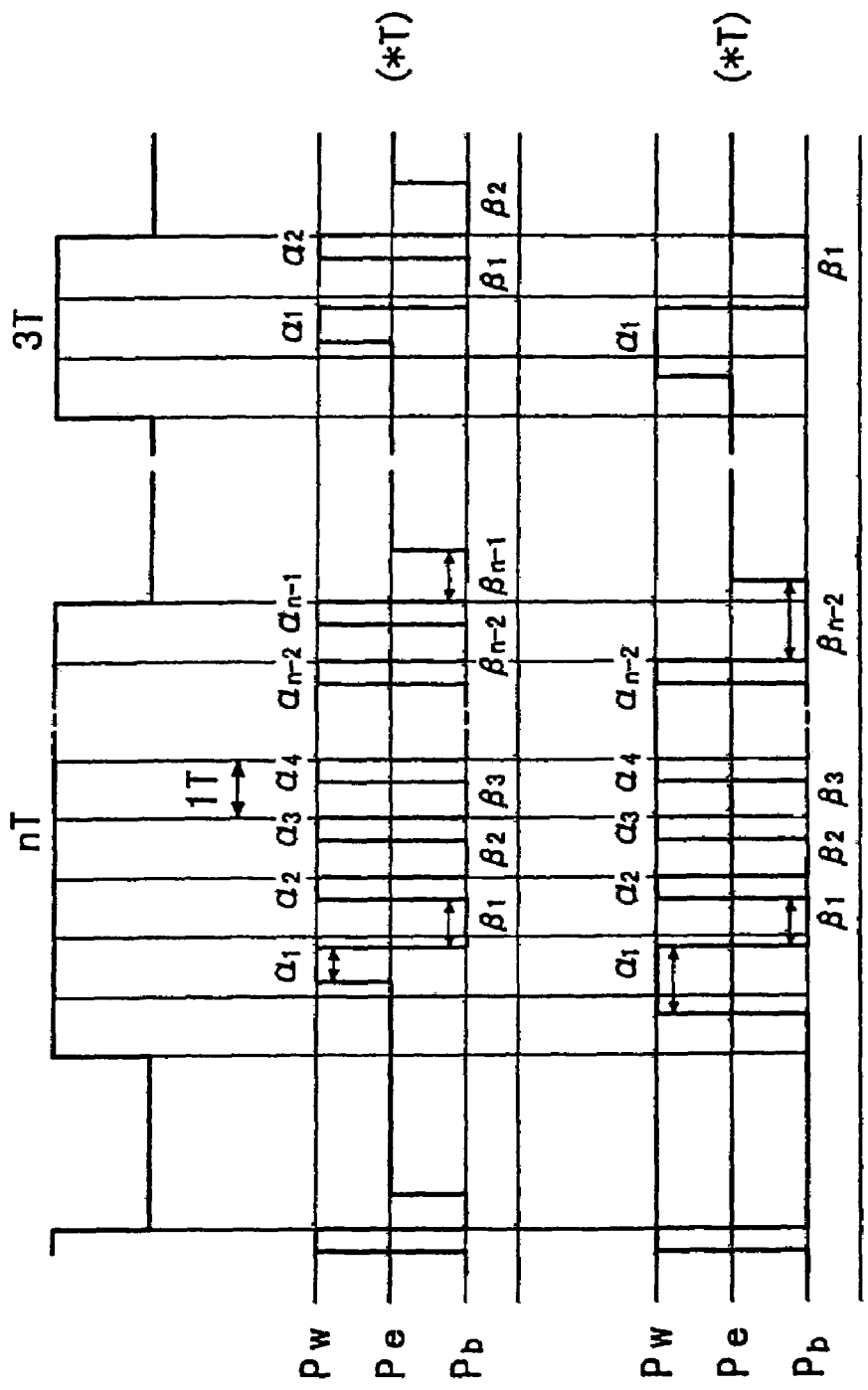
FIGS. 1, (a), (b) and (c), shows an illustrative method of dividing a pulse signal according to the present invention.

In the present invention, it is assumed that a linear velocity, which is a rate of movement of a spotlight of recording light in a given direction with respect to a recording medium, in a range of from 1.2 m/s to 1.4 m/s, preferably 1.2 m/s, is defined as a reference velocity, namely, a 1-times velocity.

First of all, a disc (hereinafter also called CD), which serves as a significant element in the first and second aspects of the present invention, will now be described.

A rewritable optical recording medium of the present invention is usually in the form of a disc called "compact disc" or "CD". In a phase-change recording layer of CD, crystalline portions assume an unrecorded/erased state and, in contrast, non-crystal or amorphous-state portion assume a recorded state. Object information to be recorded is in the form of a signal which is EFM modulated as amorphous marks are formed by exposing the phase-change recording layer to recording light such as laser light. A substrate of the recording medium has usually a spiral groove. Amorphous marks are formed usually in the groove; alternatively they may be formed in an inter-groove land. Usually the groove radially wobbles or meanders with a reference frequency whose carrier frequency is 22.05 kHz in terms of the frequency at the 1-times velocity; therefore this groove is called a wobble groove. With the wobble, the carrier frequency is modulated by ±1 kHz so that address information on the disc is incorporated as absolute time information in terms of this delicate frequency variation. Such absolute time information is called an ATIP (Absolute Time In Pre-groove) signal.

In production, the wobble groove is formed on a stamper as recorded at a velocity equivalent to the 1-times velocity of CD in CLV (Constant Linear Velocity) mode, whereupon a substrate is injection-molded based on the resultant stamper. Usually, 1-times velocity of 12 m/s (10.1 m/s margin is preferably chosen at which 22.05 kHz wobble carrier frequency is obtained because it results in the highest storage density in the range of 1.2 m/s-1.45 m/s.

For recording data, various mark and space portions (intermark portions) of different time lengths, each being as greater as a reference clock period T multiplied by a predetermined integer, are formed. In EFM modulation, usually marks and spaces each having a time length in a range of from 3T to 11T. It is customary to vary the data reference clock period T in inverse proportion to the linear velocity of the disc.

The inverse number of the reference clock period T is called a reference clock frequency; the reference clock frequency at the 1-times velocity (linear velocity in a range of from 1.2 m/s to 1.4 m/s) of CD is equivalent to 1 channel bit of data, usually 4.3218 MHz. This reference clock frequency is just 196 times of 22.05 kHz of reference frequency of the wobble.

The reference clock period T at the 1-times velocity is usually $1/(4.3218 \times 10^6) \approx 231 \times 10^{-9}$(second)=231(ns).

In the following description, the product VT of the reference clock period T and the linear velocity V is assumed to be constant unless otherwise mentioned.

Figure 2:
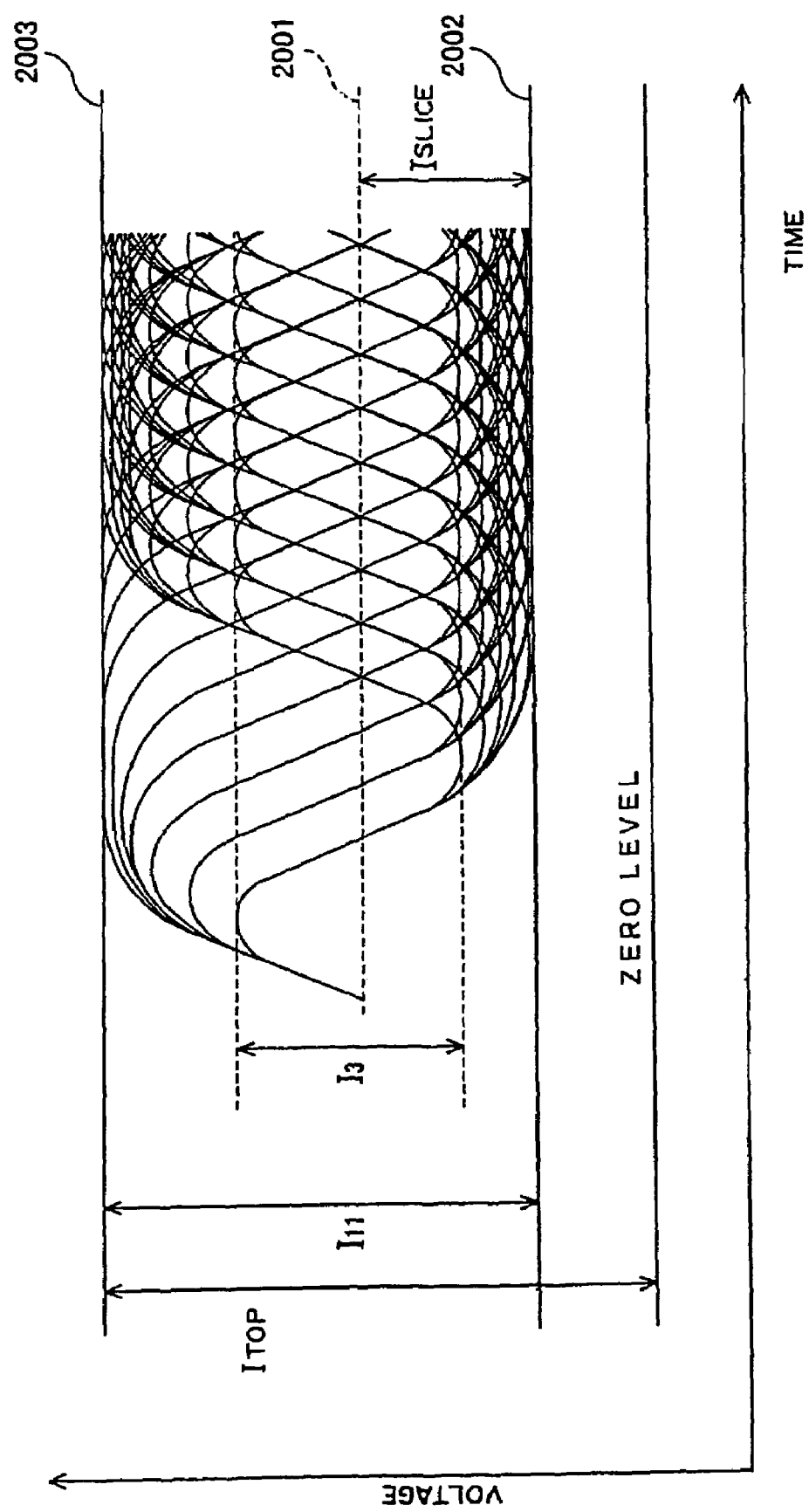
FIG. 2 is a graph showing a retrieving waveform (eye pattern) of an EFM-modulated signal.

FIG. 2 is a graph showing a retrieving waveform (eye pattern) of an EFM-modulated signal to be used in a CD family products such as CD-RW. The eye pattern includes substantially at random a retrieving waveform of amorphous marks and crystalline-state space portions for each of 3T through 11T. The retrieving waveform is a waveform of a voltage signal in terms of which the intensity of reflected light is taken and which is observed on an oscilloscope; the retrieved signal contains a d.c. component.

A maximum value $I_{top}$ of the eye pattern is an equivalent to a maximum value $R_{top}$ of reflectivity of the space portions in terms of the reflectivity with respect to incident light. Modulation $m_{11}$ of a recorded signal is normalized by the following formula (1) as an amplitude $I_{11}$ of the eye pattern (practically an amplitude of 11T mark) is determined in terms of $I_{top}$.

$$m_{11}=I_{11}/I_{top} \times 100 (\%) \qquad (1)$$

In the present invention, modulation $m_{11}$ is in a range of from 60% to 80%. Modulation, which depends on the optical resolvability, tends to be seen larger than real on an optical system whose numerical aperture (NA) is large. Consequently, in the present invention, modulation $m_{11}$ is that when laser light of approximately 780 nm in wavelength is irradiated through an optical system with NA=0.5 or 0.55 to make recording. But the wavelength should by no means be strictly 780 nm and may be in a range of from 775 to 795 nm.

Signal amplitude $I_{11}$ is preferred to be large; but if it were too large, the gain of a signal retrieving amplifier would have been saturated to an extremity. Therefore the upper limit of $m_{11}$ is 80%, preferably 78% and more preferably roughly 75%. On the other hand, if it were too small, signal-noise ratio (SN ratio) would be reduced; consequently, the lower limit of $m_{11}$ is 60%, preferably 62% and more preferably roughly 65%. Also $R_{top}$ is in a range of 15-25%, preferably 15-20% and more preferably 16-19%. In addition, although an asymmetry value $A_{sym}$ as defined by the following equation (2) is preferred to be roughly 0 as nearly as possible, it is usually in a range of ±10%.

$$A_{sym}=(I_{slice}/I_{11}-\frac{1}{2})(\%) \qquad (2)$$

where $I_{slice}$ is a difference in voltage between the center line 2001 of I and the bottom 2002 of an envelope in FIG. 2, and $I_{11}$ is a voltage value between the top 2003 and the bottom 2002 of the envelope.

The jitter and deviation of the individual mark length and space length of 3T-11T to be used in EFM modulation are a deviation and a standard deviation (jitter) of a predetermined mean value nT of the mark length or space length which are obtained by picking up an RF component from a retrieved signal using a high-pass filter and then DC slicing the RF component with the assumption that the zero level, which is to be a substantial core value of the signal amplitude, is a threshold. The detailed measuring method is described by Red Book on CD Specifications, Orange Book on CD-RW Specifications, and "CD Family" (published by Ohm Co., Ltd., a Japanese publishing corporation, on Apr. 25, 1996). In the present invention, a jitter value when retrieved at the 1-times velocity (data reference clock period of 231 ns) is 35 ns or less, preferably 30 ns or less and more preferably 25 ns or less.

Usually 3T mark or an inter-mark jitter is the worst value among 3T through 11T.

In the present invention, the deviation is usually in a range of ±40 ns or less for 3T, and in a range of ±60 ns or less for 11T. And for each of 4T through 10T, the deviation is a value as obtained by interpolating the values of ±40 ns or less and ±60 ns or more that are usually defined for 3T and 11T.

The quality of a recorded signal is preferable to basically meet the characteristics required under the currently effective specifications, and more particularly to meet the requirements described in Orange Book Part 3.

Given that the modulation $m_{11}$, the topmost level, $R_{top}$, of reflectivity of eye pattern and the jitter respectively have the above-mentioned values, it is possible to make recording at high speeds as high as the 8-times velocity, particularly higher than the 10-times velocity, without loss of read-compatibility with the current CD-RW specifications.

Preferably, after a tone signal composed of a 3T mark and a 3T inter-mark space portion is recorded at the 8-times velocity, the erase ratio, defined as the ratio of the 3T mark carrier level before and after a tone signal composed of an 11T mark and an 11T inter-mark space portion is overwritten, is 25 dB or more, especially 27 dB or more. More preferably, the erasure ratio for the 10-times velocity and particularly 12-times velocity also is 25 dB or more. The greater the erasure ratio at high velocity, the crystallization speed of a recording medium during the amorphous mark erasing will become faster; therefore it is possible to overwrite an EFM-modulated signal at increased velocities. For example, assuming that the erasure ratio for the 12-times velocity is 25 dB or more, a good characteristic can be achieved not only when the recording medium is used at the 2-times velocity but also when it is used at the 10-times velocity.

As long as the upper limit of range of the linear velocities at which overwriting is made, is enough high, the erasure ratio would not be insufficient than usual for low linear velocities.

Because the time in which the recording layer is exposed to a light beam of a wavelength λ, which beam is focused by an objective lens having a numerical aperture NA and moving at a linear velocity V, is normalized by $\lambda/(NA \cdot V)$, the irradiation time would be longer for the lower linear velocity so that an adequate time needed for recrystallization can be secured.

Assuming that the time till the jitter of a pre-recorded signal reaches 35 ns in retrieving at the 1-times velocity is the archival life of the recording medium, it is preferable that such archival life of the pre-recorded is 500 hours or longer under an environment of 80° C. in temperature and 85% in humidity.

In the present invention, it is also preferable that the modulation $m_{11}$ should remain 90%, particularly 95% or more, even after the lapse of 500 hours under an acceleration test environment of 80° C. in temperature and 85% in humidity.

In the present invention, modulation $m_{11}$, $R_{top}$, jitter, deviation and erasure ratio for a linear velocity V (where V is the 8-times, 10-times or 12-times velocity) are given from a recorded signal that is obtained by retrieving at the 1-times velocity after an EFM-modulated signal is recorded by an overwriting operation ten times under one selected from various conditions of the following recording method 1 with a data reference clock period T, for a linear velocity, retained so as to satisfy $VT=V_1T_1$ (where $T_1$ is 231 ns) if the linear velocity of 1.2 m/s is assumed as a reference velocity (1-times velocity) $V_1$.

Recording Method 1:

The recording layer is exposed to recording light of a 780 nm wavelength via an optical system whose numerical aperture (NA) is 0.55 or 0.5, with the time length of the individual amorphous mark being nT (n is an integer within a range of from 3 through 11).

During that time, erasure power Pe, which is able to crystallize the individual amorphous-state portions, irradiates inter-mark portions between the individual recorded marks, for the recorded marks, the time length (n−j)T is divided into $\alpha_1T$, $\beta_1T$, $\alpha_2T$, $\beta_2T$, . . . , $\alpha_mT$, $\beta_mT$ (where m=n−1, $\alpha_1=1.0$, $\alpha_i=0.5$ (i is an integer selected from 2 through m), $\beta_m$=from 0.25 to 0.75, $\alpha_i+\beta_{i-1}=1.0$ (i is an integer within a range of from 2 to m)) in this sequence so as to satisfy $\Sigma_i(\alpha_i+\beta_i)=n-j$ (j is a real number within a range of from 0 to 2.0), within the time length $\alpha_iT$ (i is an integer within a range from 1 to m), the recording light, whose record power Pw is enough to melt the recording layer, irradiates the recording layer (where Pw is 14 to 25 mW and Pe/Pw=0.5), and within the time length $\beta_iT$ (i is an integer within a range of from 1 to m), the recording light of bias power Pb of 0.8 mW irradiates the recording layer.

In the present invention, also for the 4-times velocity, the values of modulation $m_{11}$, $R_{top}$, jitter, deviation, asymmetry and erasure ratio are preferably in the foregoing respective ranges. Modulation $m_{11}$, $R_{top}$, jitter, deviation and erasure ratio for the 4-times velocity are given from a recorded signal that is obtained by retrieving at the 1-times velocity after an EFM-modulated signal is recorded by an overwriting operation ten times under one selected from various conditions of the following recording method 2 or 3 with a data reference clock period T, for a linear velocity, retained so as to satisfy $VT=V_1T_1$ (where $T_1$ is 231 ns) if the linear velocity of 1.2 m/s is assumed as a reference velocity (1-times velocity) $V_1$.

Recording Method 2:

Recording light of a 780 nm wavelength irradiates the recording layer via an optical system whose numerical aperture (NA) is 0.55 or 0.5, with the time length of the individual amorphous mark being nT (n is an integer within a range of from 3 to 11).

During that time, erasure power Pe, which is able to crystallize the individual amorphous-state portions, irradiates inter-mark portions between the individual recorded marks, for the recorded marks, the time length (n−j)T is divided into $\alpha_1T$, $\beta_1T$, $\alpha_2T$, $\oplus_2T$, . . . , $\alpha_mT$, $\beta_mT$ (where m=n−1, $\alpha_1=1.0$, $\alpha_i=0.3$-$0.6$ (i is an integer within a range of from 2 to m), $\beta_m$=from 0.25 to 0.75, $\alpha_i+\beta_{i-1}=1.0$ (i is an integer within a range of from 2 to m)) in this sequence so as to satisfy $\Sigma_i(\alpha_i+\beta_i)=n-j$ (j is a real number within a range of from 0 to 2.0), within the time length $\alpha_iT$ (i is an integer within a range of from 1 to m), the recording light, whose record power Pw is enough to melt the recording layer, irradiates the recording layer (where Pw is 14 to 25 mW and Pe/Pw=0.5), and within the time length $\beta_iT$ (i is an integer within a range of from 1 to m), the recording light of bias power Pb of 0.8 mW irradiates the recording layer.

Recording Method 3:

Recording light of a 780 nm wavelength irradiates the recording-layer via an optical system whose numerical aperture (NA) is 0.55 or 0.5, with the time length of the individual amorphous mark being nT (n is an integer within a range of from 3 to 11).

During that time, erasure power Pe, which is able to crystallize the individual amorphous-state portions, irradiates inter-mark portions between the individual recorded marks, for the recorded marks, the time length (n−j)T is divided into $\alpha_1T$, $\beta_1T$, $\alpha_2T$, $\beta_2T$, . . . , $\alpha_mT$, $\beta_mT$ (where m=n−1, $\alpha_1=0.4$, $\alpha_i=0.15$-$0.25$ (i is an integer within a range of from 2 to m), $\beta_m$=from 0.25 to 0.75, $\alpha_i+\beta_{i-1}=1.0$ (i is an integer within a range of from 2 to m)) in this sequence so as to satisfy $\Sigma_i(\alpha_i+\beta_i)=n-j$ (j is a real number within a range of from 0 to 2.0), within the time length $\alpha_iT$ (i is an integer within a range of from 1 to m), the recording light, whose record power Pw is enough to melt the recording layer, irradiates the recording layer (where Pw is 14 to 25 mW and Pe/Pw=0.5), and within the time length $\beta_iT$ (i is an integer within a range of from 1 to m), the recording light of bias power Pb of 0.8 mW irradiates the recording layer.

Generally, the term "overwrite" means to write new data without making once-recorded data to an uniform unrecorded/erased state by a specified process. In the present invention, however, the term "overwrite" is regarded as having a broader interpretation to read on also "to record new data on a recording area in an initial uniform unrecorded/erased state". For example, the language "by an overwriting operation ten times", which appears in each of the recording method 1 through 3, means to make first recording (first overwriting) in a recording area in an initial crystal state and subsequently make overwriting nine times. This language will also be used in the following description for the same meaning.

Further, regarding the definition of "$\alpha_i+\beta_{i-1}=1.0$" in each of recording methods 1 through 3, $(\alpha_i+\beta_{i-1})$ means a time length equivalent to a reference clock period T and may include an inevitable error that unavoidably results from the circuit design.

Furthermore, it would not be a significant problem even if the wavelength of recording light in each of recording methods 1 through 3 fluctuates in the range of from 775 to 795 nm.

2. Recording Layer of Recording Medium

In the rewritable optical recording medium of the present invention, it is significant that erasure in a reduced time by crystallizing an amorphous mark at high speed and archival life (stability) of an amorphous mark are consistent with each other. To take a read-compatibility with a CD-ROM drive dedicated for retrieving, it is preferable that, in a reference optical system, the modulation is satisfactorily high and the reflectivity should satisfactorily meet other servo signal characteristics, etc.

What most significant to realize high-speed crystallization and archival stability is which material is selected for a phase-change recording layer to be disposed on a substrate. In the present invention, increasing the crystallization speed on the recording layer, which is important, can be accomplished by finely adjustably preparing a composition of the recording layer.

The composition of the recording layer material comprises an alloy containing an excessive amount of Sb as compared to a eutectic-point composition of SbTe, and more particularly containing an excessive amount of Sb on the basis of a eutectic composition of $Sb_{70}Te_{30}$. Preferably the composition of the recording layer material should comprise an alloy of $Sb_{70}Te_{30}$ as a main component. In the presence of excess Sb in an SbTe eutectic composition, it is possible to crystallize the recording layer at high speed. More preferably the composition of the recording layer material is selected from Ge-containing compositions represented by $M_z Ge_y (Sb_x Te_{1-x})_{1-y-z}$ (where $0 \leqq z \leqq 0.1$, $0 < y \leqq 0.1$, $0.72 \leqq x \leqq 0.8$, and M is at least one element selected from the group consisting of In, Ga, Si, Sn, Pb, Pd, Pt, Zn, Au, Ag, Zr, Hf, V, Nb, Ta, Cr, Co, Bi, O, N, S and rare earth metal elements).

The above-mentioned preferable composition can be regarded as a composition comprising a ternary alloy, as a basis, which is obtained by adding Ge to a binary alloy containing excess Sb over an SbTe eutectic-point composition in order to improve archival stability and jitter. At that time, it can be thought that Ge serves to increase the archival stability of an amorphous mark without deteriorating the high-speed crystallization that is as the result of excess Sb. It also can be thought that Ge is the most effective element for not only raising the crystallization temperature but also increasing the crystallization activating energy. Regarding the amount of Ge, the value of y in the above-mentioned composition formula should preferably be 0.03 or more and more particularly 0.04 or more. On the other hand, if the amount of Ge is excessive, since supposedly an inter-metallic compound, such as GeTe or GeSbTe, is precipitated, crystal grains having different optical constants are intermingled in the recording layer to increase noise of the recording layer, which would occasionally be a cause for an increased jitter. Because addition of too much more amount of Ge is not effective to further improve the archival stability, the value of y in the above-mentioned composition formula is usually 0.1 or less and preferably 0.08 or less, representing the amount of Ge.

If excess Sb is too less in amount, the recrystallization speed would be too slow so that comfortable overwriting cannot be achieved a high linear velocity such as 8-times or higher velocity. Consequently the value of x in the above composition formula is 0.72 or more, preferably 0.73 or more and more particularly 0.74 or more. On the other hand, if the amount of excess Sb is too large, the recrystallization speed would be too fast so that a qualified amorphous mark can hardly be formed at the 4-times velocity in the divided pulse method according to CD-RW specifications, thus resulting in an remarkably increased jitter. And to cope with that the archival stability of an amorphous mark would tend to be deteriorated, the value of x is 0.80 or less, preferably 0.79 or less and more preferably 0.78 or less.

The optimum composition range slightly depends also on the numeric aperture (NA) of the optical system. If NA is larger and the focused light beam is restricted, the recording layer cooling rate after irradiating the light beam would tends to be slightly increased. Consequently, for NA=0.5, the optimal value of x is in a range of from 0.73 to 0.78. And for NA=0.55, the optimal value of x is in a range of from 0.75 to 0.80. For the intermediate NA, it is preferable to choose the intermediate composition range.

In the above-mentioned composition formula, characteristics can be further improved by adding at least one selected from the group represented by the above-mentioned M. In, Ga, Si and Sn are effective to further reduce the jitter. N, O and S are effective to prevent segregation due to repeated overwriting and to finely adjust optical characteristics. Bi, Zn, Pd, Pt, Au, Ag and rare-earth elements are effective to facilitate crystallizing an amorphous film through its entire surface immediately after deposition. Zr, Hf, V, Nb, Ta, Cr, Co and Pb are effective to further improve the archival stability.

However, if the amount of element M is too large, segregation of a particular substance would tend to occur with time and due to repeated overwriting. Consequently, regarding the amount of addition of element M, the value of z in the above-mentioned composition formula is 0.1 or less and preferably 0.09 or less with respect to x+y+z. If segregation has once occurred, the stability of amorphous structure and the recrystallization speed which the recording layer initially has would change so that the required overwriting characteristic cannot be secured. Regarding O, S and N in particular, the total amount of these elements is more preferably 5 atomic % or less with respect to the total amount of those elements and Sb, Te, Ge.

In various elements M, In or Ga and In in particular is effective to reduce the jitter and also to expand the margins of linear velocities. Preferably the recording layer comprises a quadripartile alloy of InGeSbTe or GaGeSbTe, particularly one selected from the compositions represented by $A^1_a A^2_b Ge_c (Sb_d Te_{1-d})_{i-a-b-c}$ (where $0 < a \leqq 0.1$, $0 < b \leqq 0.1$, $0.02 < c \leqq 0.2$, preferably $0.02 < c \leqq 0.1$, $0.72 \leqq d \leqq 0.8$, and $A^1$ is at least one element selected from the group consisting of Zn, Pd, Pt, V, Nb, Ta, Cr, Co, Si, Sn, Pb, Bi, O, N, S and rare earth metal elements, and $A^2$ is at least one element selected from the group consisting of Ga and In). As above mentioned, if the amount of In and/or Ga is too large, segregation tends to occur; consequently, it is customary that the value of b is 0.1 or less and preferable 0.06 or less. This enables to retard occurrence of segregation even when an overwriting operation is made over 10,000 times. In the above-mentioned composition formula, the value of d, like the above-mentioned value of x, is preferably 0.73 or more and more particularly 0.74 or more, or preferably 0.79 or less and more particularly 0.78 or less. But the optimal value of d depends also on the numerical aperture, so in practice x=from 0.73 to 0.78 for NA=0.5, and x=from 0.75 to 0.80 for NA=0.55.

The particularly advantages of the foregoing composition for the recording layer over known compositions will now be described.

Various alloys of InGeSbTe are disclosed in Japanese Patent Laid-Open Publications Nos. HEI 1-63195, HEI 1-14083, HEI 5-16528 and HEI 9-293269; in each Japanese publication, a composition near a pseudo-binary alloy of GeTe—$Sb_2Te_3$ is regarded to be preferable.

Whereas the above-mentioned composition of the present invention is a composition that contains excess Sb with a eutectic composition of SbTe being a main component.

As far as for 1- and 2-times velocities, if excess Sb is added to the above-mentioned known pseudo-binary alloy of GeTe—$Sb_2Te_3$, a rewritable compact disc (CD-RW) can be realized (Japanese Patent Laid-Open Publications Nos. HEI 4-212735 and HEI 5-62193). On a curve connecting GeTe—$Sb_2Te_3$, the composition of $Ge_1Sb_4Te_7$, $Ge_1Sb_2Te_4$ or $Ge_2Sb_2Te_5$ shows a fastest crystallization speed, and addition of Sb makes the crystallization speed slow. But, since excess Sb is added, the crystallization speed would be too slow to make high-speed recording at 4-times or higher velocity and hence the erasure ratio would be too low to make overwriting. On the contrary, if the amount of Sb is reduced to meet the recording of the 4-times velocity, recrystallization at the 1-times or 2-times velocity would be remarkable so that forming of an amorphous mark can be deteriorated due to the recrystallization during resolidification. Namely, even if only the amount of Sb is adjusted, it would be difficult to realize overwriting at 2- through 4-times velocities without risk of impairing the read-compatibility with CD-RW specifications. Likewise, recording at from 4- through 8-times velocities also cannot be realized. Yet, if a recording medium is designed to meet the 4-times velocity, it would be difficult to achieve good recording characteristics by the same strategy at the 8-times velocity.

Further, the above-mentioned composition of the present invention is superior in storage stability in room-temperature atmosphere as compared to AgInSbTe and AuInSbTe alloy (exemplified by Japanese Patent Laid-Open Publication No. HEI 10-326436) compositions, which have been widely used in the conventional CD-RWs for 2- through 4-times velocities.

For example, even in an AgInSbTe alloy, overwriting at 8- through 10-times velocities would be possible. But, supposedly because, at the same time, the crystallization activating energy or the crystallization temperature decreases, the stability of an amorphous mark would tend to be deteriorated. This is true because it is difficult to make two demands, the high-speed crystallization velocity during high-linear-velocity overwriting and the stability of an amorphous mark, read-compatible with each other.

It is yet debatable why the foregoing characteristics difference is shown between AgInSbTe and the above-mentioned GeSbTe composition of the present invention. But, presumably, in GeSbTe composition, partly since excess Sb merely participates in nucleation of recrystallization and partly since Ge of four-fold coordination also participates, the network structure of atoms would locally become firm so that especially for low temperatures around room temperature, nuclear growth (local structural change in network) about the nuclei is retarded.

In the meantime, Japanese Patent Laid-Open Publications Nos. HEI 1-303643, HEI 4-28587 and HEI 10-112028 disclose a recording layer of the above-mentioned GeSbTe composition, which is preferable in the present invention. But these Japanese publications are totally silent about: application of GeSbTe to a specified format in the form of a compact disc (CD), use in high-linear-velocity recording at 8-times or higher velocity, and use in both of high-linear-velocity recording and low-linear-velocity recording.

Further, the above-mentioned values of $m_{11}$, $R_{top}$ and jitter are not determined only by the composition of the recording layer.

In the present invention, the recording layer is of a crystal phase having a face-centered cubic structure in the above-mentioned crystal state. In such event, the recording layer may be of a single crystal phase or a plurality of crystal phases. In the latter case, the recording layer is preferably free of misfit. With the resulting recording layer, it is possible to improve characteristics, such as reducing noise, increasing storage stability and facilitating crystallization at high speed. If there exists a crystal phase having a hexagonal structure as of $Sb_2Te_3$, a crystal phase having a cubic structure as of Sb and remarkably different in unit cell, or a different crystal phase belonging to a different space group as of $Sb_7Te$ and $Sb_2Te_3$, supposedly as the result of development of a grain boundary which is large in misfit, the peripheral shape of an amorphous mark would be irregular and optical noise would occur; whereas in the case of the foregoing crystal phase, such grain boundary would not develop.

The unit cell of the foregoing preferred face-centered cubic crystal is usually 5.5 Å or more and preferably 5.8 Å or larger, or usually 6.8 or smaller and preferably 6.5 Å or smaller. The unit cell of the foregoing preferred hexagonal crystal is usually a=4-4.5 Å, and usually c=30-35 Å. In the presence of plural crystal phases, no misfit does not occur; in order to regard them as substantially a single phase, they should have preferably a common crystal structure and the difference between their unit cells is preferably roughly ±5% or less. The crystal phase may be either a stable crystal phase to be obtained in a state of thermal equilibrium or a metastable crystal phase, which develops depends on the manufacturing condition. The metastable crystal phase should by no means correspond to the lowest energy state thermodynamically but is not totally instable; this is, it is a crystal phase that can exist in a substantially stable state in a phase-change recording layer to be used in an optical information recording medium.

Figure 32:
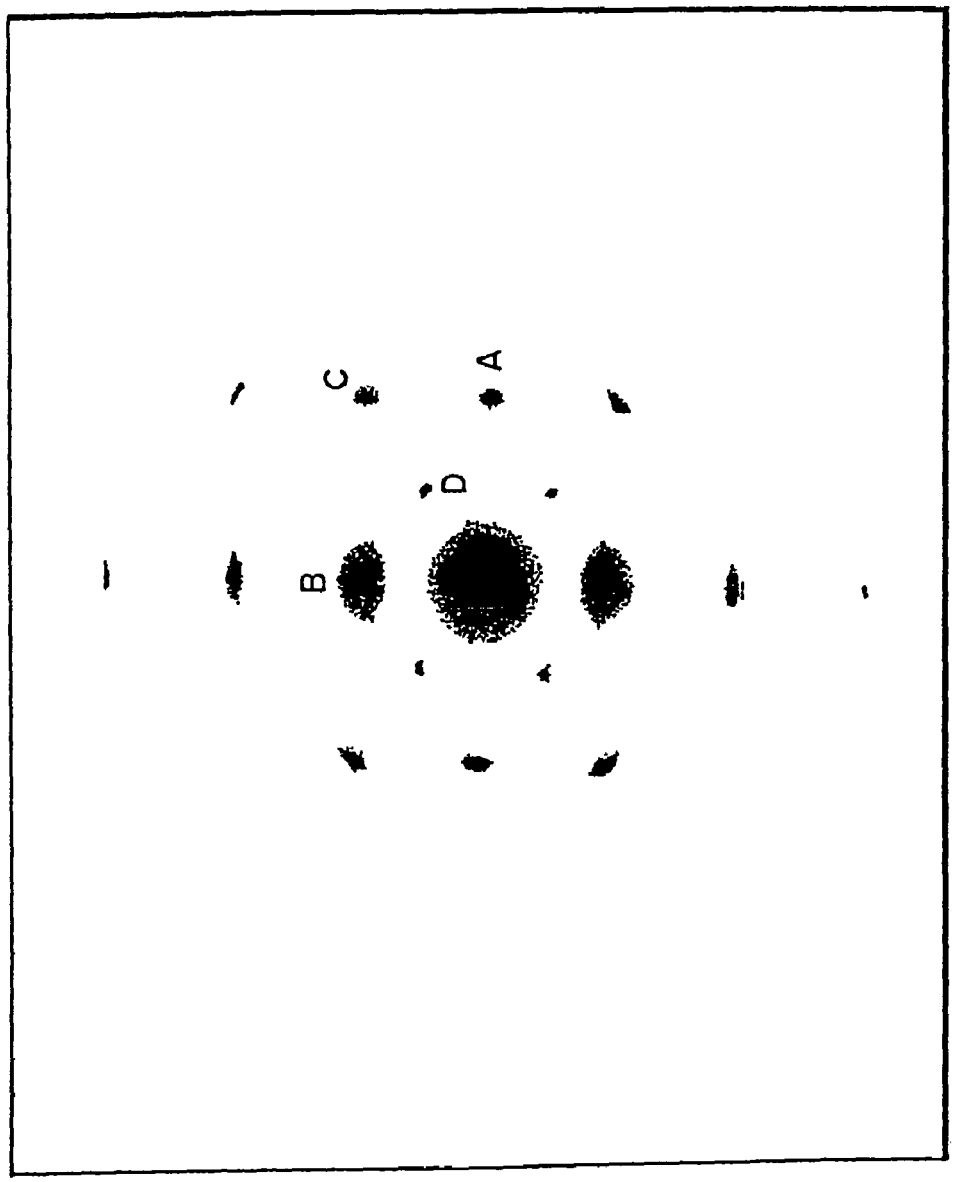
FIG. 32 is an electron-beam diffraction image of a thin film of $In_3Ge_5Sb_{70}Te_{22}$ taken by a permeating electron microscope.

In the present invention, the preferred crystal phase supposedly belongs to an Fm3m space group and/or an F43m space group. FIG. 32 is an electron-beam diffraction image of a thin film of $In_3Ge_5Sb_{70}Te_{22}$ taken by a transmission electron microscope (TEM), the thin film being a recording layer (approximately 20 nm in thickness) peeled off a medium that was manufactured by the same method as the present method in a later-described embodiment in connection with a phase-change optical information recording medium. In FIG. 32, the individual points A, B, C, D are respectively assigned to mirror indices (220), (002), (222), (111). The structure which can illustrate not only these mirror indices corresponding to the individual points A, B, C, D appearing in this diffraction image but also a different pattern of diffraction image, which was obtained likewise, without incurring any contraction is a face-centered cubic structure, particularly a crystal structure belonging to an Fm3m or F43m space group. Further, as facewise rotation actually appears but is substantially not illustrated except FIG. 32, the electron-beam diffraction image supposedly resulted from a single crystal phase. Furthermore, by the X-ray diffraction method, it was proved that no clear-cut peak related to a different crystal structure like an Sb phase was observed.

The electron-beam diffraction image of FIG. 32 indicates that the recording layer belongs to an F43m space group whose unit cell is approximately 6.4 Å or an Fm3m space group whose unit cell is approximately 6.1 Å. The former has a structure similar to a $Ge_3In_{13}Sb_7Te_3$ solid solution or similar to a crystal form belonging to an F43m space group of $AgInTe_2$, and the latter has a structure similar to a crystal system belonging to an Fm3m space group of $AgInTe_2$ or similar to a crystal form belonging to an Fm3m space group of $AgSbTe_2$.

Also for GaSb and InSb, there exist crystal systems belonging to the same space group and respectively having unit cells of approximately 6.1 Å and approximately 6.5 Å, which are extremely near the values of unit cells obtained from the electron-beam diffraction image of FIG. 32. In other words, these crystals accelerate formation of a metastable structure in an Sb-Te-Ge solid solution, which is a base material, partly because presence of In and/or Ga is essential in the recording layer composition of the present invention.

For higher Sb/Te ratio, hexagonal single phase is rather preferred.

In a composition in which Sb is excessive as compared to an SbTe eutectic composition, the above-mentioned different crystal phase tends to be formed. Consequently the composition containing excess Sb is required to be changed into single phase, especially a face-centered cubic structure by initialization in a way described later.

The form of crystal phase of the resultant recording layer largely depends on the way of initializing the recording layer. Namely, for forming the preferred crystal phase in the present invention, it is preferable to initialize the recording layer in the following manner.

The recording layer is deposited usually by physical vapor deposition in a vacuum, such as sputtering method; the recording layer in as-deposited state immediately after deposition is usually non-crystalline or amorphous, so it has been customary to crystallize the amorphous structure into an unrecorded/erased state. This procedure is called initialization. The initialization is exemplified by: oven annealing the deposited amorphous layer in solid phase at a temperature not less than a crystallization temperature (usually 150 to 300° C.) and not higher than a melting point; annealing the deposited amorphous layer under irradiation of light energy such as laser light or flash lamp light; and melt-resolidification initialization. To obtain the recording layer in a preferable crystalline state, melt-resolidification initilization is preferred. In the case of annealing the deposited amorphous layer in solid phase, since it takes redundant time to achieve thermal equilibrium, a different crystal phase tends to be formed.

In melt-resolidification initilization, the recording layer may be melted in such a manner that it is directly recrystallized subsequently during resolidification. Alternatively, after the recording layer has been made amorphous, the amorphous layer may be recrystallized in solid phase near a melting point. During this recrystallization, if the crystallization speed is too slow, a different crystal phase would be formed due to redundant time till thermal equilibrium is accomplished. Consequently it is preferred to make the cooling rate faster to some extent.

For example, the time to retain the temperature not less than a melting point is usually 2 μs or less and preferably 1 μs or less. In melt-resolidification initilization, it is preferred to use laser light and particularly laser light of oval-type with the shorter axis substantially parallel to the scanning direction (hereinafter called "bulk erase"). In this case, the length of the longer axis of light beam is usually in a range of from 10 to 1,000 μm and the length of the shorter axis of beam is usually in a range of from 0.1 to 10 μm, as defined in terms of half-band width when optical energy intensity distribution in a laser light beam is measured. The oval-type laser light is scanned at the direction of the shorter axis, irradiating the phase-change recording layer. The scanning speed is usually roughly in a range of from 1 to 10 m/s. A laser light source may be semiconductor laser, gas laser, etc. The power of laser light is usually roughly in a range of from 100 mW to 2 W.

Otherwise, when the scanning speed exceeds the maximum overwritable speed for the present invention of the phase-change media, there is possibility that the once molten area by bulk erasing beam irradiation can be amorphized. On the other hand, phase separation of different phase of crystalline is obtained so that it is difficult to obtain such preferred signal phase crystalline structure, when the scanning speed is approximately 30% or more below the maximum overwritable speed of the phase-change media. Consequently, the speed of 50 to 80% of the maximum overwritable speed of the phase-change media is preferred as the scanning speed of the bulk erasing beam during initialization. The maximum overwritable speed of the phase-change media is defined of upper limit of the speed at which the completely erasure of the amorphous mark is achieved with irradiation of Pe.

In initialization by bulk erase, assuming that a disc-shaped recording medium is used, the disc is rotated with the shorter axis of an oval light beam substantially aligned with the circumferential direction and scanning takes place on the rotating disc in the direction of the shorter axis. During this scanning, the light beam is moved in the direction of the longer axis (radial direction) for every revolution (every rotation). As a result the disc is initialized through its entire recording area. The distance of the radial movement of the light beam for every rotation is preferably shorter than the longer axis of the light beam to overlap such that the same radius track of the disc is exposed to the light beam a number of times. As a result, it is possible to realize sure initialization free of any non-uniformly initialized state resulting from radial beam energy distribution (usually 10-20%). On the other hand, if the extent of radial movement is too small, a undesired crystal phase different from the target crystal phase tends to be formed; consequently the extend of radial movement should be usually ½ or more of the longer axis of the light beam.

Alternatively, in melt-resolidification initialization, two laser light beams may be used; the preceding beam serves to melt the recording layer, whereupon the succeeding beam then serves to recrystallize the melted area. Here assuming that the distance between the two beams is too large, the area melted by the preceding beam becomes firstly solidified and then recrystallized.

Whether the recording layer has been recrystallized after melt-solidification can be discriminated in terms of whether the reflectivity R1 in erased state after overwriting of an amorphous mark has been made with actual recording light of roughly 1 μm is substantially equal to the reflectivity R2 in unrecorded state after initialization. Here, in measurement of R1, if a signal pattern such as to record amorphous marks successively is used, overwriting is made a plurality of times, usually in a range of from 5 to 100 times. The resultant disc is free of any effect of the reflectivity of possible inter-mark areas that might have been left unrecorded by only single-time recording.

To obtain the above-mentioned erased state, a focused laser beam for recording should by no means be modulated in accordance with an actual recording pulse generation method and, instead, the recording power may be irradiated in direct current to melt the recording layer for resolidification.

In the recording medium of the present invention, the difference between R1 and R2 is preferably small.

More particularly, the formula (F1) value defined by R1 and R2 is preferably 10 (%) or less and more specifically 5 (%) or less.

$$2|R1-R2|/(R1+R2) \times 100 (\%) \tag{F1}$$

For example, in a phase-change medium whose R1 is about 17%, R2 is roughly in a range of from 16 to 18%.

For achieving the above-mentioned initialized state, it is preferable to give a general thermal history equal to the actual recording condition by initialization.

3. Layer Construction of Medium

The layer construction of a medium to be used in the present invention as well as various layers other than the recording layer will now be described. For the layer construction and the composition of various layers other than the recording layer, it is significant that optical characteristics of the medium is in a specified range to secure read-compatibillty with CD, making high-speed crystallization and archival stability of the recording layer read-compatible with each other.

For a substrate of the medium of the present invention, transparent resin such as polycarbonate, acryl or polyolefin, or transparent glass may be used. Partly because it is inexpensive and most widely used in the art, polycarbonate resin in particular is most preferred. The thickness of the substrate is usually in a range of from 0.1 to 20 mm and preferably in a range of from 0.3 to 15 mm. In general, it is about 1.2 mm.

Preferably, the recording layer is coated on each of opposite sides with a protective layer to prevent possible deformation due to high temperature recording (for convenience in explanation, the protective layer disposed on one side from which light strikes the recording layer is called a lower protective layer, and the protective layer disposed on the other side is called an upper protective layer.

More preferably, a lower protective, a recording layer, an upper protective layer and a reflective layer are mounted on the substrate one over another. In this case, the resulting medium is coated on a surface remote from the substrate may be coated (protective coating) with a resin setting permanently when exposed to ultraviolet ray or heat. To secure read-compatibility with the current CD system, it is preferable that on the substrate, the lower protective layer, the recording layer, the upper protective layer and the reflective layer are placed in this order. Further, the recording layer, the protective layers and the reflective layers may be formed by the sputtering method. In that case, preferably on an inline apparatus where a target recording film and a target protective film and, if necessary, a target reflective layer material are placed in a common vacuum chamber, deposition is carried out by sputtering. This deposition is effective to prevent oxidation and contamination between the individual layers.

The material for the protective layers is determined in view of refractive index, heat conductivity, chemical stability, mechanical strength, contact tightness, etc. Generally, oxide, sulfide or nitride of metal or semiconductor high in transparency and melting point, or fluoride of Ca, Mg, Li, etc. may be used. Each of the described oxide, sulfide, nitride and fluoride should by no means be a stoichiometric composition, and alternatively it may be a composition adjusted or mixed to adjust characteristics such as refractive index.

In view of repetitive recording characteristics, a mixture of dielectrics is preferable. More specifically, the alternative is exemplified by a mixture of ZnS, ZnO or rare earth sulfide with a heat-resistant compound such as oxide, nitride, carbide, etc. The film density of these protective layers is preferably 80% or higher in bulk state in view of mechanical strength.

In the present invention, the heat conductivity of the protective layers, particularly of the upper protective layer, is as small as possible. Specifically, the heat conductivity of 1 J/(m·k·s), or less is preferable. Such material is exemplified by a mixture containing ZnS or 50 mole % or more of ZnS.

The film thickness of the lower protective layer is usually 30 nm or more, preferably 50 nm or more, particularly 60 nm or more, and more preferably 80 nm or more. For retarding deformation of the substrate due to thermal damage during repeated overwriting, the lower protective layer requires a somewhat large thickness. If the thickness of the lower protective layer of the recording layer is too thin, sufficient contrast between the crystal state and the amorphous state can hardly achieved is too small, repeated-overwrite durability tends to suddenly become worse. Specifically jitter tends to increase sharply at the beginning of a repeated overwriting operation, i.e. less than hundreds times of repeating.

The degree of deterioration of jitter at the beginning of repeating remarkably depends on the film thickness of the lower protective layer. The observation on an atomic force microscope (AFM) by the present inventors shows that this initial deterioration caused due to such deformation of the substrate surface as to be recessed by about 2 through 3 nm. For retarding such substrate deformation, the protective layer requires a somewhat large film thickness such as to hold possible deformation by mechanically. For this purpose, the above-mentioned film thickness is preferred.

On the other hand, the degree of dependence of the refractive index $R_{top}$ on the film thickness of the lower protective layer usually becomes minimal for the range of 60-80 nm and maximal for the range of roughly 0-150 nm. In the protective layer of generally used dielectrics whose refractive index is about 2.0-2.3 for a wavelength of 780 nm, the refractive index periodically varies between the maximum and minimum values, depending on the film thickness. Therefore it is optically meaningless to increase the film thickness of the lower protective layer recklessly, which would cause an increase in cost of material and a groove coverage due to the deposition of a thick film. Consequently the film thickness of the lower protective layer should be usually 150 nm or less and preferably 120 nm or less.

In the meantime, the film thickness of the upper protective layer is 30 nm or more and preferably 35 or more. The upper protective layer serves chiefly to protect mutual diffusion between the recording layer and the reflective layer. If the upper protective layer is too thin, the recording layer tends to be damaged due to the deformation of itself when melted, and the power needed for recording tends to become unnecessarily large because the heat radiation effect is too large. Particularly for recording at 8-times or higher velocity like in the present invention, impairment of recording sensitivity is not preferable.

On the contrary, if the upper protective layer is too thick, temperature distribution inside it would become steep so that the extent of deformation of the protective layer per se can be large, which deformation tends to be accumulated by overwriting. Consequently the film thickness of the upper protective layer is usually 60 nm or less and preferably 55 nm or less.

The film thickness of the recording layer is preferably 10 nm or more, particularly 15 nm or more. If the recording layer is too thin, sufficient contrast between recorded and unrecorded states can hardly be achieved, and the crystallization speed tends to become slow. And erasure of recording in short time tends to become difficult.

On the other hand, the film thickness of the recording layer is usually 40 nm or less and preferaly 30 nm or less, particularly 25 nm or less. Yet if the recording layer is too thick, sufficient reflectivity contrast between recorded and unrecorded states can hardly be achieved, and the recording sensitivity can be impaired since heat capacity becomes increased. Further, the thicker the recording layer, change in volume of the recording layer with crystalline-amorphous phase change becomes larger; if the recording layer is too thick, microscopic deformation would be accumulated in the protective layer and the substrate surface during repeated overwriting, which can be a cause for noise increase.

Considering not only the restriction in view of mechanical strength and reliability (particularly repeated-overwriting durability) but also the interference effect with a multi-layer structure, the thicknesses of the recording layer and the protective layers are selected such that laser light absorption effect is excellent and amplitude of a recorded signal, namely, contrast between recorded and unrecorded states would become large.

A preferred layer construction on balance of the foregoing relations and conditions is as follows:

Assuming that the reflective index of each of the upper and lower protective layer in a range of from 2.0 to 2.3 and that $d_L$, $d_R$, $d_U$, are the respective film thicknesses of the lower protective layer, the recording layer and the upper protective layer, $$15 \leq d_R \leq 20 \text{ nm, } 30 \leq d_U \leq 60 \text{ nm,}$$

$d_R$ and $d_U$, are in a relation $d_U = \{-5d_R+130\} \pm 10$ nm, and as the dependence of refractive index $R_{top}$ on $d_L$ for the crystal state during retrieving, a value $R_{top}$ such as to satisfy $\partial R_{top}/\partial d_L > 0$ is preferably selected from the range between the minimum value and next to the minimum value for $d_L$ in the range of 60-80 nm.

In the medium of the present invention, also heat radiation effect of the reflective layer is significant to increase as compared to the conventional CD-RW medium read-compatible with 1- through 4-times velocities. By finely adjusting this composition and combining the adjusted composition with the above-mentioned particular recording layer, it is possible to make easier recording both at high linear velocity and at low linear velocity. Particularly by using a material of low heat conductivity as the protective layer, it is possible to achieve a further increased effect.

The relationship of formation and recrystallization of the amorphous structure with heat radiation effect of the reflective layer and linear velocity during recording, will now be described with reference to the graph of FIG. 3.

Figure 3:
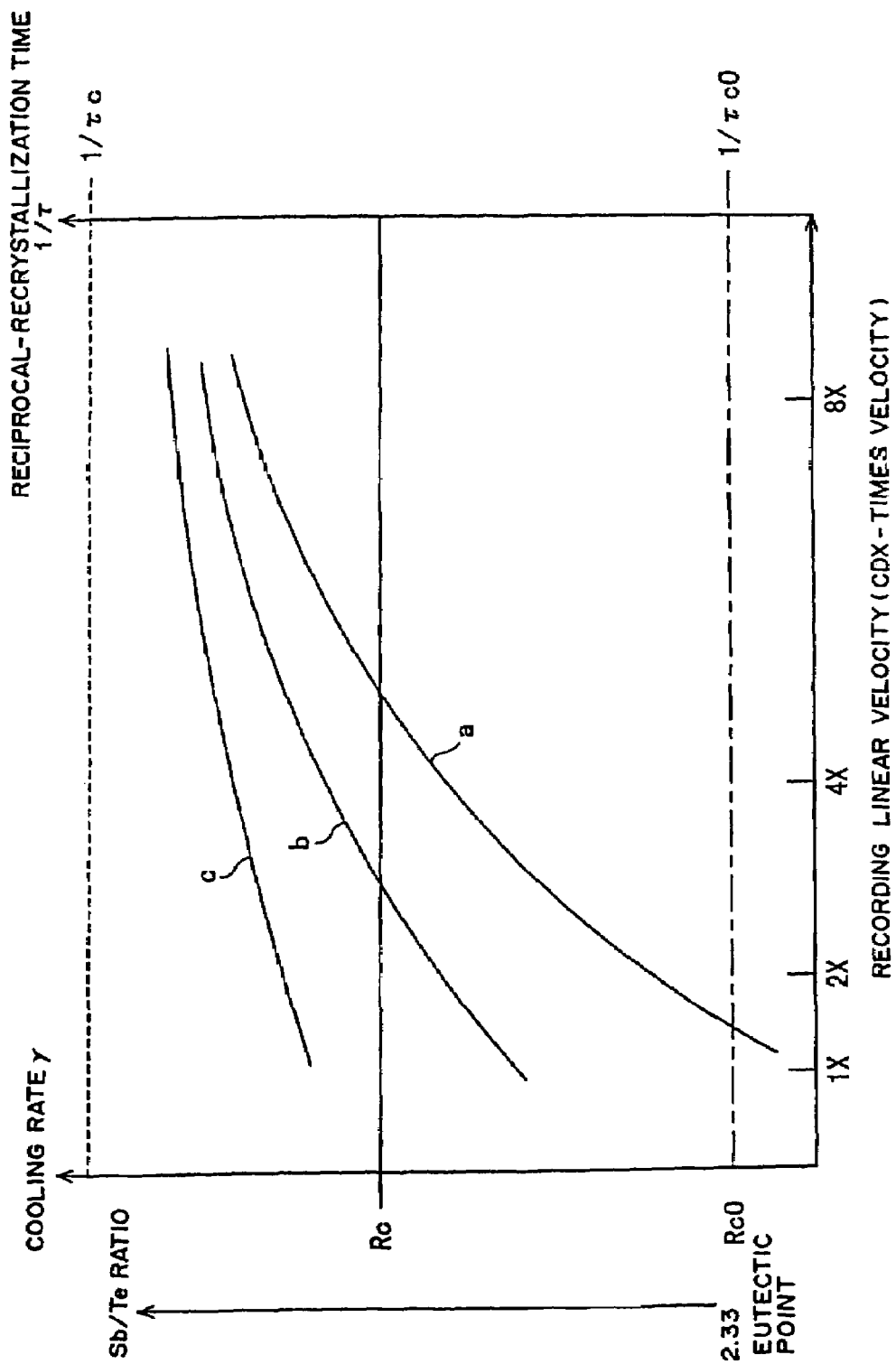
FIG. 3 is a graph illustrating a relation between the process of non-crystallization and recrystallization, the heat radiation of reflective layer and the recording linear velocity.

In the graph of FIG. 3, the horizontal axis is the recording linear velocity, and the left vertical axis is the cooling rate when the recording layer is melted and then resolidified. If this cooling rate $\gamma$ is faster than a critical cooling rate $R_c$ to be determined by the material of the recording layer, the recording layer is amorphized; this is, an amorphous mark is formed. On the left vertical axis of the graph of FIG. 3, to increase Sb/Te ratio over the eutectic-point composition of $Sb_{70}Te_{30}$ (Sb/Te≈2.33) means that $R_c$ becomes faster to move upwardly.

Figure 4A:
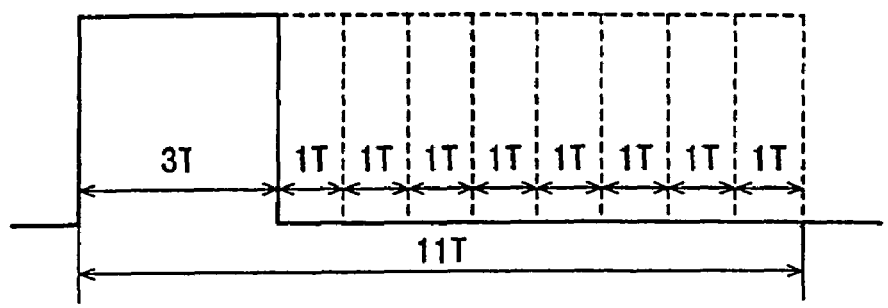
FIGS. 4, (a) and (b), shows how to divide a pulse signal.
Figure 4B:
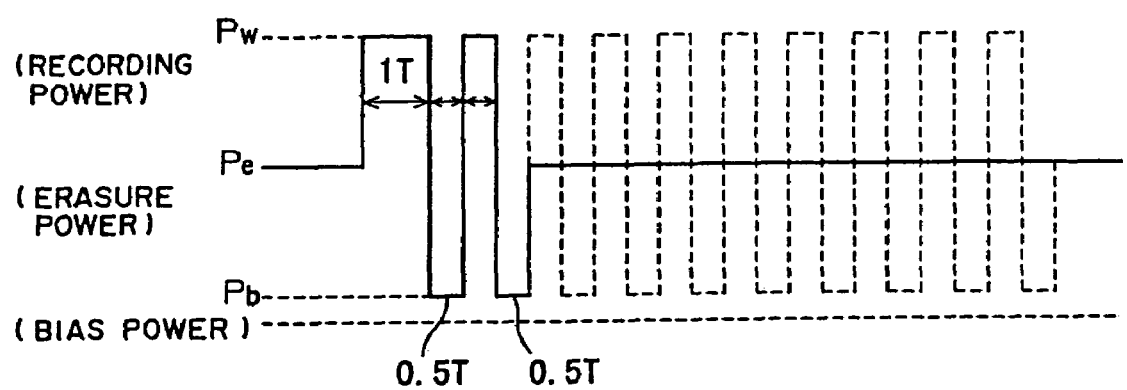

A curve "a" shows a dependence of the cooling rate of the recording layer on the linear velocity during recording when a fixed pulse strategy of FIG. 4 was applied to a disc of an ordinary construction. A curve "b" is similar to the curve "a" except that only the reflective layer of the same disc was substituted by a later-described composition of high heat radiation effect to increase the heat radiation effect. The curve "b" appears above the curve "a", from which it can be understood that formation of an amorphous mark was facilitated.

For high linear velocities, since the cooling rates are originally sufficiently larger than a critical cooling rate $R_c$ for amorphization of non-crystallization of the recording layer, there exists no remarkable difference in heat radiation effect of the reflective layer between the cooling rates which effect is influential on formation of an amorphous structure. But for low linear velocities, since the cooling rates wholly come down to below the vicinity of $R_c$, the heat radiation effect influential on formation of an amorphous structure becomes remarkable.

In the meantime, these curves can be regarded as the dependence of recrystallization of the recording layer between amorphous marks by recording light of erasure power Pe on the linear velocity of an inverse $1/\tau$ of the time $\tau$ during which the recording layer is retained higher than the crystallization temperature (right vertical axis in the graph of FIG. 3). If this retention time $\tau$ is larger than a critical crystallization time $\tau_c$ to be determined by the material of the recording layer, namely, $1/\tau < 1/\tau_c$, the amorphous marks would be sufficiently recrystallized and thus erased.

Assuming that after a single-period signal composed of a 3T mark and a 3T space is recorded, another single-period signal composed of an 11T and an 11T space portion is overwritten in such a manner that the 3T mark is erased at an erase ratio of 25 dB or higher, then usually $1/\tau < 1/\tau_c$.

In the present invention, it is significant that the recording layer has a characteristic like the curve "c" meeting conflicting demands which not only satisfies $1/\tau < 1/\tau_c$ so as to enable sufficient erasure by overwriting at high linear velocity, but also satisfies $\gamma > R_c$ where the cooling rate $\gamma$ at low linear velocity. Consequently it is necessary to select proper compositions and thicknesses of the individual layers. It turns out from the curve "c" that the decrease of the cooling rate of the recording layer is compensated when the linear velocity is slower than the 4-times velocity (4×).

The curve "c" can be accomplished when a later-described preferred divided pulse method is additionally adopted to the medium of the curve "b".

From the foregoing point of view, the material of the reflective layer is preferably an alloy containing Al or Ag as a main component which are high in heat conductivity and large in heat radiation effect. The specific heat of the reflective layer corresponds to pure Al or pure Ag in an alloy containing Al or Ag as a main component, and presumably does not vary either when a small amount of an element is added or when a thin film of the same element is deposited. Thus the heat radiation effects depends on the heat conductivity and thickness of the reflective layer.

In general, the heat conductivity of an element in thin film will become smaller than the heat conductivity of the same element in bulk state usually by a large extent, and it will become smaller sometimes by one or more orders of magnitude due to the island-shaped structure at the beginning of crystal growth. Further, the crystallinity and the impurity quantity depend on the deposition condition, which would be a cause for different heat conductivities even in the same composition.

The quality of heat conduction can be estimated in terms of electrical resistance, normalizing a reflective film of a high heat conductivity giving a good characteristic. This is because, in a material in which electrons play as a main role either in heat conductance or in electric conductance like in a metal film, there is a good proportional relation between the heat conductivity and the electric conductivity. The electrical resistance of the thin film represents a resistivity value that is normalized in terms of the film thickness and the area of measurement. The volume resistivity and sheet resistivity (ratio resistance) can be measured by the ordinary four-probe resistance method and is normalized by JIS (Japanese Industrial Standards) K 7194. It is thereby possible to obtain data that is far simple and good in reproducivity as compared to actually measuring the heat conductivity of the thin film.

Because the heat radiation effect of the reflective layer is represented by the product of the heat conductivity and the film thickness, it can be normalized in terms of the sheet resistivity. In the present invention, the sheet resistivity of the reflective layer is preferably in a range of from 0.2 to 0.6 Ω/□ (quadrature) and more particularly from 0.22 to 0.55 Ω/□ (quadrature).

Further, the preferred reflective layer has a volume resistivity of 150 nΩ·m or less and more particularly 100 nΩ·m or less. On the other hand, a material whose volume resistivity is small to a minimum is substantially difficult to obtain; consequently the volume resistivity is usually 20 n$\Omega$·m or more.

The thickness of the reflective layer is usually in a range of from 40 to 300 nm and preferably in a range of from 50 to 200 nm. If it is too thick, even though the sheet resistivity can be reduced, not only adequate heat radiation effect cannot be achieved, but also the recording sensitivity tends to become worse. In the thick reflective layer, the heat capacity per unit area increases so that it takes more time to radiate heat of the reflective layer itself, which would supposedly result in a reduced heat radiation effect. In such thick film, it takes time to deposit the film, so the material cost tends to rise. Yet if the film thickness is too small, the reflectivity and heat conductivity will become smaller due to the island-shaped structure at the beginning of crystal growth.

The material of the reflective layer is exemplified by an Al alloy and an Ag alloy.

The material of the reflective layer suitable for use in the present invention will now be described in greater detail. The reflective layer material is exemplified by an Al alloy containing Al and at least one element selected from the group consisting of Ta, Ti, Co, Cr, Si, Sc, Hf, Pd, Pt, Mg, Zr, Mo and Mn. As it is known that these alloys are effective to improve hillock resistance, they can be used in view of durability, volume resistivity, deposition speed, etc. The content of the above-mentioned element is usually in a range of from 0.1 to 2 atomic % and preferably from 0.2 to 1 atomic %. Regarding the Al alloy, if an amount of added impurities is too small, hillock resistance is often inadequate, depending on the deposition condition. Otherwise if it is too large, the above-mentioned low resistivity is difficult to obtained.

The reflective layer material may be an Al alloy containing 0-2% by weight of Mn, 0-2% by weight of Si, 0.5-2% by weight of Mg, and 0-0.2% by weight of Ti. Mn is effective to prevent deposition of $FeAl_3$ as $Al_6Mn$ serves as a solid solution with respect to Fe and hence to prevent corrosion resistance from being deteriorated due to Fe; of undesired elements inevitably mixed in an Al alloy during the manufacturing process, Fe is the most difficult to perfectly remove out. However, if the content of Mn per se is large, $Al_6Mn$ is deposited in the reflective layer with time to cause the heat conductivity to vary with time. This content of Mn is usually 2% by weight or less and preferably 1% by weight. Si is effective to minimize "micro-peel-off" defects, but if it content is too much, the heat conductivity can vary with time; consequently the content should be usually 2% by weight or less and preferably 1.5% by weight or less. And Mg is effective to improve corrosion resistance of the reflective layer, but if its content is too much, the heat conductivity can vary with time; therefore the content should be usually 2% by weight or less and preferably 1.5% by weight or less. Ti is effective to prevent fluctuation of the sputtering rate, but if its content is too much, Ti causes the heat conductivity to decrease, and a bulk containing Ti microscopically uniformly distributed is difficult to cast, increasing the target cost; therefore the content is usually 0.2% by weight or less.

An alternative material of reflective layer is exemplified by an Ag alloy containing, in addition to Ag, at least one element selected from the group consisting Ti, V, Ta, Nb, W, Co, Cr, Si, Ge, Sn, Sc, Hf, Pd, Rh, Au, Pt, Mg, Zr, Mo and Mn. If the archival stability is regarded to be more significant, an addition component is preferably Ti, Mg or Pd. The content of the element is usually in a range of from 0.2 to 5 atomic %.

In the present invention, using a high-heat-conductivity material, it is possible to a reflectively layer whose thickness is in a relatively small range of from 40 to 300 nm or less and whose sheet resistivity is in an appropriately small range of from 0.2 to 0.6 $\Omega$/□(quadrature).

Partly because of addition of an impurity element to Al and partly because of addition of an impurity element to Ag, usually the volume resistivity is increased in proportion to the addition concentration. Presumably addition of impurities generally serves to reduce the grain size so that electron scattering at the grain boundary to cause a decreased heat conductivity. Accordingly to adjust the amount of addition impurities is significant to secure the high heat conductivity originating from the material per se by increasing the grain size.

The reflective layer is formed usually by the sputtering method or vacuum deposition; at that time, the total amount of impurities, containing the impurities of targets and materials to be deposited, and including the amount of, water and oxygen which are mixed during deposition, is preferably less than 2 atomic %. For this purpose, when the reflective layer is deposited by sputtering, the target background pressure of a process chamber should be preferably less than $1 \times 10^{-3}$ Pa.

For depositing the reflective layer under a target background pressure higher than $10^{-4}$ Pa, it is desirable that the deposition rate is 1 nm/s or faster and preferably 10 nm/s or faster to prevent invasion of impurities. Otherwise if the content of an intentional addition element is more than 1 atomic %, it is desirable that the deposition rate is 10 nm/s or faster to prevent invasion of additional impurities to a minimum.

The grain size can occasionally vary, depending on the deposition condition. For example, in an alloy film in which about 2 atomic % of Ta is mixed in Al, an amorphous phase usually exists between grains, and the ratio of the crystal phase and the amorphous phase varies depending on the deposition condition. More specifically, the lower the pressure under which sputtering takes place, the percentage of the crystal portion increases so that the volume resistivity decreases (heat conductivity increase). And the impurity composition or crystallinity in the film also depends on the manufacturing method for an alloy target employed in sputtering and even sputter gas (such as Ar, Ne, Xe). Thus the volume resistivity of the reflective layer in a thin film is not determined only by the metal material and composition.

For obtaining high heat conductivities, as mentioned above, it is preferred to reduce the impurity amount. On the other hand, pure metal of Al or Ag tends to be deteriorated in corrosion resistance and hillock resistance. Therefore an optimal composition is determined on balance of these two requirements.

The reflective layer in a multilayer structure is effective to obtain high heat conductance and high reliability. In this case, at least one layer is preferably made of a material having the above-mentioned low volume resistivity and has a film thickness of 50% or more of the total thickness of all reflective layers. This layer serves to substantially give a heat radiation effect, while the other layers serves to assist in improving corrosion resistance, tightness of contact with the protective layer, and hillock resistance.

For example, Ag whose heat conductivity and volume resistivity are the maximum and the minimum in metals is inread-compatible with the upper protective layer containing sulfur (S) and tends to be deteriorated slightly faster in repeated overwriting. Further, since Ag tends to cause corrosion under a high-temperature, high-humidity acceleration test environment, it is also effective that an alloy layer smaller in thickness than the Ag-containing reflective layer and containing Al as a main component is provided as an interfacial layer between the Ag-containing reflective layer and the upper protective layer. This Al alloy, likewise the foregoing, is exemplified by an Al alloy containing 0.2 atomic % or more and less than 2 atomic % of at least one element selected from the group consisting of Ta, Ti, Co, Cr, Si, Sc, Hf, Pd, Pt, Mg, Zr, Mo and Mn. If it is too small in thickness, the interfacial layer is inadequate in protection effect. Otherwise if it is too large in thickness, the interfacial layer tends to be inadequate in heat radiation effect. Consequently the thickness of the interfacial layer should be usually in a range of from 5 to 100 nm and preferably in a range of from 5 to 50 nm. In the meantime, the film thickness of the Ag-containing layer is usually in a range of 10 to 200 nm. If it is too thin, the Ag-containing layer is inadequate in heat radiation effect, and if it is too thick, the Ag-containing layer tends to be inadequate in erasure.

Furthermore, in the presence of the Ag-containing reflective layer and the Al-containing interfacial layer, Ag and Al tends to relatively mutually diffuse. Consequently it is more preferable to oxidize the contact surface of the Al-containing layer with the Ag-containing layer to form an interfacial oxidation layer. If it is too thick, the interfacial oxidation layer serves as a heat resistance so that the originally intended function of the reflectively layer, which is high in heat radiation, can be impaired. Consequently the thickness of the interfacial oxidation layer should be usually 10 nm or less and preferably 5 nm or less. Otherwise if it is too thin, the function of the interfacial oxidation layer can be inadequate; therefore the film thickness should be usually 1 nm or more. Such interfacial oxidation layer is obtained by forming an Ag-containing interfacial layer and then leaving the formed layer in air for a time period of from 1 minutes to 100 hours.

The reflective layer in a multilayer structure is effective to obtain a desired sheet resistivity in a desired film thickness by combining a high-volume-resistivity material and a low-volume-resistivity material together. Namely, adjustment in volume resistivity by combining different metals together can simplify the sputtering process with use of an alloy target and, at the same time, would rather cause a rise of the target manufacturing cost and an increase of raw material ratio of the medium. Depending on the situation, a multilayer structure composed of a thin film of pure Al or Ag and another thin film of the above-mentioned addition element is effective to obtain a desired sheet resistivity. As long as the total number of layers is about 3 or less, the initial apparatus cost increases but the individual medium cost rather can be kept reasonable.

In the present invention, it is also essential to consider the construction of the groove, which is formed in the substrate, to secure a read-compatibility with CD.

The track pitch of the groove is usually 1.6 µm±0.1 µm. And the depth of the groove is usually in a range of from 30 to 45 nm and preferably in a range of from 30 to 40 nm.

If the groove depth is too large, the push-pull signal value after recording tends to become too large, and the radial contrast value after recording tends to become too large as compared that value before recording so that the servo stability can be encountered with a problem.

Otherwise if the groove depth is too small, the radial contrast value and the push-pull value can become smaller than a minimum value requested in CD-RW specification such as Orange Book, Part 3, and the constraint effect of the recording layer by the groove wall becomes worse so that deterioration of the constraint effect due to repeated overwriting would tend to be promoted. Otherwise if the groove depth is too small, it would be difficult to manufacture the stamper and to mold the substrate.

With the groove geometric values in the foregoing ranges, the in-groove reflectivity becomes enough high and hence tends to satisfy 15%, which is the minimum value of CD-RW specifications. And the amplitude of push-pull signal PPa after recording does not become too large so that saturation of the gain of a push-pull detector circuit even in an existing uneven-pits retrieving circuit can be reduced.

The groove width is usually 0.4 µm or more and preferably 0.45 µm or more, or usually 0.6 µm or less and preferably 0.55 µm or less. If the groove width is too small, the absolute value of radial contrast after recording becomes difficult to satisfy a value of less than 0.6 in CDS-RW specifications. Otherwise if the groove width is too large, deterioration of overwriting durability due to the wobble tends to become remarkable.

The mechanism of promoting deterioration of the durability because of the wobble is not demonstrated, but it is supposedly because part of recording light beam tends to be irradiated to the groove sidewall. Namely, since a focused light beam under control of tracking servo runs straightly along the groove center without following the meanders of the wobble groove geometry, the light beam tends to be irradiated to the groove wall only by a slight part as the groove wall has meanders. In general, it is presumed that deterioration due to heat damage during repeated overwriting tends to occur as stress concentration tends to occur at the groove walls and groove corners where the tightness of contact with the confronting thin film is inadequate. And when even part of light beam irradiates such portions, deterioration tends to be rather promoted. Also in general, in in-groove recording of the phase-change medium, the deeper and narrower the groove, the recording layer tends to give a better durability. In the presence of wobble, if the groove width is too narrow, deterioration phenomenon of the above-mentioned groove walls supposedly becomes remarkable.

The groove width and depth may be measured by, for example, an optical diffraction method in terms of U-groove resemble using He—Ne laser light having a wavelength of 633 nm. Alternatively the groove geometry may be actually measured on a scanning electron microscope (SEM) or a scanning prove microscope (SPM). In this case, for the groove width, it is preferable to use a value that is usually a half the groove depth. On the optical recording medium of the present invention, recording by the CAV method described later can be made. Namely, on the medium of the present invention, data can be recorded at a constant angular velocity, irrespective of the radial position where the recording takes place. In this case, retrieving also can be made at a constant angular velocity which is preferably equal to that in the recording.

4. General Recording Method

In the present invention, on the above-mentioned rewritable optical recording medium, recording is carried out at least the 8-times velocity and particularly at 8-times and 10 times velocities, or 8-times and 4-times velocities, or 4-times, 8-times and 10-times velocities. In this case, overwriting can be made the following divided pulse method (I). As a result, it is possible to record a signal which is well read-compatible with the existing CD retrieving system.

Divided Pulse Method (I):

When an individual recorded mark has a time length nT (T is the reference clock period, and n is an integer within a range of from 3 to 11), recording light of erasure power Pe, which is able to crystallize an amorphous structure, irradiates inter-mark portions, for the recorded marks, the time length (n−j)T is divided into $\alpha_1 T, \beta_1 T, \alpha_2 T, \beta_2 T, \ldots, \alpha_m T, \beta_m T$ (where m=n−1 or m=n−2) in this sequence so as to satisfy $\Sigma_i(\alpha_i+\beta_i)=n-j$ (j is a real number within a range of $0.0 \leq j \leq 2.0$), and the recording light of recording power Pw (Pw>Pe, preferably Pw=from Pe/0.3 to Pe/0.6) which is able to melt the recording layer within the time length $\alpha_i T$ ($1 \leq i \leq m$), irradiates the recording layer, and irradiating the recording light of bias power Pb (Pb$\leq$0.5Pe) within the time length $\beta_i T$ ($1 \leq i \leq m$) to the recording layer to overwrite.

In this divided pulse method, if m=n−1, such overwriting corresponds to the overwriting according to the divided pulse method normalized by the current CD-RW specifications. Therefore this condition is preferable to take read-compatibility with the existing circuits for CD-RW recorder.

In the foregoing, for accurately adjusting the length of an amorphous mark to be formed, the section jT can be set. The section jT is usually added to the head and/or tail of the above-mentioned divided pulse, during which recording light of the erasure power Pe is irradiated.

The bias power Pb is preferably a value substantially equal to that of the read power Pr needed for retrieving by retrieving light, usually 1.5 mW or less and particularly 1.0 mW or less. As long as it causes no problem with focusing and tracking servo, this value is preferred as nearly to 0 as possible so that the rapid cooling effect in the Pb-irradiation section (off-pulse section) can be promoted. The values of Pw, Pe and Pb should by no means be constant always; for example, superposition of high frequency may be added by a cycle of a clock period T of about $V_{10}$ to stabilize the operation of the laser. In this case, Pw, Pe and Pb are mean values.

FIG. 1 is a diagram illustrates the above-mentioned divided pulse method; (a) shows mark-length- modulated data and how to record the data, (b) shows the case of m=n−1, and (c) shows the case of m=n−2. In (b) and (c), T is omitted from $\alpha$ and $\beta$ at every occurrence for convenience of illustration.

In the above-mentioned recording method, when overwriting can be made for at least m=n−1, good overwriting is realized with taking read-compatibility with CD-RW specifications. Namely, the signal characteristic, which is the one after overwriting an EFM-modulated signal, has a read-compatibility with CD when the above-mentioned modulation $m_{11}$, is 60% or more and the asymmetry is near 0. Further, the recording is made with keeping a recording quality such that the respective jitters of each mark and each inter-mark (space) of a signal to be retrieved is 35 ns or less (retrieving at the 1-times velocity), and each mark and inter-mark has a length equal to about nT×V (T is a data reference clock period, n is an integer from 3 to 10, V is a linear retrieving velocity). This means that in practice, the disc can be retrieved, with a low error rate, on a commercially available CD-ROM drive which is able to retrieve a CD-RW.

In the above-mentioned recording method, after a retrieving signal has been passed through a high-pass filter, measurement of the jitter is carried out by detecting the mark length by DC slicing with the center of the signal amplitude being defined as a threshold.

On the medium of the present invention, overwriting is made by any of the two divided pulse method in which preferably m=n−1 and m=n−2, respectively. Further, on the medium of the present invention, recording is made at various linear velocities described later. At that time, for any linear velocity, the divided pulse method illustrated in (a) and (b) of FIG. 1 is employed in which a mark having an nT length is usually pulse-divided into a plurality of sub-divided time lengths, and the recording power Pw and the bias power Pb are alternately irradiated. In general, the optimal values of parameters determining the practical method varies depending on the linear velocity. Consequently, on the medium of the present invention, it is preferable to previously describe at lease one of various items of divided pulse information, such as the optimum recording power $Pw_o$ according to the recording linear velocity, the optimum erasure power $Pe_o$, the optimum bias power $Pb_o$, $\alpha_i$ (i is at least one selected from 1 through m), $\beta_i$ (i is at least one selected from 1 through m), the number of sub-divided pulses m.

Regarding the medium of the present invention, if the recording method is determined, the overwriting characteristic at an arbitrary linear velocity, which is selected from 4-times through the 10-times velocity, can be determined substantially univocally. In other words, in FIG. 3, a curve "c" with the recording pulse strategy taken into account is defined for the 4-times velocity and the 10-times velocity; this is, each of the cooling rate $R_c$ required for the medium and the retention time $\tau$ for crystallization is determined substantially univocally.

Further, at an arbitrary linear velocity between the 4-times velocity and the 10-times velocity, preferably an arbitrary linear velocity between the 1-times velocity and the 10-times velocity, the medium of the present invention, as a rewritable optical recording medium, enables excellent retrieving on the conventional CD-RW-retrievable system and facilitates taking read-compatibility between the medium and the drive.

5. Recording Method by CLV Operation

The recording method according to a third aspect of the present invention will now be described.

As mentioned above, one of the reasons why high-speed recording could not be realized on CD-RW so far, is that a strict recording pulse strategy (divided pulse method) is defined by CD-RW specifications. Namely, recording at a wide variety of velocities ranging from the 4-times velocity to 8- and 10-times or higher velocities must be carried out by the recording pulse strategy normalized by CD-RW Specifications—Orange Book Part 3, Version 2.0, the strategy being illustrated in FIG. 4.

Nonetheless, when recording mark-length-modulated data on a phase-change medium in terms of mark and inter-mark lengths, the ratio of the maximum effective linear velocity to the minimum effective linear velocity is practically limited to roughly 2 for the fixed recording pulse strategy.

Consequently, the recording method of the present invention employs the following three divided pulse methods, which are basically similar to the divided pulse method (I), when recording by CLV (constant linear velocity) at a selected constant linear velocity various velocities ranging from 1-times to 10-times.

In recording EFM-modulated information on a rewritable optical recording medium, having a phase-change recording layer, in terms of a plurality of mark and inter-mark lengths, if an individual recorded mark has a time length nT, recording light of erasure power Pe, which is able to crystallize an amorphous-state portion, irradiates inter-mark portions, for the recorded marks, the time length (n−j)T is divided into $\alpha_1 T, \beta_1 T, \alpha_2 T, \beta_2 T, \ldots, \alpha_m T, \beta_m T$ (where m=n−1 or m=n−2) in this sequence so as to satisfy $\Sigma_i(\alpha_i+\beta_i)=n-j$ (j is a real number within a range of $0.0 \leq j \leq 2.0$), and the recording light of recording power Pw (Pw>Pe, preferably Pw=from Pe/0.3 to Pe/0.6), which is able to melt the recording layer within the time length $\alpha_i T$ ($1 \leq i \leq m$), irradiates the recording layer, and irradiating the recording light of bias power Pb (Pb$\leq$0.5Pe) within the time length $\beta_i T$ ($1 \leq i \leq m$) to the recording layer to overwrite.

When a linear velocity within a range of 1.2 m/s to 1.4 m/s is a reference velocity (1-times velocity) and 231 nsec (ns) is a reference clock period, (1) for the 4-times velocity, $\alpha_1$=from 0.3 to 1.5, $\alpha_i$=from 0.2 to 0.7 ($2\leq i\leq m$), $\alpha_i+\beta_{i-1}$=from 1 to 1.5 ($3\leq i\leq m$), (2) for the 1- or the 2-times velocity, $\alpha_1$=from 0.05 to 1.0, $\alpha_i$=from 0.05 to 0.5 ($2\leq i\leq m$), $\alpha_i+\beta_{i-1}$=from 1 to 1.5 ($3\leq i\leq m$), and (3) for any of 6-, 8-, 10- and 12-times velocities, $\alpha_1$=from 0.3 to 2, $\alpha_i$=from 0.3 to 1-($2\leq i\leq m$), $\alpha_i+\beta_{i-1}$=from 1 to 1.5 ($3\leq i\leq m$).

In the above-mentioned recording method, for each linear velocity, $\alpha_i$ ($2\leq i\leq m$) and/or $\alpha_i+\beta_{i-1}$ ($3\leq i\leq m$) are preferably substantially constant irrespective of i so that a later-described simple pulse generator circuit can be utilized. Thus for each linear velocity of (1) through (3) above, $\alpha_i+\beta_{i-1}$ is preferably a constant value of about 1 irrespective of i. Further, the head pulse $\alpha_i$ is longer than the succeeding pulse $\alpha_i$ ($2\leq i\leq m$), particularly $\alpha_i/a_1$=from 0.3 to 0.7 and preferably 0.4 to 0.7, so that a short mark of 3T or 4T and a long mark of 5T or longer can be recorded exactly in their respective mark lengths, bringing the asymmetry close to 0. This is particularly effective for 4-times or higher velocity.

For each linear velocity of (1) to (3), $\beta_1$ and $\beta_m$ is selected as independent parameters and may be variable; but each of their values are preferably in a range of from 0 to 1.5 and more preferably in a range of from 0.25 to 1.25.

And the values of Pw, Pe and Pb should by no means be constant always. For example, the power Pw of the recording light to irradiate during the section $\alpha_1$T or $\alpha_m$T and the power Pw of the recording light to irradiate during the section $\alpha_i$T (i=from 2 to m-1) may be mutually different values.

The number of sub-divided pulses m is one selected from n-1 or n-2 for each linear velocity of (1) through (3) above. Alternatively the value of m may be varied according to the linear velocity; for 4-times or lower velocity, the recorded pulse is divided into n-1 as shown in (b) of FIG. 1, and for 4-times or higher velocity, the recorded pulse is divided into n-2 as shown in (c) of FIG. 1.

In the above-mentioned recording method of the present invention, for each linear velocity to be used, the recorded pulse width $\alpha_i$T (i=from 1 to m) and the off-pulse section $\beta_i$T (i=from 1 to m-1) are 10 ns or more and preferably 15 nm or more. If $\alpha_i$T or $\beta_i$T is too small, the rising time and falling time of recording laser in the current ordinary recording apparatus are preferably at least 2, 3 ns; therefore, accurate adjustment of the pulse is difficult to achieve. Consequently the reference clock period T is at least 19.3 ns, which can cope with the 2-times velocity, and preferably at least 23.1 ns, which can cope with the 10-times velocity. If the off-pulse section $\beta_i$T (i=from 1 to m-1) is too small, the cooling rate of the recording layer can be inadequate.

The current CD-RW medium has to accurately record a CD-read-compatible signal by the divided pulse method ($\alpha_1$=1, $\alpha_i$=0.5 (i=from 2 to m), $\alpha_i+\beta_{i-1}$=1(i=from 2 to m), $\beta_m$=0.5), but it is possible to obtain a better characteristic by adding a compensation of about ±0.3T on the recording apparatus side without a considerable reconstruction to the recording apparatus per se. Consequently for the 4-times velocity, the parameters of the above-mentioned divided pulse method, likewise (1) above, are:

$\alpha_1$=from 0.75 to 1.25, $\alpha_i$=from 0.2 to 0.7 ($2\leq i\leq m$), $\alpha_i+\beta_{i-1}$=from 1 to 1.5 ($3\leq i\leq m$).

For a low linear velocity, i.e. 1-times or the 2-times velocity, which is lower than the 4-times velocity, the parameters (2) above of the divided pulse method are:

$\alpha_1$=from 0.05 to 1.0, $\alpha_i$=from 0.05 to 0.5($2\leq i\leq m$), $\alpha_i+\beta_{i-1}$=from 1 to 1.5 ($3\leq i\leq m$, preferably $2\leq i\leq m$), so that the amplitude of the recorded pulse Pw is narrowed and the associated off-pulse Pb irradiation section (off-pulse section) is lengthened so that lowering of the recording layer cooling rate for the low linear velocity is retarded and recrystalization of the melted recording layer during resolidification for the low linear velocity is retarded. As a result, it is possible to obtain an amorphous mark whose width and length are substantially identical with those when overwriting at the 4-times velocity.

For a high linear velocity, i.e. any of 6-, 8-, 10-times and 12-times velocities, the parameters (3) above of the divided pulse method are:

$\alpha_1$=from 0.3 to 2, $\alpha_i$=from 0.3 to 1 ($2\leq i\leq m$), $\alpha_i+\beta_{i-1}$=from 1 to 1.5 ($3\leq i\leq m$, preferably $2\leq i\leq m$), so that the width $\alpha_i$T of the recorded pulse is wide so that adequate recording power can be given to melt the recording layer at high linear velocity. As a result, it is possible to obtain an amorphous mark whose width and length are substantially identical with those when overwriting at the 4-times velocity.

Here the method of (3) above can be applied also for 10-times or higher linear velocity, but it can be difficult to control laser pulses accurately as the data reference lock period becomes shorter with respect to the high linear velocity. Consequently this method should be applied for usually 20-times or lower velocity, preferably 12-times or lower velocity and more preferably 10-times or lower velocity.

When the number of sub-divided pulses m is constant, as n-1 or n-2, for each linear velocity, $\alpha_1$=approximately 1, $\alpha_i$=from 0.3 to 0.6 ($2\leq i\leq m$), and $\alpha_i+\beta_{i-1}$ is constant ($3\leq i\leq m$, preferably $2\leq i\leq m$). Preferably in view of simplification of circuit, $\alpha_i$ is simply reduced for the lower linear velocity (where i is an integer within a range of from 2 to m). Further, for each linear velocity to be used, each of $\alpha_1$T, $\alpha_i$T, and $\alpha_i+\beta_{i-1}$ is constant (where i is an integer within a range of from 3 to m). Here $\alpha_1$ is approximately 1 but may be roughly in a range of from 0.9 to 1.1.

In the above-mentioned recording method of the present invention, $\beta_m$ is constant for every linear velocity. Alternatively only $\beta_m$ may be varied with $\alpha_i$ and $\beta_i$ kept constant; preferably it may be reduced further for the higher linear velocity. In this case, it may be $\beta_m$=0 on the high velocity side.

Further, for simplifying the pulse generator circuit of the recording apparatus, it is preferred that m is only one of n-1 or n-2 for all the linear velocities.

At a high linear velocity over the 4-times velocity, the data reference clock period T becomes shorter. Consequently, in the same divided pulse method as that for the 4-times velocity, usually 0.5T≈15 nsec for the 8-times velocity, for example, and 0.5T≈12 nsec for the 10-times velocity. The recording laser pulse generator circuit would be difficult to follow unless the velocity is extremely high.

For a linear velocity over the 4-times velocity, the number of sub-divided pulses m=n-2 to increase each pulse width, $\alpha_i+\beta_{i-1}$ ($3\leq i\leq m$) is roughly in a range of from 1 to 1.5, $\alpha_1$ is in a range of from 1.2 to 2.0, $\alpha_i$ is in a range of from 0.5 to 1.0. Thus these pulse widths are relatively large so that a good response speed of recording laser can be achieved. This is effective particularly for 8-times or higher velocity.

For 4-times or lower velocity, usually at the same linear velocity, Pe/Pw=from 0.3 to 0.6, preferably in a range of from 0.4 to 0.6. Pe and Pw are preferably set in such a relation that Pe/Pw ratio is constant to obtain a wide recording power margin. On the other hand, for a high linear velocity over the 4-times velocity, Pe, Pw may be set independently from each other; for each linear velocity, a different optimum power may be determined.

For determining the optimum value $Pw_o$ of Pw for 4-times or higher linear velocity, trial writing is previously made with recording light of different kinds of recording power Pw, and the recording power Pw such that an asymmetry value and modulation $m_{11}$ are within respectively predetermined ranges may be regarded as the optimum recording power $Pw_o$. In this case, actual recording is made with recording light of the determined optical recording power $Pw_o$. In the foregoing, the ranges of the asymmetry value and modulation $m_{11}$ may be previously described on the medium in terms of phase-depth modulated pit (uneven pit) signals on the disc surface or signals depending on the wobble groove geometry.

As a preferred embodiment of the recording method of the present invention, for simplifying the pulse division circuit, the same divided pulse method is employed for from the 4-times velocity to at least the 8-times velocity, even to the 10-times velocity depending on the situation. Specifically, the number of sub-divided pulses m is constant, as n−1 or n−2. More preferably $\alpha_i$ (i is an integer in a range of from 1 to m) is the same for all the linear velocities. At that time, it is particularly preferable that for all the linear velocities, $\alpha_j + \beta_{i-1}$ (i=from 2 to m) is 1, and $\alpha_i$ is the same value.

FIG. 5, (a) through (e), illustrates the manner in which pulses are generated in the recording method of the present invention; (a) is a data reference clock signal, (b) is mark-length-modulated data signal, and (c) through (e) are three kinds of gate signals Gate1, Gate2, Gate 3 to be generated from three gate generator circuits in the recording pulse generating circuit. If the priority sequence of these three gate signals is previously determined, the divided pulse method of the present invention can be accomplished.

Gate1 determines the timing to generate a predetermined number of only the recording pulse generation section $\alpha_1 T$, and Gate2 determines the timing to generate a predetermined number of succeeding pulses $\alpha_i T$ ($2 \leq i \leq m$). Here the pulse width $\alpha_i$ is a constant value $\alpha_c$ ($2 \leq i \leq m$). In the meantime, Gate 3 generates off-pulse generation sections $\beta_i T$; it generates Pb during ON (level high) and Pe during OFF (level low).

By independently determining the timing of rising of only $\alpha_1$, it is possible that $\beta_1$ has a different value from $\beta_i$.

The rising timings of Gate 3 and Gate1 are preferably synchronized with each other. Gate1 and Gate 2 respectively generate Pw; when they are ON,. Gate1 and Gate2 are ON, they have priority to Gate3. Assuming that the delay period $T_1$ and $\alpha_1$ of Gate1 and the delay period $(T_1+T_2)$ and $\alpha_c$ of Gate2 are designated, it is possible to designate a pulse strategy in the recording method of the present invention.

Here if $T_1$ is 1T or more, it becomes a pulse in the case of m=n−1 of (b) of FIG. 1. If $T_1$ is less than 1T to decrease the number of the succeeding pulses by 1, it becomes a pulse in the case of m=n−2 of (c) of FIG. 1. Alternatively, $\beta_{m-2} \leq 1.0$.

In this case, $\beta_1$ and $\beta_m$ can be treated as independent parameters that are determined respectively by a combination of $\alpha_1$, $T_1$ and $T_2$ and by the tail of Gate3. In (c) of FIG. 1, to satisfy $\beta_{i-1}$=from 1 to 1.5, the period of pulse of $\alpha_i$ to be generated by Gate 2 should be in a range of from 1 to 1.5.

By generating $\alpha_i$ (i=from 1 to m) in synchronism with a data reference clock period T, a base clock which is ½ of the data reference clock period T, and a base clock which is ¼ of T in the form of the original reference clock period T as multiplied by a predetermined number, it is possible to vary the width of an actual pulse width commensurate with the variation of T according to the linear velocity.

The above-mentioned recording method can generally offer a wide application to CD-RW mediums. When it is used with the medium according to the first aspect of the present invention, this recording method is useful because a further improved user data area performance can be achieved. Preferably, by combining the recording layer, whose recrystallization speed is high for recording at high linear velocity, with the multilayer structure as adjusted in view of thermal effect, good overwriting is realized at the 1-times velocity when $\alpha_i T$ is 10 nsec or more and more preferably 15 nsec or more. This is true because, as a common knowledge for the 1-times velocity, which is low, the off-pulse section $\beta_i T$ should be increased while the recorded pulse section $\alpha_i T$ should be decreased, but practically for the 1-times velocity, the minimum possible value of $\alpha_i T$ is only $0.05T \approx 12$ nsec, and this figure is difficult to reduce.

6. Recording Method by CAV Operation

The recording method according to the fourth and fifth aspects of the present invention will now be described.

This recording method enables recording with CD-RW not only in CLV mode but in CAV mode; hitherto it was possible only in CLV mode, requiring synchronization in rotation all the time during recording, which would be poor in user data area and seek performance as the week point of CD-RW media. This recording method improves the access and seek performance to a great extent. The recording method is particularly efficient when accessing the packets in radial positions recorded at random as if stepping stones, remarkably increasing the convenience of the recording medium as an external storage device for a computer. Further, hitherto in CLV recording, a large power would be consumed as the motor is speeded up and slowed down due to the variation of angular speed. Whereas in this recording method, it is unnecessary to repeatedly vary the angular speed of the motor, reducing the power consumption of the CD-RW drive by a large extent.

CD-RW is usually in the form of a disc which is 12 cm in diameter and has a recording area (information area) ranging from at least 23 to 58 mm, preferably from 22 to 58 mm in radius. When this disc is rotated at approximately 2,000 r.p.m. which is equivalent to the 4-times velocity on the innermost track of the recording area, the linear-velocity becomes roughly 10 times the reference (1-times) velocity when the light beam is on the outermost track, 58 mm in radius, of the recording area. In short, usually in CAV recording, when the linear velocity on the innermost track is 4 times the reference velocity, that on the outermost track will be roughly 10 times the reference velocity.

At that time, if the data reference clock period T is varied in inverse proportion to the radial distance in such a manner that the product VT of T and the linear velocity V at the individual radial position, the mark length nT is constant, irrespective of the corresponding angular velocity. As a result, uniform-linear-density recording read-compatible with CD is realized for the recording in CAV mode.

Here, the recording area includes, in addition to the user data area, a trial writing area to be used by the system, and lead-in and lead-out areas. Consequently the radial positions, i.e. 22 mm and 58 mm off the disc center, may include roughly ±1 mm in tolerance. Commensurate with this tolerance, frequency values to be used in the following conditions encounter slight errors, which also are allowable.

Figure 6:
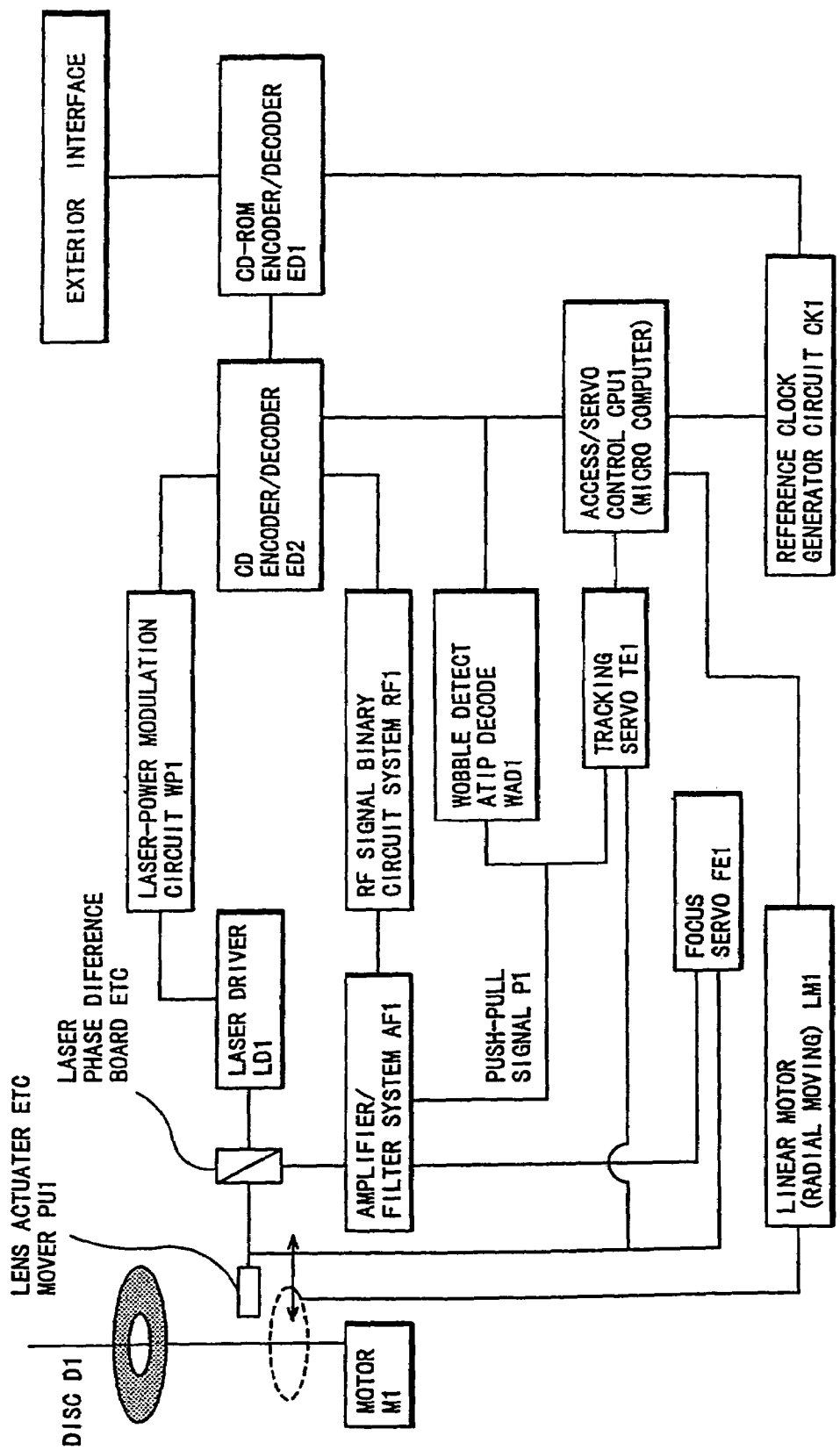
FIG. 6 is a block diagram showing a recording apparatus for carrying out the recording method of the present invention.

FIG. 6 schematically shows a recording apparatus, as one illustrative example, for carrying out the recording method of the present invention.

In FIG. 6, an optical disc D1 comprises a substrate, which has a spiral groove meandering depending on a signal having a carrier frequency $f_{LO}$ whose space frequency is constant, and a recording layer, the signal being modulated by address information. Also the disc D1 has address information identifying recording blocks, each regarded as a recorded information unit located at a given position in the spiral groove, and synchronization signals each identifying the head of a single recording block. In FIG. 6, a rewritable compact disc (CD-RW) is assumed as the optical disc; at $f_{LO}=22.05$ kHz, address information is ATIP (absolute time in pre-groove) information whose carrier frequency $f_{LO}$ has been modulated by ±1 kHz. And when the wobble of the groove meanders in a way that the carrier frequency $f_{LO}$ is 22.05 kHz when retrieving takes place at a linear velocity in a range of from 1.2 to 1.4 m/s.

The optical disc recording/retrieving apparatus 1 has a spindle motor M1 for causing the disc to revolve about its center, as the axis, at a constant angular velocity, and a linear motor serving, in cooperation with a radial moving mechanism (LM1), to radially move an optical pick-up PU1 to a given address. The pick-up PU1, which generates a focused light beam for recording/retrieving, is equipped with a focus servo circuit (FE1) for diverging a focused light beam from a light source, in the form of a laser diode, onto the recording layer surface of the optical disc, and a groove tracking servo circuit (TE1) for controlling the motion of the pick-up PU1 in a way that the focused light beam scans along the spiral groove. In this focus servo circuit, a known method, such as the astigmatic method and the Foucault's method, is employed. In the tracking servo circuit, a known method, such as the push-pull method or the 3-beam method, is employed (as disclosed in a book named "Compact Disc Textbook 3rd Revision" (as literally translated) by Heitaro Nakajima and Hiroshi Ogawa, published from Ohm Co., Ltd., a Japanese publisher).

The optical disc recording/retrieving apparatus 1 further comprises a wobble detecting and decoding circuit (WAD1) for detecting and decoding a carrier frequency $f_{AO}$, address information and a block synchronization pattern from the wobble of the groove, a data-sequence generation circuit for generating a recording data sequence, which is modulated in terms of mark lengths by encoders ED1 and ED2, in synchronism with the head of the recorded block and data reference clock T (frequency $f_{dO}$), and a laser-power modulation circuit (WP1) for modulating the recording laser power in correspondence with the recording data sequence.

The optical disc D1 is driven at a constant angular velocity (CAV) by the motor M1. Specifically, the disc is rotated at a constant angular velocity $\omega_0$ in a range of from 1,900 to 2,000 r.p.m. in a way that the linear velocity on the innermost track, roughly 22 mm in radius, of the recording medium is 4 times of from 1.2 to 1.4 m/s and preferably 4times of 1.2 m/s. The CAV rotation is maintained within an accuracy of several % in rotation jitter by monitoring the rotation of the spindle motor M1 by a tachometer for feedback of a possible difference with a predetermined r.p.m.

A push-pull signal P1 is retrieved via an amplifier/filter system AF1, then a wobble signal is detected, and an ATIP signal is decoded, whereupon a synchronization pattern and address information, which are contained in the wobble signal, are decoded. The address information, the synchronization pattern are consulted with access/servo control CPU1 which controls a given address movement of the pick-up PU1. For control of the address movement, the radial movement, which is caused by a rough movement mechanism driven by the linear motor LM1 with the tracking serve TE1 in OFF state, and the fine adjustment (fine adjustment in inclination of objective lens by CPU1), which is made referring to the ATIP address, with the tracking servo in ON state near a given address, are controlled by CPU1.

If the pick-up PU1 has been confirmed to having reached a given address, a clock of the data reference clock generator circuit CK1 and a synchronization signal of ATIP, whereupon recording is made in a given ATIP frame. In the case of CD-ROM data, firstly ROM data is encoded by the encoder ED1, then CD data is encoded by the encoder ED2. The data bit sequence, which is yet in synchronism with the data reference clock, is converted into a recording pulse sequence by the laser-power modulation circuit WP1 so that a laser driver LD1 is energized to make overwriting.

For retrieving, after the pick-up PU1 has reached a given address, a retrieving signal is retrieved via the amplifier/filter system AF1 and an RF signal binary circuit system RF1. And synchronizing the data reference clock and the EFM frame with each other, the CD data is decoded by encoder ED2, and also CD-ROM data is decoded by encoder ED1.

The optical recording method by dividing the pulse during recording in CAV mode is exemplified by the following two methods, which are similar to the above-mentioned divided pulse method (2).

The First Method:

A method of recording EFM-modulated information in terms of various mark and inter-mark lengths on a rewritable disc-shaped optical recording medium having a phase-change recording layer, which has a recording area, by CAV (constant angular velocity) operation, is carried out in the following manner:

the disc is rotated in a way that a linear velocity on the outermost track of the recording area is at least 10 times a reference velocity (1-times velocity) being within a range of 1.2 m/s to 1.4 m/s, when an individual recorded mark has a time length nT (T is the data reference clock period varying in a way that the product VT with the linear velocity V in the radial position is constant, and n is an integer within a range of from 3 to 11), recording light of erasure power Pe, which is able to crystallize an amorphous-state portion, irradiates inter-mark portions, for the recorded marks, the time length (n−j)T is divided into $\alpha_1 T, \beta_1 T, \alpha_2 T, \beta_2 T, \ldots, \beta_m T, \beta_m T$ (where m=n−1

$\alpha_1$=from 0.75 to 1.25, $\alpha_i$=from 0.25 to 0.75 ($2 \leq i \leq m$), $\alpha_i + \beta_{i-1}$=from 1 to 1.5 ($3 \leq i \leq m$))

in this sequence so as to satisfy $\Sigma_i(\alpha_i + \beta_i) = n - j$ (j is a real number within a range of $0.0 \leq j \leq 2.0$), the recording light of recording power Pw (Pw>Pe, preferably Pw=from Pe/0.3 to Pe/0.6), which is able to melt the recording layer within the time length $\alpha_i T$ ($1 \leq i \leq m$), irradiates the recording layer, and the recording light of bias power Pb ($0 < Pb \leq 0.5 Pe$) within the time length $\beta_i T$ ($1 \leq i \leq m$) irradiates the recording layer to overwrite, and for any radial position, with $\alpha_1$ and $\alpha_i + \beta_{i-1}$ (i=from 3 to m, preferably i=from 2 to m) kept constant, $\alpha_i$ (i=from 2 to m) is monotonically decreased to the innermost track.

Namely, the number of sub-divided pulses is fixed at m=n−1, $\alpha_1$ is in a range of from 0.75 to 1.25, $\alpha_i$ (i=from 2 to m) is in a range of from 0.25 to 0.75, $\alpha_i + \beta_{i-1}$ (i=from 3 to m) is in a range of from 1.0 to 1.5. These values are fixed irrespective of the radial position. With these parameters fixed, by varying only the reference clock period T by a simple circuit as shown in FIG. 5, it is possible to generate a recorded pulses with ease. Here $\alpha_i$ (i=from 2 to m) and/or $\alpha_i + \beta_{i-1}$ (i=from 3 to m) are preferably constant irrespective of i. $\alpha_1$ also is preferably a constant value and more particularly fixed to 1. If $\alpha_1 = 1$ and $\alpha_i + \beta_{i-1} = 1$ (i=from 2 to m), every recorded pulse $\alpha_i T$ (i=from 1 to m) is generated in synchronism with the reference clock T, simplifying the divided pulse generator circuit.

This recording method is useful to make particularly good recording and/or retrieving when applied to the rewritable compact disc (CD-RW) of the present invention to which disc overwriting can be made in a wide range of linear velocities, i.e. from 4-times to 10-times velocities.

The second optical recording method for recording in CAV mode:

the disc-shaped optical recording medium is rotated in a way that a linear velocity at the outermost periphery of the recording area is as high as 10 times of a reference velocity (1-times velocity) as defined to be within a range of from 1.2 m/s to 1.4 m/s, if a time length of an individual recorded mark is nT (T is a data reference clock period varying according to its radial position in a way that a product VT (V is a linear velocity in the radial position is constant, and n is an integer within a range of from 3 to 11), recording light of erasure power Pe, which is able to crystallize an amorphous-state portion, irradiates inter-mark portions, for the recorded marks, the time length (n−j)T is divided into $\alpha_1 T, \beta_1 T, \alpha_2 T, \beta_2 T, \ldots, \alpha_m T, \beta_m T$ (where m=n−1, $\alpha_1/\alpha_i$=from 0.3 to 0.7 (i is an integer of from 2 to m), $\alpha_i + \beta_{i-1}$=approximately 1 ($3 \leq i \leq m$)) in this sequence so as to satisfy $\Sigma_i(\alpha_i + \beta_i)$=n−j (j is a real number of $0.0 \leq j \leq 2.0$), within the time length $\alpha_i T$ ($1 \leq i \leq m$), the recording light, whose record power Pw (Pw>Pe) is enough to melt the recording layer, irradiates the recording layer, and within the time length $\oplus_i T$ ($1 \leq i \leq m$), the recording light of bias power Pb ($0 < Pb \leq 0.5Pe$) irradiates the recording layer to make overwriting, and each of $\alpha_i T$ (i=from 2 to m) and $\alpha_i + \beta_{i-1}$ (i=from 3 to m) is constant for any radial position.

In this case, preferably, $\alpha_i$ is constant irrespective of i ($2 \leq i \leq m$), $\alpha_i + \beta_{i-1}$ is constant ($2 \leq i \leq m$) in a range of from 1 to 1.5 irrespective of i, and in addition, $\alpha_1 T$ and $\alpha_i T$ (i=from 2 to m), $\alpha_i + \beta_{i-1}$ (i=from 3 to m) are preferably constant irrespective of the linear velocity. $\alpha_i T$ may be combined with a constant time $T_{top}$ and a constant $\alpha_1'$ irrespective of the linear velocity, as $\alpha_1 T = T_{top} + \alpha_1' T$.

In order to accomplish that $\alpha_1 T$ and $\alpha_i T$ (i=from 2 to m) is constant irrespective of the linear velocity, T is monotonically increased for the lower linear velocity, and $\alpha_1$ and $\alpha_i$ are monotonically reduced for the lower linear velocity. Accordingly, the lower the linear velocity, the higher the cooling rate of the recording layer can be increased, requiring only a pulse generator circuit.

In the above-mentioned second recording method, the wording "$\alpha_1 T$ or $\alpha_i T$ (i=from 2 to m) is constant" means: it is constant with an allowed resolution of set values of the divided pulse generator circuit with a tolerance of roughly ±10%.

In either of the first and second recording methods, $\beta_m$ may be either constant or variable, irrespective of the linear velocity. When it is variable, $\beta_m$ is preferable to be increased further for the inner radial position, namely, for the lower linear velocity.

More preferably, the radial direction is divided into a plurality of virtual zones, and $\beta_m$ is varied stepwise one step for each zone. Particularly in a range of from 0 to 1.5, $\beta_m$ is preferably monotonically increased further for the radially inner zone, namely, the lower-linear-velocity zone so that the cooling rate of the recording layer for the lower linear velocity can be efficiently prevented from lowering. In this case, if $\beta_m$ is too large, erasure of the inter-mark following the tail of the mark can be only incomplete even for relatively low linear velocities.

For realizing the above-mentioned pulse strategy that varies $\beta_m$, in FIG. 5, it is enough that a single fixed-length pulse (Gate1) of a width $\alpha_1 T$ and a plurality of fixed-length pulses (Gate2) of the following width $\alpha_i T$ (i=from 2 to m) are generated, while only Gate3 determining the endmost off-pulse length.

Further, as described above in connection with the second aspect to the present invention, for any radial position, $\alpha_i T$ (i=from 1 to m) and $\beta_i T$ (i=from 1 to m−1) are preferably 10 nsec or more.

In the above-mentioned first and second recording methods, it is preferable that $\beta_m$ for the maximum linear velocity during overwriting is $\beta_{Hm}$ and $\beta_m$ for the minimum linear velocity is $\beta_{Lm}$, and $\beta_m$ for the linear velocity during each overwriting is obtained by interpolating from values of $\beta_{Lm}$ and $\beta_{Hm}$. And Pb, Pw and Pe/Pw ratio are preferably constant irrespective of the linear velocity during overwriting.

In this case, it is preferable that information relating to the recording power and divided pulse information are previously described on the disc in terms of uneven-pit (phase-depth modulated pits) or groove wobble signals. As a result, it is possible to automatically select an optimum pulse strategy. The information to be described is exemplified by all or part of the values of Pe/Pw ratio, optimum recording power $Pw_o$, optimum erase power $Pe_o$, optimum bias power $Pb_o$, $\alpha_1$, $\alpha_i$, $\alpha_1 T$, $\alpha_i T$, $\alpha_i + \beta_{i-1}$, $\beta_{Lm}$ and $\beta_{Hm}$.

Alternatively, the recording power information may be the optimum recording power $Pw_o$ in absolute value, and for another alternative, it may be an parameter to be referred in trial writing to determine $Pw_o$.

In the recording method of the present invention, various methods may be suggested for generating data reference clock inverse proportional to the radial distance and reference clock period, but the following examples (i) through (iv) are preferred. Here, it is assumed, as an illustrative example, that the carrier frequency of wobble $f_{LO}$ at the 1-times velocity in CLV mode is approximately 22.05 kHz, the linear velocities at the innermost and outermost tracks of the recording area in CAV mode are respectively the 4-times and 10-times velocities, and the data reference clock is 196 times the carrier frequency. The term "approximately" means a tolerable system power, which is usually below 0.1 kHz.

[Data Reference Clock Generating Method (i)]

The medium has a spiral groove to which wobble having a carrier frequency of $f_{LO}$=approximately 22.05 kHz in terms of the frequency at the 1-times velocity is imparted. This medium can be used also as a CD-RW medium for usual recording at high velocity in CLV mode.

Assuming that the wobble of the meandering groove is constant at a frequency corresponding to the carrier frequency $f_{LO}$=approximately 22.05 kHz, during the CAV rotation, the carrier frequency $f_{AO}$ of the wobble to be retrieved according to the radial position, namely, according to the linear velocity corresponding to the radial position varies as apparent values. And by multiplying the carrier frequency $f_{AO}$ of the wobble, which is to be retrieved at the radial position during CAV rotation, by a multiplier of 196, it is possible to obtain a data reference clock frequency proportional to the radius.

As recording takes place in synchronism with the data reference clock frequency proportional to the radius, it is possible to realize the mark-length-modulated recording at a constant linear in spite of CAV mode.

Specifically, given that the wobble signal has been described on the substrate in the 1-times-velocity mode of CLV rotation, if the medium is rotated at CAV, it is possible to make constant in space frequency, namely, in linear density by generating a data reference clock frequency using the same multiplier irrespective of the radial position.

For example, if the linear velocity on the innermost track of the recording area is the 4-times velocity and the linear velocity on the outermost track of the recording area is the 10-times velocity, the carrier frequency $f_{AO}$ of the wobble to be retrieved in CAV mode will be approximately 22.05×4=88.2 kHz on the innermost track and approximately 22.05×10=220.5 kHz on the outermost track of the recording area, respectively. The frequencies 196 times these resulting frequencies, i.e. approximately 17.287 MHz (on the innermost track of the recording area) and approximately 43.218 MHz (on the outermost track of the recording area) are data reference clock frequencies. In this case, the data reference clock period T will be approximately 57.8 nsec for the innermost track of the recording area and approximately 23.1 nsec for the outermost track of the recording area, respectively. In the intermediate radial positions, it is suffice that the data reference clock period inverse proportional to the radius is generated.

In the meantime, because its frequency is modulated by ±1 kHz with an ATIP signal, the wobble signal has an actual frequency is 22.05±1 kHz, and a cycle of the wobble signal encounters with fluctuations of approximately ±4.5%. If data reference clock period were obtained by merely multiplying this fluctuating signal a predetermined number of times, yet a deviation of ±4.5% of the mark length would have occurred. Generally in the mark-length recording, this deviation is called "phase shift"; in the presence of phase shift of nearly 5%, there would be a fear that proper demodulation might not be demodulated.

Therefore, likewise this case, it is necessary to extract only the carrier frequency $f_{AO}$ from the wobble signal, whose frequency has been modulated, before multiplying the carrier frequency $f_{AO}$ a predetermined number of times, in the following manner.

First of all, as usual, with the disc kept rotating, a push-pull signal is detected to retrieve the wobble signal.

$F_{AO}$ varies from 88.2 kHz to 220.5 kHz by a width of 132.3 kHz throughout the innermost track radius $R_{in}$ to the outermost track radius $R_{out}$ as mentioned above, in response to which data reference clock also varies from 17.287 MHz to 43.218 MHz. (In the meantime, the repeating frequency of an 11T mark and an 11T space portion varies from approximately 786 kHz to 1.96 MHz.)

Consequently, the data component mixed in the push-pull signal is removed off by a band filter or a low-pass filter, which allows only a narrow range of frequency containing the above-mentioned $f_{AO}$ to pass.

Then information about the radius R, where the radially movable pick-up, is obtained by a drive system, and in synchronism with the obtained information, an estimating frequency $f_{RO}$ (kHz) for estimating $f_{AO}$ approximately is generated in accordance with the following formula:

$$f_{RO} = 88.4 + 132.3 \times (R - R_{in})/(R_{out} - R_{in}) \quad (3)$$

And by extracting (tuning) the carrier frequency $f_{AO}$ with sweeping a reference frequency in a narrow range near the estimation frequency $f_{RO}$, it is possible to detect the carrier frequency $f_{AO}$ with ease. Then a reference data clock commensurate with the disc radius is obtained as the detected carrier frequency $f_{AO}$ is multiplied by 196.

Usually, since the address information on the disc is incorporated as ATIP information as modulated by ±1 kHz, a wobble retrieving signal is modulated in frequency using the detected carrier frequency $f_{AO}$ to detect the ATIP information, and the address recorded in a sub-code in terms of absolute time is confirmed, whereupon data synchronization is established from a synchronization pattern contained in the ATIP signal. As a result, the data reference clock synchronized with not only the synchronization pattern of the ATIP signal but also the disc rotation.

After that, a recording pulse sequence for overwriting user data to a specified EFM frame is generated in synchronism with the synchronization pattern to make recording.

Figure 7A:
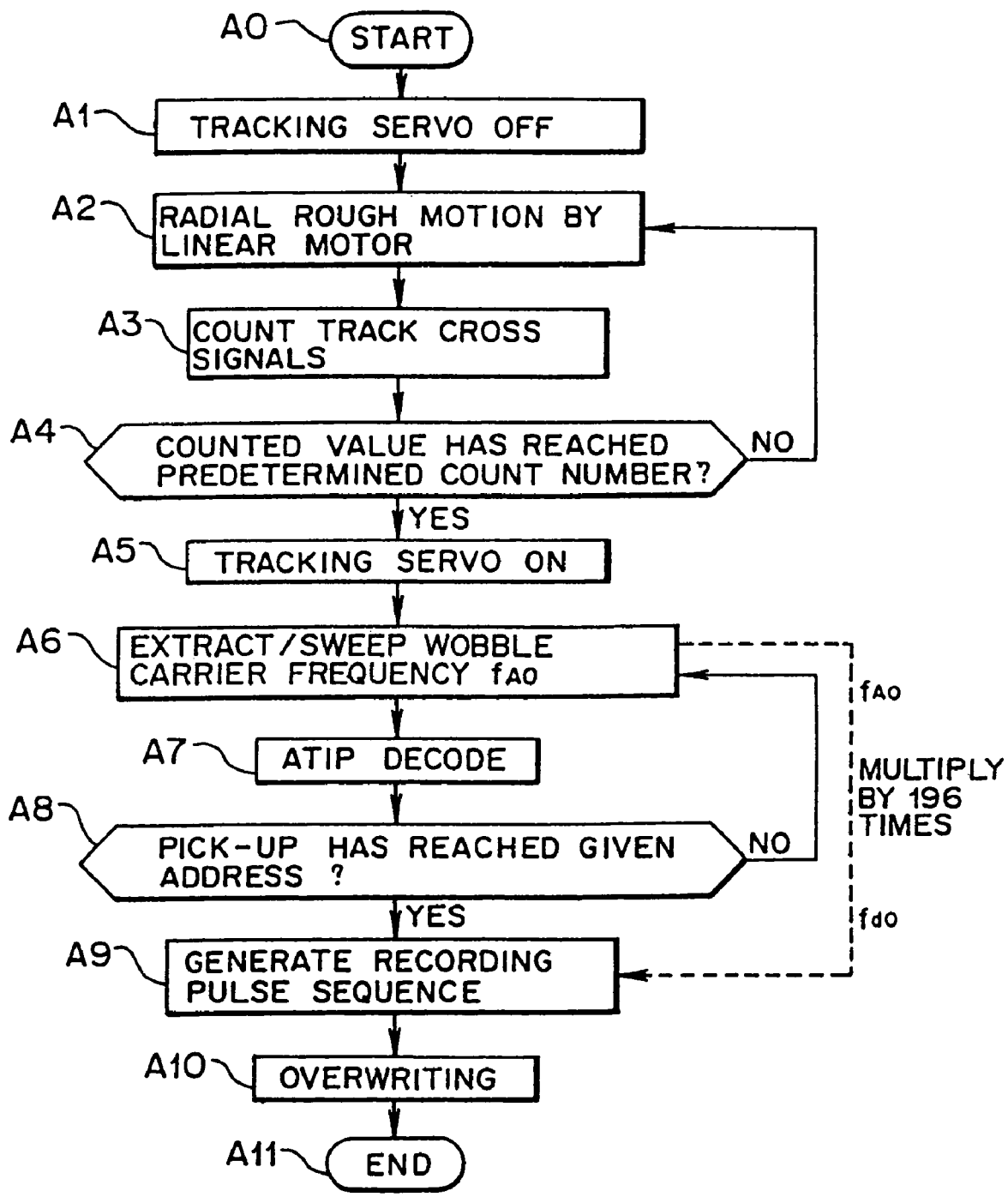
FIGS. 7(a) and 7(b) are flowcharts illustrating flow of operation how to generate a data reference clock to make recording in the present invention.

FIG. 7(a) shows one example of flow of operation in which the pick-up is moved to a given address in CAV mode in accordance with this method (i), then the carrier frequency of wobble is extracted to generate a data reference clock. In FIG. 7(a), a dotted line indicates the flow of signals $f_{AO}$, $f_{dO}$ rather than the flow of operation.

First of all, likewise CD to be retrieved by the usual CAV method, with the tracking servo in OFF state at step A1, the pick-up is moved to a given radial by rough motion of the linear motor at step A2, and track cross signals are counted to grip the number of moved tracks at step A3. And it is discriminated whether the counted value has approached a predetermined count number necessary to reach the target track at step A4, the tracking servo is made effective at step A5.

Then at step A6, the wobble signal is retrieved from the push-pull signal to extract $f_{AO}$. At that time, with consulting with and tuning with the estimation value $f_{RO}$, which is obtained by the above-mentioned formula (3), of the carrier frequency of the wobble in the radial position where the track is located as a demand arises, $f_{AO}$ is extracted.

After or simultaneously with extraction of $f_{AO}$ the ATIP information is demodulated at step A7 to decode and get absolute information contained in the ATIP information. At step A8, consulting with the absolute time, the pick-up is moved to a target address where data is to be recorded.

At step A9, taking synchronization between the data reference clock signal $f_{dO}$, which has been obtained by multiplying $f_{AO}$ with 196, and the synchronization pattern contained in the ATIP information, the recording pulse sequence based on EFM data to be recorded is generated at step A10 to make overwriting.

In the foregoing illustrative example, the address information and the synchronization pattern are recorded as ATIP information. Alternatively, as a substitute for the ATIP information, ADIP (Address In Pregroove) information (disclosed in a book named "All about MD" (as literally translated) by Masayuki-Kawamura, published (1998) from Radio Wave Press, a Japanese press company) to be used with a mini disc (MD) may be recorded.

In general, multiplying a frequency by 100 or more encounters with error. Consequently the following both methods (ii) and (iii) are used to increase accuracy of data reference clock frequency.

[Data Reference Clock Generation Method (ii)]

From absolute time information mm:ss:ee (m, ss, ee respectively stands for minutes, seconds, frames) in an address where recording is to made on the medium, a radius position of the address is found out by computation.

Because the time length of 1 frame of ATIP signal is usually equivalent to an inverse number of a frequency of 75 Hz, the space length of 1 frame is $v_0/75$ and the total frame length to reach mm:ss:ee frame from 00:00:00 is $(v_0/75) \times \{75 \times (60 \times mm+ss)+ee\}$ where $v_0$ is the 1-times linear velocity.

Here assuming that the radius of absolute time 00:00:00 is regarded as $R_{in}$ and the track pitch is TP, the total extension of the groove to ($N_T$+1)-th track when the radius of 0-th track is $R_{in}$ is expressed by the following mathematical formula (4).

$$\sum_{N=0}^{N_T} (N \cdot TP + R_{in}) \cdot 2\pi \quad (4)$$

The total extension of the groove to (N+1)-th track is expressed by the following mathematical formula (5).

$$\sum_{N=0}^{N_T+1} (N \cdot TP + R_{in}) \cdot 2\pi \quad (5)$$

$N_T$ such that the above-mentioned total frame length is in a range between the value of the mathematical formula (4) and that of the mathematical formula (5) represents a track position of the address. This is the same procedure as when the number of tracks to reach the target address is estimated during moving the pick-up.

From such number of tracks NT from the innermost track, the radial position R is computed by the following formula (6):

$$R = R_{in} + N_T \cdot TP \quad (6)$$

In accordance with this R, an estimation frequency $f_{RO}$ is generated using the formula (3). Because 1 frame as the minimum unit of address information of ATIP is 1/75 sec, $f_{RO}$ is updated at least every 1/75 sec. This is equivalent to only approximately 1/10 of the track even on the radial position of 22 mm off the disc center, so any possible deviation of radial position is negligible.

Even in a recording area, such as a trial writing area and lead-in area, inside 00:00:00, a precise R can be computed by automatically subtracting $N_T$ from $R_{in}$ if $N_T$ is set so as to become negative at the radial position inside 00:00:00.

Alternatively, because the radial position computed from the address information using the formula (6) is a fairly precise value with only a small error corresponding to at most several tracks, a linear velocity for the radius and a data reference clock at the linear velocity, $f_{d0}$ (MHz)=1/T, can be estimated directly from R by the following formula (7):

$$f_{d0} = f_{in} + 25.9308(R - R_{in})/(R_{out} - R_{in}) \quad (7)$$

Here $f_{in}$ is the data reference clock period at $R_{in}$, being usually 17.2872 MHz.

Figure 7B:
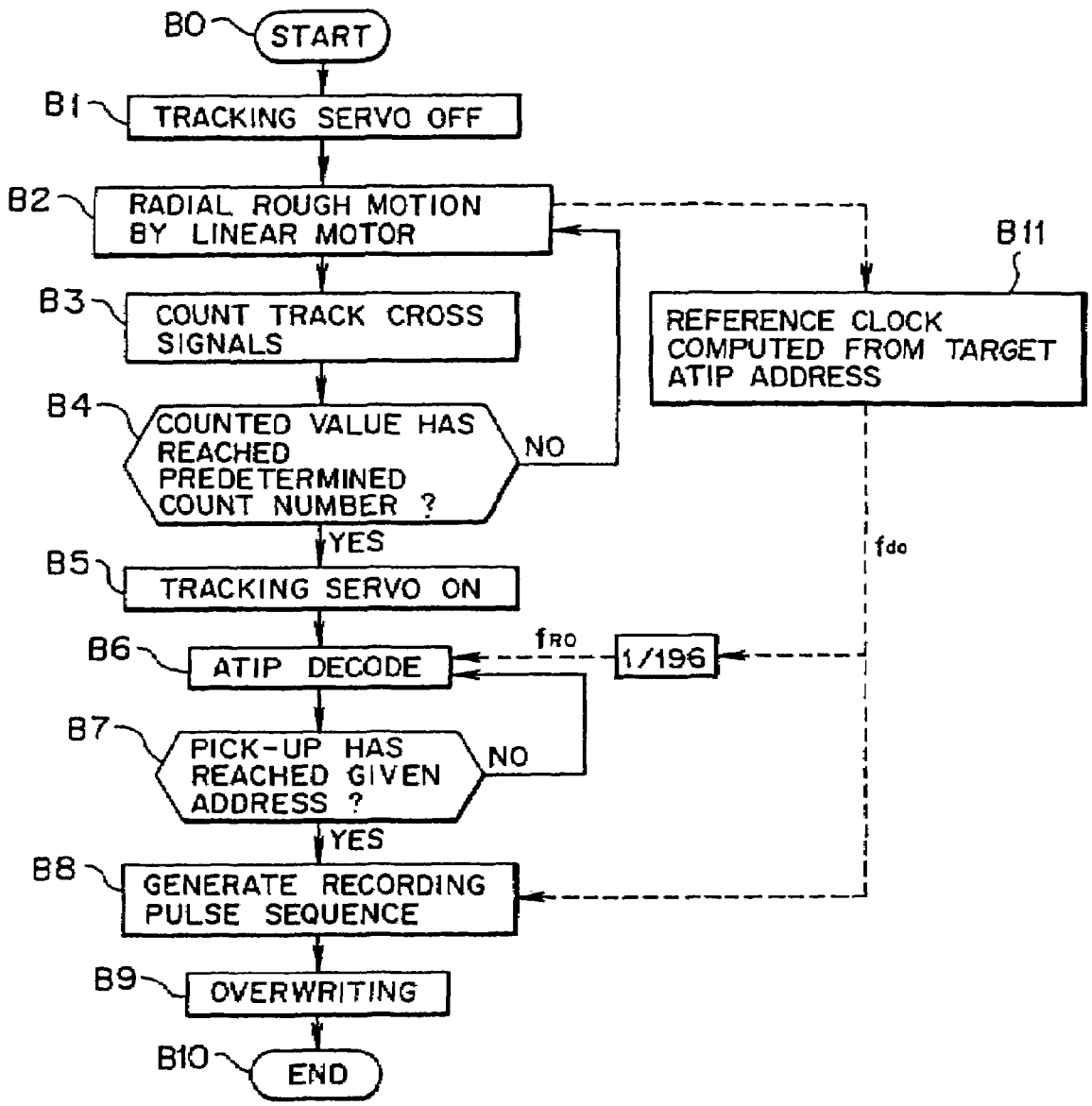

FIG. 7(b) illustrates how to generate a reference clock that is in synchronism with the rotation utilizing a reference signal $f_{RO}$. In FIG. 7(b), a dotted line indicates flow of the reference signal, etc. rather than flow of operation. In FIG. 7(b), steps B1 through B5 are identical with steps A1 through A5 of FIG. 7(a). At step B11 where this signal flow proceeds parallel to the flow of operation of FIG. 7(b), first of all, a reference clock period $f_{d0}$, which has been generated, based on the formula (7), from the radial position information computed from the absolute time address of the target address, is obtained, and then the obtained reference clock period $f_{d0}$ is divided into 1/196 to obtain a reference signal $f_{RO}$ of the carrier frequency of the wobble. Then in step B6, $f_{RO}$ is directly FM-demodulated as the carrier frequency to decode ATIP. After the start of decoding, $f_{d0}$ will be varied referring to the absolute time information of ATIP. By confirming at step B7 that the pick-up has arrived at a given address and then synchronizing $f_{d0}$ with the synchronization pattern of ATIP, a reference clock in synchronism with the rotation of the disc is obtained so that a recording pulse sequence can be generated at step B8. Then at step B9, overwriting is made with this recording pulse sequence. Even when the then-current address has been continuously moved to a great extent as overwriting of huge recording information progresses, recording with substantially uniform linear density within a tolerance of mark length can be accomplished, irrespective of the change of radial position, by automatically updating $f_{d0}$ based on the address information of ATIP, if necessary. This tolerance is roughly ±1%.

[Data Reference Clock Generation Method (iii)]

The disc substrate has, in addition to a wobble groove, single-frequency clock marks, whose frequency is higher than the carrier frequency of $f_{LO}$=approximately 22.05 kHz and which marks are imparted in CLV mode. With the disc kept in rotation at a constant angular velocity, the clock marks are separated and detected and then multiplying a repeating frequency, which is obtained as the result of separation and detecting, by a predetermined number to generate a data reference clock. The data reference clock thus obtained is then synchronized with a synchronization pattern of the address signal, such as ATIP information, and the rotation of the disc.

If the frequency of the clock mark is within an intermediate frequency band between the frequency band of the wobble signal and the frequency band of the data, it can be sorted out from either of the wobble frequency and the data frequency with ease using a band-pass filter. Namely, the clock mark frequency is preferably 2 or more times of the wobble frequency in terms of the frequency at the 1-times velocity and roughly 1/22 (equivalent to a repeating space frequency of an 11T mark and a space) or less of the data reference clock at the 1-times velocity.

More specifically, on the medium, clock marks are imparted which are arranged in a frequency of roughly from 60 to 196 kHz, namely, in a second frequency $f_{L2}$ that is 2 to 8 times of 22.05 kHz.

Further, with $f_{L2}$ preset to 1/n of a data reference clock frequency of 4.3218 MHz (n is an integer), $f_{L2}$ is multiplied by n to obtain data reference clock.

Having integrated the foregoing conditions, as a preferable feature, if a frequency which are 2, 4 or 7 times of 22.05 kHz is employed as $f_{L2}$, it can be sorted out from either of the wobble frequency and the data frequency bands as a frequency of 1/n of 4.3218 MHz.

However, in varying the linear velocity on the same medium from the 4-times velocity to the 10-times velocity throughout the recording area from the innermost track to the outermost track as mentioned above, separation of frequency bands is somehow complex as the frequency bands of the wobble, clock marks and data are respectively distributed to about 2.5 times throughout the recording area from the innermost track to the outermost track.

Specifically, at the velocity in the range of from the 4-times to 10-times velocities, the carrier frequencies of the wobble are distributed from 88.2 kHz to 220.5 kHz as mentioned above, and a data component is distributed in a range of from approximately 786 kHz to approximately 1.96 Mhz as a repeating frequency of an 11T mark and an inter-mark space. Assuming that fL2 is 4 times of fL0=22.05 kHz, namely, $f_{L2}$=88.2 kHz, the repeating frequency of the clock mark at a velocity 4 to 10 times the 1-times velocity in CAV mode is distributed throughout the frequencies ranging from 352.8 kHz to 882 kHz.

Therefore, it is difficult to sort out the clock mark frequency throughout the entire recording area by a single band-pass filter. Consequently, as a preferable feature, with a plurality of virtual zones provided for every radius, the frequency band of the filter is changed for every zone.

Further, if $f_{L2}$ is allowed to be n/2 times the wobble frequency, the repeating frequency of the clock mark can be sorted out by a single band-pass filter.

For example, if $f_{L2}$ is allowed to be 3.5 times of $f_{L0}$=22.05 kHz (equivalent to 1/56 of 4.3218 MHz), namely, $f_{L2}$=77.175 kHz, the repeating frequency of the clock mark will be in a range of from 308.7 kHz to 771.75 kHz at the 4-times to 10-times velocities in CAV mode so that it can be differentiated from the frequency component of the data, which is in a range of from approximately 786 kHz to approximately 1.96 MHz, by a width of roughly 10 kHz.

The clock mark is exemplified by a pit or an amorphous mark disposed between the grooves aid a uniquely large, independent wobble having a short space wavelength imparted to the groove. In the latter, the wobble for clock mark has preferably a large amplitude in a range of roughly 50 through 200 nm as compared with roughly 20 through 50 nm of the wobble amplitude (peak-to-peak) in usual CD-RW. More preferably such clock mark extends over and across, at least halfway, a ridge or a gorge of the usual wobble.

The physical length of the clock mark is preferably shorter than a 3T mark (approximately 0.8 μm) so that the clock mark can be sorted out from the data frequencies with ease by a band-pass filter.

As is understood from the foregoing, when employing the above-mentioned method (iii), as a preferred feature according to the first aspect of the present invention, the wobble groove has a wobble signal, whose frequency is modulated by ±1 kHz according to on ATIP information with a carrier frequency of approximately 22.05 kHz in terms of the frequency at the 1-times velocity, and also has clock marks arranged along said wobble groove at a repeating frequency in a range of from 2 to 8 times of 22.05 kHz.

By substituting $f_{d0}$ of FIG. 7(a) with the frequency, $f_{L2}$=77.15 kHz, which has been generated from such clock mark, and 56 times of $f_{L2}$ is treated as the data reference clock frequency $f_{d0}$, it is possible to use the flowchart of FIG. 7(a) as it is.

[Data Reference Clock Generation Method (iv)]

This is a method in which a disc-shaped medium is used; the disc substrate has a groove having a wobble signal whose frequency is constant when the linear velocity is constant. And the wobble groove has as address information and a synchronization pattern in terms of whether the wobble is modulated in phase or whether a specified position is devoid of wobble (to zero the amplitude). Namely, in this method, for this medium, it is preferable to use the medium according to the first aspect of the present invention.

In this case, it is possible to generate a precise reference clock by detecting the frequency of wobble with the disc rotating at a constant angular velocity, which would cause to loose a complete read-compatibility with the existing CD-RW because of the absence of any ATIP signal and which would not be influenced by fluctuation of the groove meandering frequency due to frequency modulation, and by directly multiplying the detected frequency by a predetermined number. This reference clock can be synchronized with the synchronization pattern of the address information and the rotation of the disc in accordance with the address information and the synchronization information in the same manner as that described in connection with the method (I).

Assuming that the wobble frequency in this case is 1/n (n is an integer), roughly 1/22-1/50, of the data reference clock frequency $f_{d0}$, it is possible to reduce multiplication errors so that the wobble frequency can be separated from the data frequency band. By substituting $f_{d0}$ of FIG. 7(a) with this wobble frequency, it is possible to use the flowchart of FIG. 7(a) as it is.

The foregoing is an illustrative example of the method: in a blank disc in unrecorded state or a disc having a recorded area and an unrecorded area, from information previously described on the substrate as by groove wobble, a data reference clock synchronized with rotation of the disc and inverse proportional to the radius, and address information is read, whereupon a writing signal synchronous with the address is generated.

Alternatively, during manufacturing of a disc or at the first use of an unrecorded disc, formatting may be made to record address information, synchronization information and other information throughout the entire recording area of the disc in terms of EFM-modulated signal. Subsequently this recorded signal may be utilized.

The purpose of formatting is only to record necessary data uniformly throughout the entire disc surface; such necessary data should by no means be recorded in CAV mode and may be recorded in CLV mode at high velocity, e.g. 8-times velocity. As an alternative, even in CAV mode, a data reference clock generator circuit may be employed as a separate unit to generate data that is synchronized with the disc rotation and increases in frequency in proportion to the radial position. And recording may be made as the data reference clock is dynamically swept off.

From the EFM-modulated signal having been recorded, the data reference clock can be directly extracted, increasing the accuracy of the clock period and of synchronization.

The formatting procedure is exemplified by the following methods (v) and (vi):

[Data Reference Clock Generation Method (v)]

This is the method in which absolute time information in sub-code is previously recorded as an EFM-modulated signal on the medium throughout the entire recording area.

The DFM-modulated signal is detected during recording on the medium being rotated at a constant angular velocity, and then the data reference clock and the address information are obtained from the EFM-modulated signal. This clock is in inverse proportion to the radius and is synchronized with the disc rotation of the disc and the synchronization pattern of the sub-code. Then a writing signal synchronized with the same clock and the address signal is generated.

If the absolute time is previously recorded in sub-code throughout the entire recording area as an EFM-modulated signal, user data is recorded as arbitrary data(usually a series of 0).

In this formatted disc, all the EFM-modulated signal and sub-code information contained in it become accessible by the same method as CD-ROM to be retrieved in CAV mode. Then from the EFM-modulated signal, data reference clock period can be extracted.

This method is suitable when used in the situation where, like a postscript in a so-called multi-session method, data is relatively long and is to be added to the outer side of a continuous recorded area extending from the inner side of the disc.

[Data Reference Clock Generation Method (vi)]

This is the method in which a block structure defined in DC-ROM specifications (so-called Yellow Book) is previously recorded as an EFM-modulated signal on the medium throughout the entire recording area.

During recording on the medium being rotated at a constant angular velocity, the EFM-modulated signal is detected, and a data reference clock and address information are obtained from the detected EFM-modulated signal. This clock is in inverse proportion to the radius and in synchronism with the rotation of the disc and a synchronization pattern of sub-code. Then a writing signal synchronous with the clock and the address signal is generated in the same manner as that described above.

Specifically, first of all, a block structure composed of 98 EFM frames (2,352 bytes) as a unit is previously recorded throughout the entire recording area of the medium according to the CD-ROM format.

The block structure is a logic data structure defined in CD-ROM specifications.

The individual blocks contains, in part of user data, a logic address called the header and a synchronization signal, which are also recorded during formatting.

Data is recorded in units each being composed of 98 frames. Firstly, object data to be recorded is divided for every 2,048 bytes, and synchronization information of 12 bytes and a header of 4 bytes are added to each sub-divided information.

Then the header and data except synchronization pattern are scrambled, and ECC (Error Correction Code) data is added. The resulting data and the above-mentioned synchronization information added are interleaved with each other, whereupon the rearranged data is divided into 98 frames.

For each frame, the EFM frame synchronization and sub-code are added to the frame head, and ECC data computed from the data of each frame is newly added to the frame middle and the frame tail.

The sub-code contains various items of information such as absolute time information; of 98 frames, only 0th and first frames each contain a frame synchronization signal.

In this manner, EFM-modulated signal to be recorded is created.

Preferably, formatting is made in the random packet write method in accordance with UDF (Universal Disk Format) version 1.5 and forwards so that the above-mentioned block structure is recorded even when formatting an unrecorded disc. The random packet write method is legalized as a code by OSTA (Optical Storage Technology Association, an American domestic business circle). Formatting for packet write is also defined in Orange Book Part 3, which is CD-RW specifications.

But, partly due to local overwriting, some discontinuation of sub-code data could occur in a line section between packets (1 packet is composed of 16 or 32 blocks). Consequently it is preferred to have access by consulting the block address recorded in a user data section of each block rather than address information contained in the sub-code.

This method is particularly useful when applied to the so-called random packet write method in which data to be added is in the form of a short fixed-length packet and is overwritten in a random position.

Figure 8:
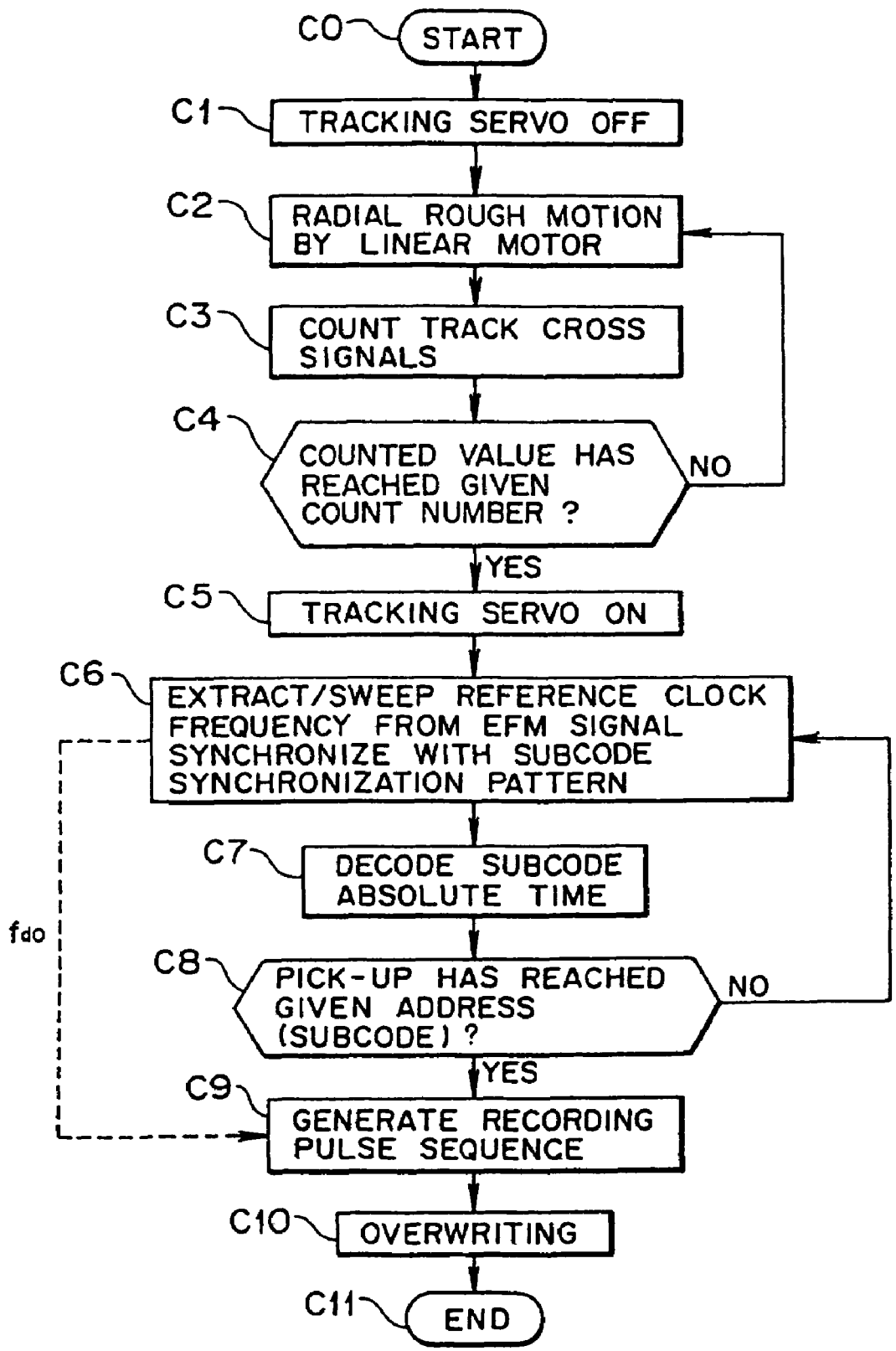
FIG. 8 is another flowchart illustrating how to generate a data reference clock to make recording in the present invention in an alternative way.
Figure 9:
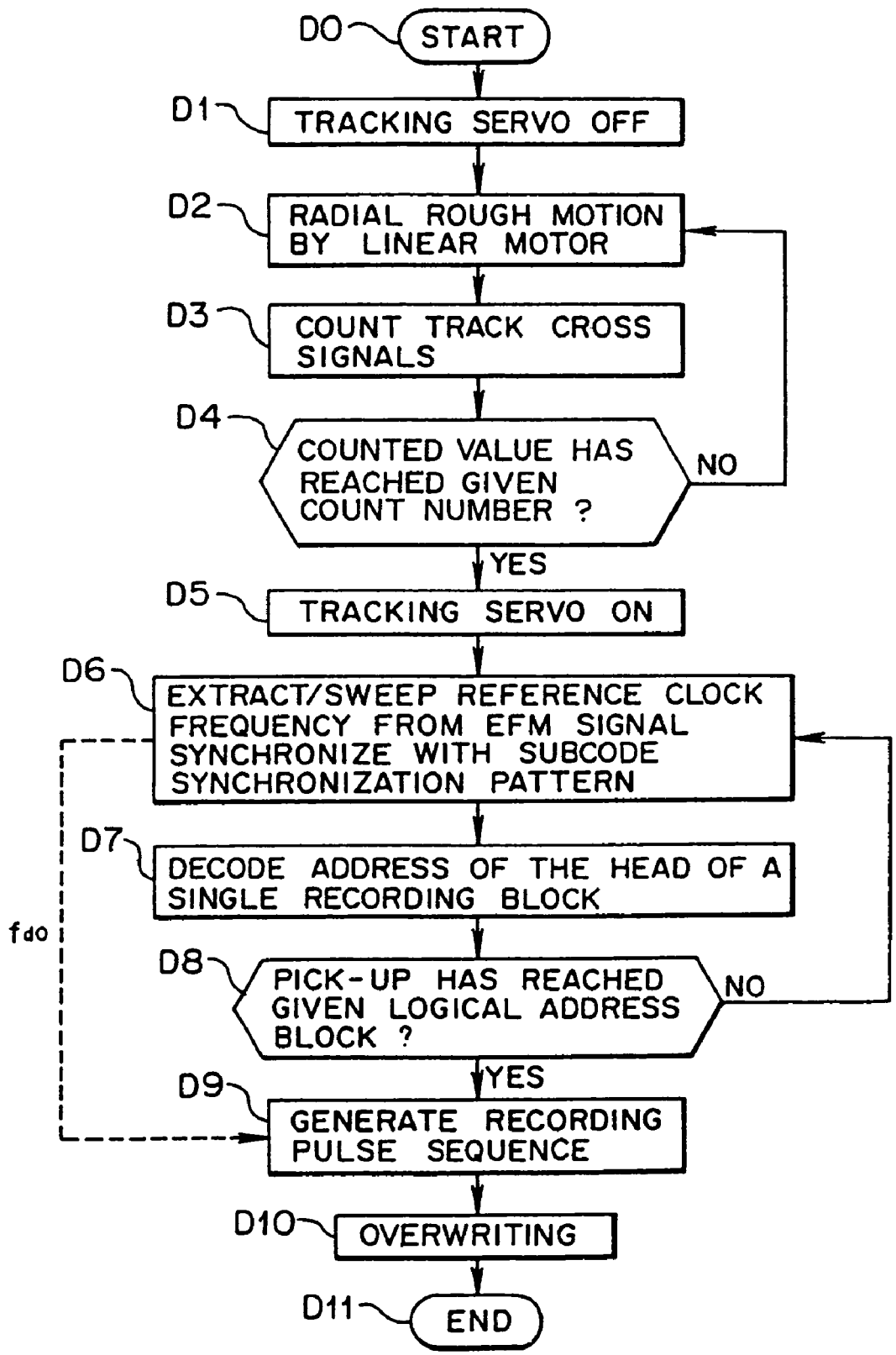
FIG. 9 is still another flowchart illustrating how to generate a data reference clock to make recording in the present invention in another alternative way.

FIGS. 8 and 9 respectively illustrate one example of scheme to generate a data reference clock by moving the pick-up to a given address in CAV mode in accordance with the above-mentioned method (v) or (vi) and then extracting the carrier frequency of wobble.

First of all, likewise usual CD to be retrieved by CAV method, with a tracking servo in OFF state, the pick-up is moved to a given radial position by rough motion of a linear motor and, in the meantime, track cross signals are counted to grasp the number of tracked the pick-up has crossed. When the counted value has approached to a preset count number, which represents the remaining tracks to cross to reach a target track, the tracking servo is actuated to control the after then movement of the pick-up.

Here at step C6 or D6, also likewise the CD-ROM retrieving system in CAV mode, EFM data is retrieved from a recorded RF signal, and then a data reference clock is extracted from the EFM data.

In the case of utilizing the sub-code, at step C6 synchronization is established between the data reference clock and the rotation of the disc from a frame synchronization system of the sub-code, and subsequently at step C7 address information is obtained from the sub-code Q channel.

In the case of utilizing the block structure of CD-ROM data, at step D6 synchronization is established by consulting with 12-byte synchronization information at each block head, and subsequently at step D7 address information is obtained the following header.

Further, in either case, after confirmation is made at step C8 or D8 that the pick-up has arrived a given address, the address information is converted into a recording pulse sequence at step C9 or D9, and subsequently at step C10 or D10 object data is overwritten in the given address.

[Data Reference Clock Generation Method (vii)]

In the above-mentioned method, there is a basic premise that CAV rotation per se is independently kept in rotational accuracy. Alternatively a feedback loop may be provided between a CAV rotation system and a reference clock reference signal $f_{R0}$ to secure a precise synchronization between the rotation system and the data reference clock. Namely, CAV rotation is PLL (phase lock loop) controlled so as to be synchronized with a computational clock frequency (i.e., the reference signal $f_{R0}$) on a desired radius, despite generating a reference clock frequency directly, or via a reference signal, from a wobble retrieving signal and a clock mark at a desired radius or from a sub-code of a recorded signal.

Figure 15:
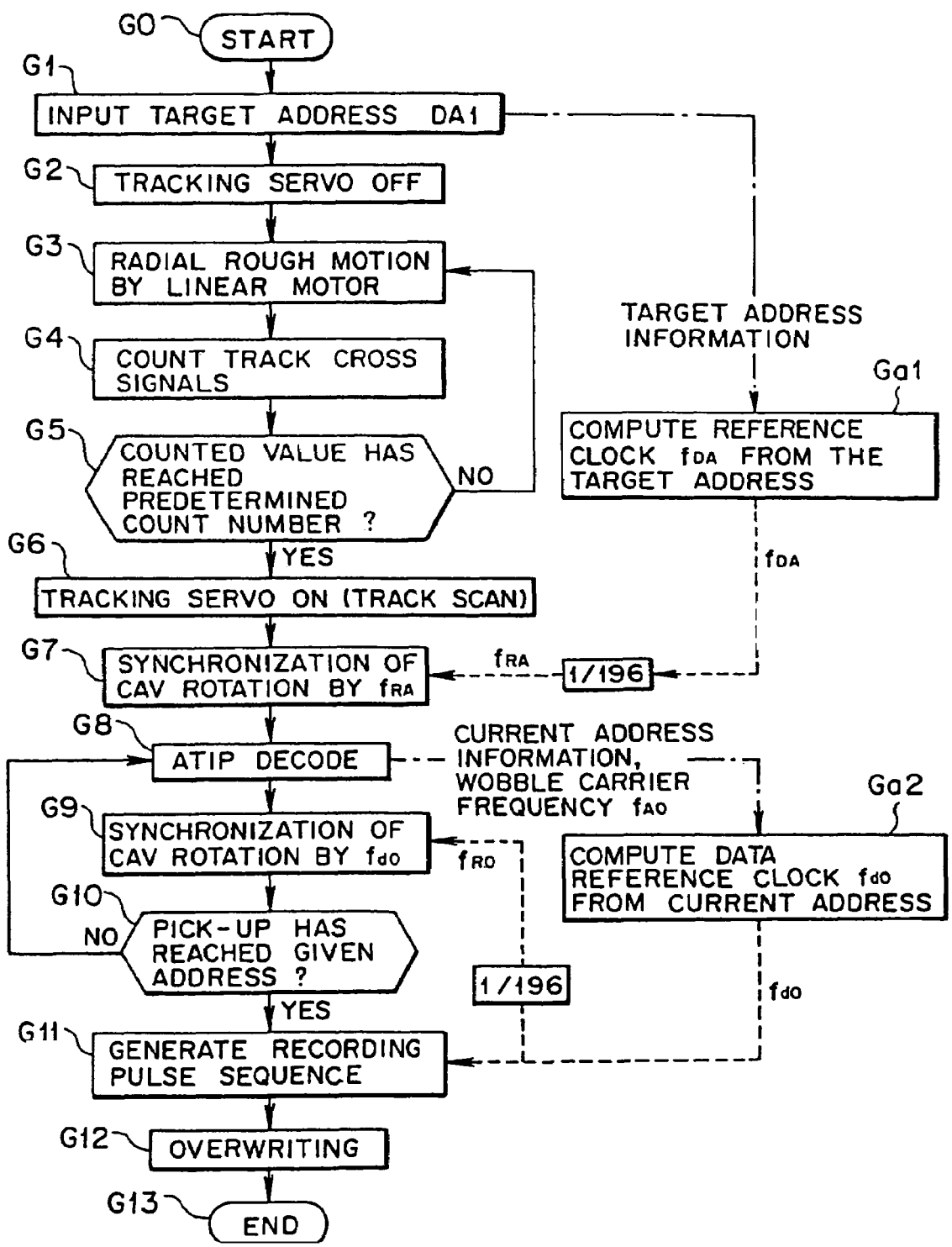
FIG. 15 is a flowchart showing how to carry out the recording method of the present invention.
Figure 16:
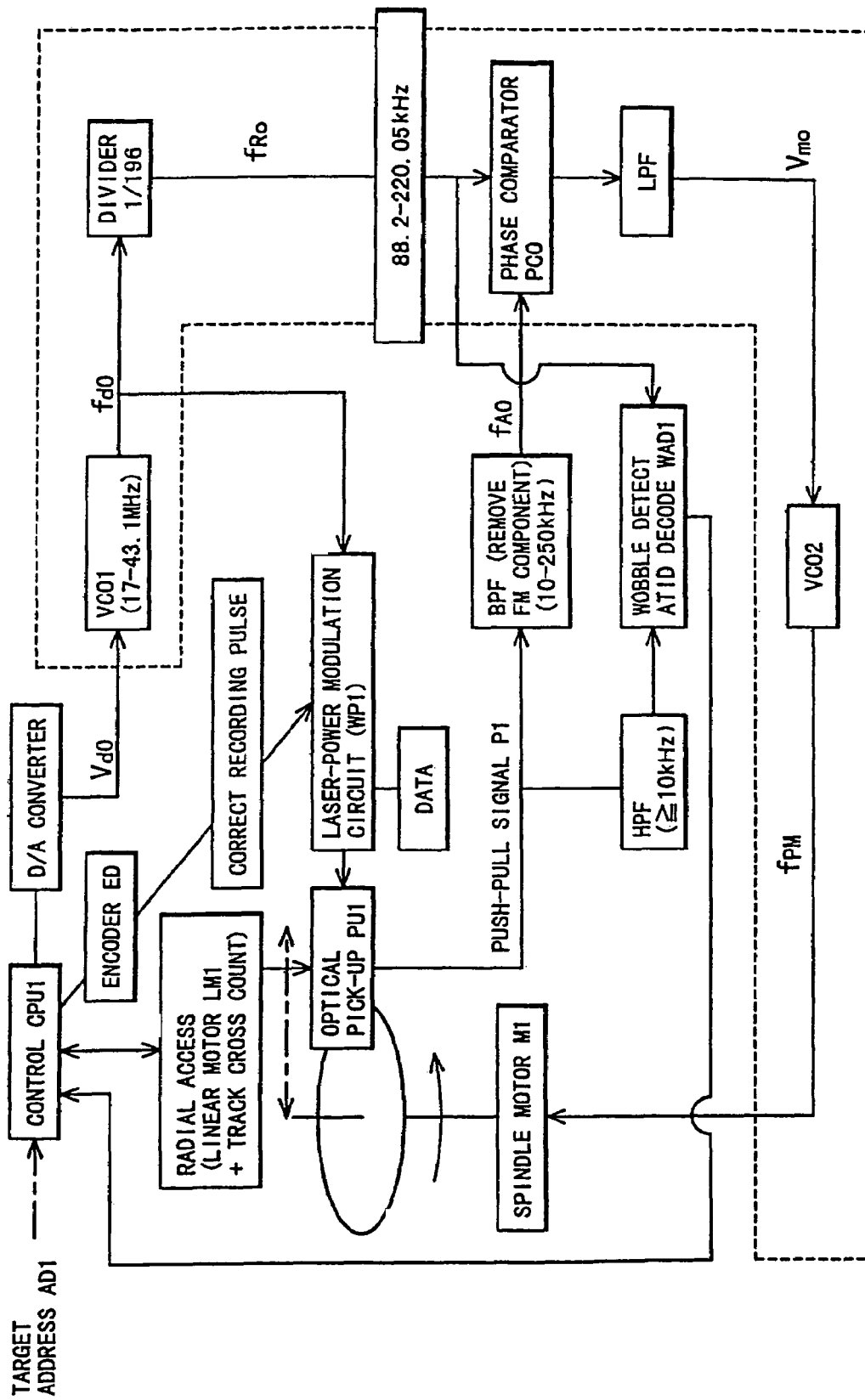
FIG. 16 is a block diagram showing an illustrative recording/retrieving apparatus according to the present invention.

FIG. 15 is a flowchart illustrating the procedure in which overwriting is carried out as the pick-up reaches a given address (radius) and synchronization between the rotation and the data reference clock. FIG. 16 is a block diagram of a control system for controlling the overwriting as depicted by FIG. 15. FIGS. 15 and 16 show an optical disc recording/retrieving apparatus, which accomplishes uniform-linear-density recording, irrespective of the radial position, though employing CAV method, and flow of operation of the apparatus.

FIG. 16, unlike the general concept diagram of FIG. 6, is a detailed diagram showing a reference signal oscillator (VCO1) for generating data reference clock T (frequency $f_{d0}$) that varies in inverse proportion to the radius when a focused light beam (the pick-up) is radially moved to the recording block at a given address (target address), and also a data-sequence synchronization means for finely adjusting the rotation speed of the disc, based on the result of phase comparison between the reference signal $f_{R0}$ obtained by dividing the data reference clock $T_{d0}$ at a given radius into 1/N(N is an integer) and the groove wobble frequency $f_{40}$ detected in the target address, in a way that the data reference clock frequency $f_{d0}$ at the given radius and the groove wobble frequency $f_{40}$ in the target address satisfies a relation $f_{d0}=N \cdot f_{40}$, irrespective of the radial position, and synchronizing the start position of a recording block and a data sequence to be written in the block.

In FIGS. 15 and 16, a rewritable compact disc (CD-RW) is used as an example, and N=196.

In this method, first of all, supporting the movement of the pick-up to a given radial position, discriminating whether the pick-up has been reached a target address and computing the data reference clock are controlled by a particular CPU1 in the drive. Now, assume that, for the initial status, a focused light beam at a reference radius $R_{in}$, e.g. the innermost track of the recording area, is subject to focusing and tracking. When employing the medium of the present invention, a reference r.p.m. (disc rotation speed) value $w_0$ is set in a range of from 1,900 to 2,200 in such a way that the linear velocity on the innermost track of the recording area is roughly 4 times (4.8 m/s) of CD linear velocity. Specifically, if the reference radius $R_{in}$=21 mm, $w_0$ is set to roughly 2,180 r.p.m., and if $R_{in}$=24 mm, it is set to roughly 1,910 r.p.m.

FIG. 16 is similar in basic-part to FIG. 6, but illustrating the details of a PULL (phase locked loop) system, which undertakes rotation control, as surrounded by dotted lines. In FIG. 16, the encoders ED1, ED2 of FIG. 6 are depicted as a single encoder ED, and the laser driver LD1 of FIG. 6 is omitted as treated as a component of the recording pulse generator circuit WP1. And the access servo control CPU1 is treated as a part to undertake one of various functions of a control CPU1.

The reference clock generator circuit CK1 of FIG. 6 is depicted in FIG. 16 as being receptive of a signal from the control CPU1 and being composed of a digital-to-analog converter and a voltage control oscillator VCO1. Here $f_{d0}$ is the data reference clock frequency inverse proportional to the radius, being based on the address information; using, for example, the formulae (4) through (7), the digital output computed by the control CPU1 is converted into a voltage $V_{d0}$ proportional to $f_{d0}$ by an analog-to-digital converter, whereupon a frequency proportional to $V_{d0}$ is generated by VCO1. This partial procedure is only an illustrative example and, alternatively, it may be substituted by another digital synthesizer as long as the data reference clock frequency proportional to the radius is generated. As mentioned above, assuming that the velocity on the outermost track is 10-times velocity of CD, that on the innermost track is roughly 4-times velocity, and $f_{d0}$ varies from 17.287 MHz to 43.218 MHz. Consequently the digital synthesizer is preferably able to sweep this frequency range by a resolution of roughly 0.1 MHz. Though the reference clock period proportional to the radius varies stepwise in such resolution, it is possible to keep errors in mark length at the individual radial position within a tolerance (usually about ±1%).

$f_{d0}$ is divided into 1/196 by a dividing period and is used as a reference value $f_{R0}$ of the carrier frequency of wobble at a given radius.

In FIG. 16, BPF stands for a band-pass filter for extracting a carrier frequency component $f_{A0}$ from the wobble signal, and HPF, a high-pass filter for FM modulating the wobble signal.

A phase comparator PCO compares $f_{A0}$ in phase with a reference signal $f_{R0}$. The result of phase comparison of PCO is converted into a mean voltage $V_{m0}$ obtained by LPF; the large the phase difference, $V_{m0}$ will increase as a feedback signal. $V_{m0}$ is converted into a frequency $f_{PM}$, which controls the frequency of the spindle motor M1, by VCO2. The combination of PCO, LPF and VCO2 is a popular construction to be used in the usual PLL control. By this PLL control, the r.p.m. of the disc is adjusted so as to synchronize $f_{A0}$ with $f_{R0}$, namely, so as to zero the phase difference in PCO.

Following the procedure of FIG. 15, first of all, at step G1 a move-toward-address command and a desired target address DA1 are inputted to the control CPU1 via an external interface. At step. G2 the tracking servo is rendered to be inoperative for movement toward the target address. Simultaneously, at step Ga1 parallel to the flow of operation, from address AD1 (here ATIP address), CPU1 computes the radius of the target ATIP address and the track number by the formulae (4) through (6). Then the targetted data reference clock frequency $f_{DA}$ on the radius of the target address is computed by the formula (7), and the computed frequency is generated by VCO1. And this $f_{DA}$ is divided into 1/196 to generate the carrier frequency $f_{RA}$ of wobble at the target address. $f_{DA}$ and $f_{RA}$ are referred to as reference frequencies.

More generally, the data reference clock frequency $f_{d0}$ is computed from the following relation (100):

$$f_{d0}=f_{ref}+(R-R_{ref})/\Delta R \qquad (100),$$

which is to be kept satisfied by the calculated radius R and the reference clock T at the current ATIP address and in which $f_{d0}$ varies commensurate with the radius R computed from a given address in which data is to be recorded, where $T_{ref}$ (frequency $f_{ref}$) is the data reference clock on the reference radius $R_{ref}$ at the leading end or tailing end of the recording area of the optical disc D1, $\Delta R$ is the radius width ranging from the innermost track to the outermost track of the recording area. A radial moving signal is also issued to the linear motor (spindle motor) M1, using the calculated $(R-R_{ref})$.

At step G3, the pick-up PU1 is radially moved as driven by the linear motor LM1 in accordance with a command from CPU1, and at step G4 the pick-up PU1 is moved toward a target address by a rough motion mechanism in accordance with the track count. At step G5, confirmation is made from the track count number that the pick-up PU1 has been approached adequately near to the target address, whereupon the rough motion mechanism is braked and, at the same time, the tracking servo is rendered operative on a track near (usually immediately short of) the target address at step G6. Subsequently, with the tracking serve kept active, scanning by the laser light beam at the retrieving level is made along the guide groove.

Here the carrier frequency $f_{A0}$ of wobble is extracted. Since the pick-up PU1 has come near to the target address, the extended $f_{A0}$ and $f_{R0}$ computed from the target address are within such a range as to be PLL locked by phase comparison.

Therefore, at step G7, $f_{A0}$ and $f_{RA}$ are compared in phase with each other, and then a feedback is given to the spindle motor M1 in a way that $f_{A0}$ is in synchronism with $f_{R0}$, securing synchronization of CAV rotation.

Then at step G7, CAV rotation of the spindle motor M1 is locked by the estimation carrier frequency $f_{RA}$ of wobble, whereupon with the tracking servo kept active, scanning by the optical beam is made along the track. At step G8, the push-pull signal P1 is retrieved by the pick-up PU1 so that the carrier frequency $f_{A0}$ of wobble is extracted by BPF and decoding of ATIP information by ATIP decoder WDA1. At step G9, based on the address information continuously updated time to time as retrieved at real time, $f_{d0}$ is computed to be updated occasionally time to time at parallel step Ga2, and thus generating the reference clock frequency $f_{d0}$ by VCO1. Simultaneously with this, consulting with the latest value of $f_{R0}$ obtained by dividing $f_{d0}$ into 1/196, $f_{R0}$ and $f_{A0}$ are compared in phase with each other by PCO, and control for CAV rotation of the disc is made on the spindle motsor M1 so as to synchronize $f_{R0}$ and $f_{A0}$ with each other. Steps G8, G9 and Ga2 constitute a PLL feedback loop, with $f_{d0}$ being assumed as a reference signal, to kept the spindle motor M1 substantially in CAV rotation.

At steps G8 through G10, under the foregoing feedback working, scanning by the recording/retrieving light beam is made and the r.p.m. of CAV rotation also is finely adjusted in accordance with the varying-time-time ATIP address and $f_{d0}$, thus bringing the puck-up PU1 close to the target address. At step G10 if it is judged that the pick-up PU1 has reached the target address, the recording pulse sequence is generated at step G11. Under a command of the control CPU1, binary data is encoded into the EFF-modulated signal, and the recording pulse is corrected according to the recording method of the present invention in synchronism with $f_{d0}$ generated by VCO1, so that gates of recording pulse sequence of $\alpha_1 T$, $\beta_1 T, \ldots, \alpha_m T, \beta_m T$ are obtained, as shown in FIG. 5, to produce a laser diode driving current for the pick-up PU1 in the recording pulse sequence generator circuit WP1 based on the gate signals. At step G11 the recording power Pw, the bias power Pb and the erasure power Pe from the pick-up PU1 are irradiated to the track of the target address to overwrite necessary EFM-modulated data. Here during generation of the recording pulse sequence at step G11, a synchronization signal in the ATIP information, simultaneously with $f_{d0}$, is consulted with to achieve synchronization in position with the ATIP frame.

Further, from input data encoded in CD format, the recording pulse sequence is generated in the recording pulse generator circuit WP1. In FIG. 16, also correction of the recording pulse sequence in accordance with the linear velocity corresponding to the address is considered.

At a glance, the foregoing procedure is similar in operation flow with the control system for recording with a commercially available CD-R/RW drive as the wobble frequency and reference clock frequency are compared with each other to accomplish synchronization with CLV rotation. For synchronization with CLV rotation, the reference clock frequency $f_{d0}$ constant irrespective of the radial position is employed as a reference signal. With this $f_{d0}$ as a reference signal, $f_{R0}$ is generated to cause the rotation of the motor rather forcibly to vary by a great extent to secure synchronization of rotation. At that time, if the extent of radial movement is large, the difference between $f_{40}$ and fR0 would be too large in the absence of preliminary rough adjustment of r.p.m. per se to the value that is to be determined by computation from the radius, resulting in a deviation of the pick-up PU1 from the capture range of PLL control.

On the other hand, since the apparatus of FIG. 16 is driven in CAV mode during rough motion, M1 retains the initial r.p.m. of CAV rotation before the radial movement is started. And since both $f_{R0}$ and $f_{40}$ vary in proportion to the radius even though they have encountered with large considerable fluctuation due to the radial movement, it would not deviate off the capture range of PLL. Namely, as long as the pick-up PU1 has moved adequately near to the track at the target address by the radial rough motion mechanism, it is possible to control the CAV control by PLL control as the radial position is finely adjusted by reading the address as ATIP decoded. Strictly, after the pick-up PU1 has reached near the target address to start ATIP decoding, the r.p.m. of CAV rotation is finely adjusted by PLL control, based on $f_{d0}$ that varies in real time in accordance with the ATIP address. In FIG. 16, a portion surrounded by an endless dotted line constitutes a PLL control circuit.

Here for every ATIP frame (unit of 1/75 sec at the 1-times velocity of CD), which is a minimum unit of update of $f_{d0}$, synchronization with $f_{R0} = (1/196)f_{d0}$ is made to lock the disc rotation by PLL control. Accordingly, the CAV rotation control method of the present invention, in other words, serves also as ZCLV in which a virtual zone is provided for each ATIP frame. But, since each ATIP frame, which is the length of the individual zone, is less than one disc circumference, it can be treated substantially as CAV rotation. With this CAV rotation control, it is possible to establish synchronization between the data reference clock and the disc rotation for every radius with improved precision as compared to make CAV rotation control on the spindle motor M1 independently and mechanically, thus reducing fluctuation of mark length in each radial position to a minimum.

Though illustration is omitted in FIG. 16, as a precaution, in CAV rotation during rough motion of the pick-up PU1, the r.p.m. of the spindle motor M1 is monitored by a velocity sensor (usually a hole sensor) and, more preferably, a rotation retain control mechanism whose rough precision is in a range of about ±1-10% is additionally employed. From 0 r.p.m. till the rising of rotation, namely, till the capture range of PLL, it is necessary to directly control the r.p.m. and also to shift to PLL control, which consults with the reference clock signal fd0 generated in accordance with the address, after the count number has reached a predetermined value. This is particularly effective to prevent any possible deviation off the capture range of PLL even if CAV rotation could deviated by a large extent during rough motion. Further, because discrimination in multiplied frequency principally cannot be between recording at the 4-times velocity on the innermost track and that at the 8-times velocity on a track slightly outside of the intermediate track, this relatively rough r.p.m. control by direct monitoring r.p.m. of the spindle motor M1 is also effective to prevent a possible stampede as synchronization could happen to be made with the 8-times velocity by mistake instead with the intended 4-times velocity.

This CAV method is differentiated from the conventional CLV mode of PLL rotation control system in that CAV is finely adjusted by the reference frequency $f_{d0}$ and fR0 computed from the ATIP address. It is preferable that this fine-adjusted width should be usually within a tolerance of ±1% of the reference r.p.m. $w_0$ in order to hold PLL control and also substantially uniform-linear-density recording for retrieving in CLV mode. Namely the radial rough motion mechanism is preferably able to cause the pick-up PU1 to approach the target address as closely as to satisfy this relation.

In the apparatus of FIG. 16, because the difference between the frequency band on the innermost track and that on the outermost track is approximately 2.5 times, it is essential to pay special attention in setting the frequency bands for the band-pass filter (BPF), the high-pass filter (HPF) and the low-pass filter (LPF). Particularly for the LPF in the PLL control system, it is necessary to divide the recording area radially into several zones and to change the frequency bands one for each zone, depending on the situation.

In the present invention, according to the foregoing methods, it is possible to generate the data reference clock varying in inverse proportion to the radius. But the data reference clock generation method of the present invention should by no means be limited to these illustrated examples.

The foregoing access method, the data reference clock generation method and the rotation synchronization method for realizing the uniform-linear-density recording, which is read-compatible with CD, in CAV mode are applicable to a wide variety of CD-R/RW mediums, irrespective of the r.p.m., and are particularly effective to improve the access performance when used in the medium and the recording method of the present invention.

Regarding a commercially available single-size CD, it is 8 cm in diameter and the difference in linear velocity between the innermost and outermost tracks in CAV method is 2 times at most; therefore, the medium, the recording method and the recording/retrieving apparatus according to the present invention can be applied without reconstruction. In such event, in order for increasing the data transfer rate, the linear velocity on the outermost track is preferably 10 or more times of the 1-times velocity.

7. Applied Examples Using Recording by CAV Method

An applied example will now be described in which the time to access to a given address in a different radial position is reduced by employing the rewritable compact disc of the present invention recordable in CAV method and the recording method of the present invention for recording on the rewritable compact disc in CAV method, utilizing their advantages to a maximum.

Specifically, one of the applied examples is a text recorded in CD for repeatedly practicing foreign language and music. In this application, a foreign language sentence or a warble of music is retrieved as a demonstration to urge the user to repeat it, whereupon the user soon records the repeated content in the user data area of the recording area as new input information.

Consequently, it is very convenient if an application program is previously stored in the same CD-RW disc and could thereafter be retrieved to retrieve demonstration data to thereby execute the demonstration, and if the repeated user data could be recorded in the same CD-RW disc so that both recording and retrieving can be realized with one and the same recording/retrieving apparatus.

Practically a demonstration is divided in units of several seconds to several tens seconds so as to be repeated comfortably, and recording of both the demonstration and user data has to be repeated within a certain short time range. Consequently, as it is able to reduce the access time of an optical pick-up between the application program area and the user data area to a minimum, the recording medium and the recording method of the present invention are particularly effective for recording by CAV rotation method. It has recently been a popular practice to carry out retrieving of CD by CAV method; if recording and retrieving take place in CAV mode all the way, it is possible to facilitate a change-over process from recording to retrieving and vice versa so as to complete the process in a reduced time.

According to the CD-RW medium of the present invention suitable for this application, the application area includes an application program area occupying a continuous specified part of the application area and storing a predetermined application program, and a user data area which occupies the remaining portion of the application area and in which the user data relating to at least the application program is adapted to be recorded. Retrieving of the application program and recording of the user data relating to the application program are made each at a constant angular velocity.

The application program area may be formed by recording in part of the unrecorded rewritable CD-RW on the user's end or may be previously recorded as ROM data, which is formed on the substrate in terms of uneven pits (phase-depth modulated pits).

In either case, as the application program per se is treated practically as Read-Only (ROM) data, the subject CD-RW disc is regarded as having locally a ROM area and hence is also called the partial ROM (P-ROM).

In this P-ROM-type CD-RW disc, usually both an area storing an application program so as to indicate the data location along ATIP address (application program area) and a user data area respectively occupy a train of successive addresses as a unitary area.

FIG. 25 is a diagram showing data arrangement along ATIP addresses.

The diagram of FIG. 25 is a composite form including a perspective view (100) and a cross-sectional view (101) of a CD-RW disc. The CD-RW disc 100 has a data structure composed of, sequentially from the innermost track, a PCA (power calibration area), a PMA (program memory area), a lead-in area, a program area, and a lead-out area. Among these areas, the PCA is a trial writing area for determining the optimum recording power; the PMA, a temporary file management information recording area, which information is peculiar to CD-R or CD-RW; the lead-in area, an area in which file management information, which is called TOC (table of contents) to be naturally used in CD-ROM format, and disc management information are described; the lead-out area, an area indicating the tail of EFM data. The program area is an area in which the user data is to be recorded; in the present invention, this program area includes both an application program area and a rewritable user data area. In order for securing a retrieving read-compatibility with the conventional CD-ROM, it is absolutely essential to record necessary information in the lead-in and lead-out areas.

In the present invention, the information area (hatched area of the disc 100 in perspective in FIG. 25), ranging from at least the leading end B of the PCA area to the trailing end D of the lead-out area, is covered with a common phase-change medium.

In the program area, there are two areas for realizing the partial ROM function to store an application program. One is an area (master ROM area) in which the recording layer is formed on the substrate and data is recorded using an uneven pit sequence (pit sequence previously formed on the substrate as by injection molding) previously formed in the substrate surface. The other is an area (post ROM area) in which the recording layer is previously formed on the CD-RW disc 100 throughout the entire surface as a rewritable area and the recording drive apparatus is prohibited from rewriting partially in part of the area in which part data has previously been recorded.

Figure 26A:
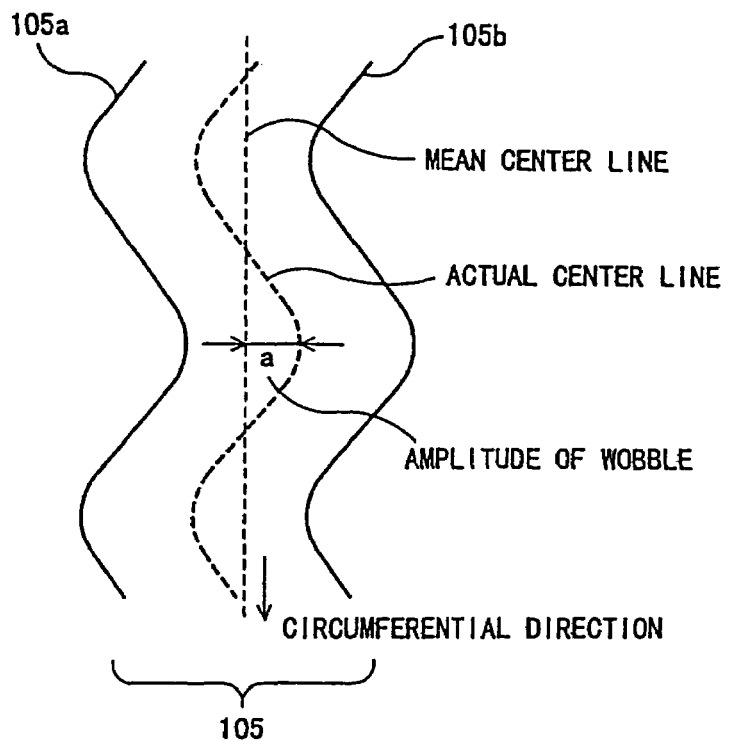
FIGS. 26, (a) and (b), illustrates the wobble of a guide groove or a pit series in a recording medium.
Figure 26B:
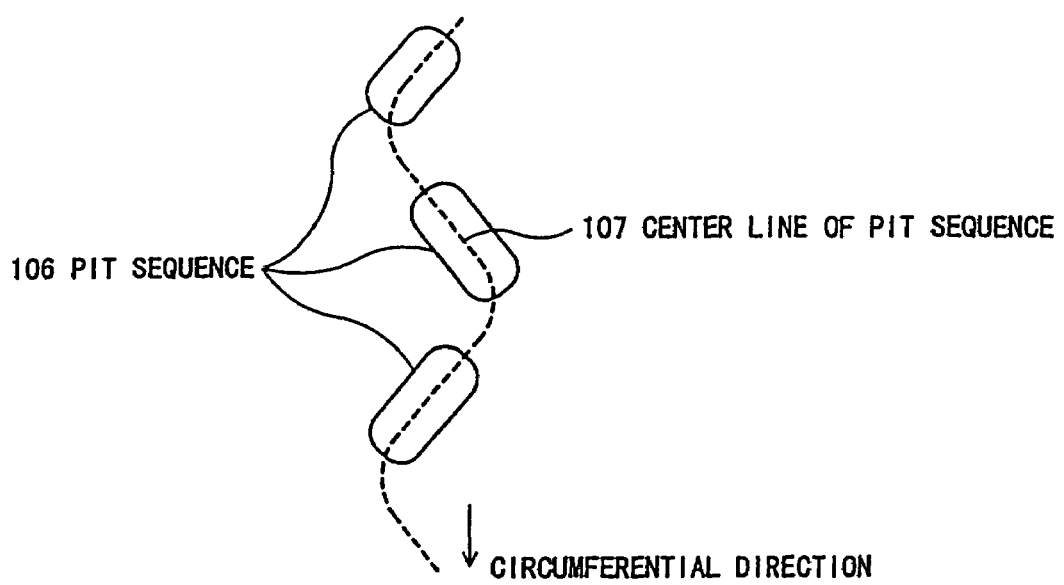

In at least the post ROM area and a RAM area, a spiral guide groove 105 runs for guiding laser light as shown in (a) of FIG. 26. The guide groove 105 is defined by opposite sidewalls 105a, 105b and has usually a trapezoidal cross section 0.03-0.05 µm in depth and approximately 0.5 µm in width. As the disc is rotated, laser light scans the recording area circumferentially of the disc along the mean center line of guide groove 105. The guide groove 105 is provided with a wobble by the radial meandering groove geometry, the wobble giving additional data such as ATIP information and a synchronization signal. In FIG. 26, the amplitude of the groove meandering is exaggeratedly depicted, but actually the meandering amplitude is approximately 0.03 µm as compared with approximately 0.5 µm in groove width. On the other hand, in the presence of the master ROM area with the master ROM data, the groove geometry is preferably such that the center line 107 connecting a pit sequence 106, a train of pits, meanders with an amplitude as large as the amplitude of meandering of the guide groove 105, as shown in (b) of FIG. 26.

In any case, for giving address information along the guide groove, in a wide sense, ranging from the leading end B of the PCA area to the trailing end D of the lead-out area, it is preferable that address information and synchronization signals should be given in terms of absolute time according to the wobble. The absolute time address is represented in units of minutes, seconds and frames, with ⅟₇₅ sec being defined as a minimum unit (frame). In FIG. 25, at the leading point A of the program area, ATIP leads from 0-minute-0-second-0 frame (hereinafter described 00:00:00 frame) to at maximum 79:59:74 frame. In accordance with data capacitance, the maximum ATIP address of the program area, namely, the start time (C point in FIG. 25) of the lead-out area is variable. The program area shifts at C point to the lead-out area. The ATIP address of the lead-out area continuously increases, succeeding the trailing-end ATIP address of the program area. Usually the length of the lead-out area is roughly 1-2 minutes. In the meantime, the PCA, PMA and lead-in areas are arranged between B point and A point in FIG. 25. The ATIP address is reset to 00:00:00 at A point, whereupon it decreases sequentially from 99:59:74 from A point to B point (leading-end address of PCA). The ATIP addresses in the PCA, PMA and the lead-in areas are not available for only 80s or 90s minutes.

Figure 27:
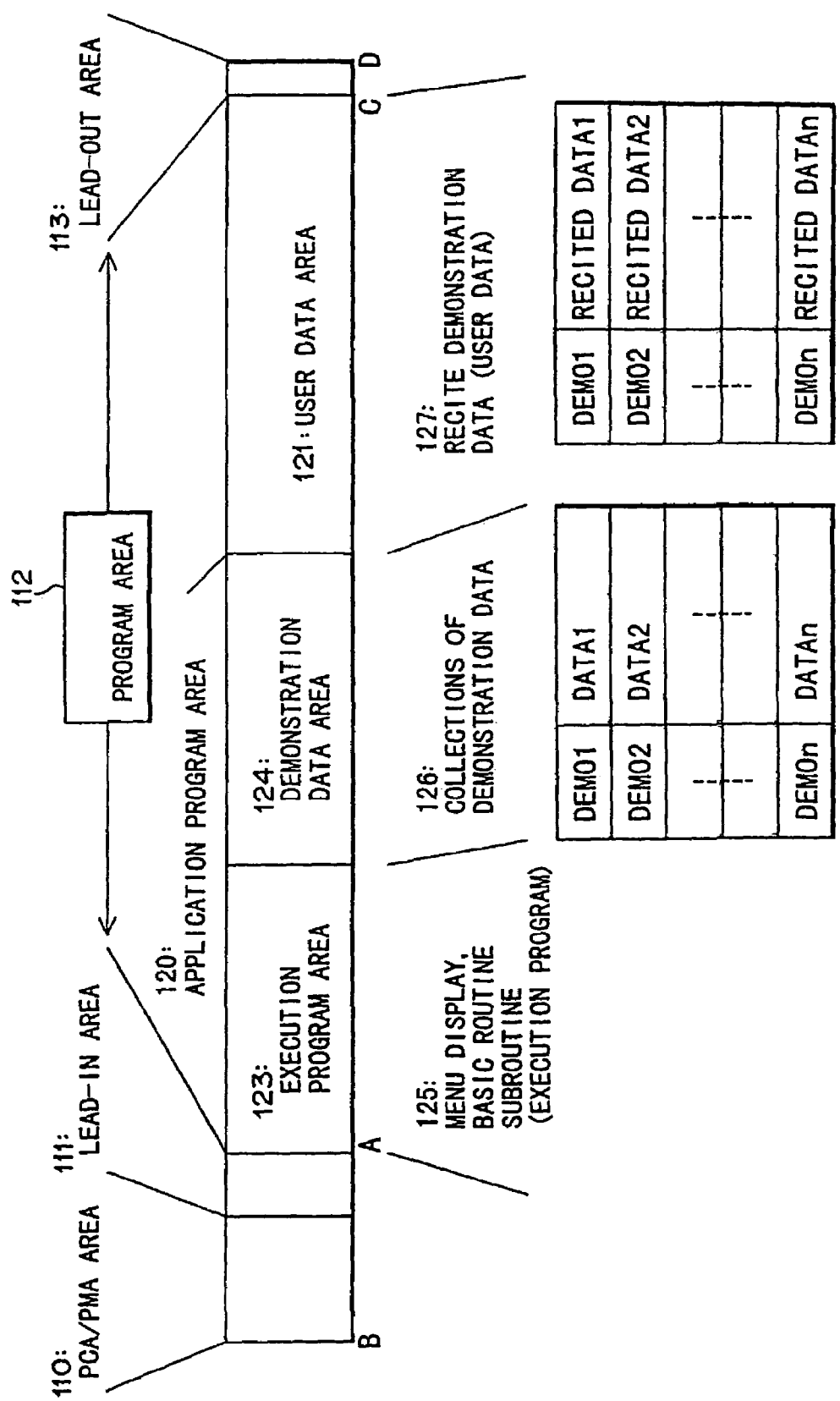
FIG. 27 is a diagram showing an illustrative data arrangement in the recording medium of the present invention.

FIG. 27 shows an illustrative data arrangement in the recording medium of the present invention. In FIG. 27, A, B, C, D points are located at the same ATIP addresses as A, B, C, D points of FIG. 25. And BA is composed of a PCA/PMA area 110 and a lead-in area 111, AC is a program area 112, and CD is a lead-out area 120.

In FIG. 27, an application program area 120 is disposed on the inner periphery of the recording area, namely, at the start of ATIP time, and a user data area 121 is disposed on the outer periphery of the recording area relatively at the end of ATIP time.

Also in FIG. 27, the application program area 120 and the user data area 121 are arranged simply separately in the inner and outer peripheries, whichever area may be in the inner periphery. Further, as an example, the program area is divided into two sessions in accordance with the specifications of a multi-session format. The two-session program area may be a data structure such that one is a session where the application program is stored, and the other is a session where the user data can be freely written.

The application program area 120 is composed of an execution program area 123 and a demo data area 124. The execution program area 123 stores execution format programs, such as a main menu program for controlling input/output enabling jobs in an interactive way with the user, a basic routine program for allotting the jobs to sub-routines based on the main menu, and sub-routine programs, responsive to the user's selection from the menu, for dealing with execution of various jobs and demonstrations. The demo data area 124 stores a demonstration data collection to be consulted with by the application program. In the following description, these two areas 123, 124 will be generically called the application program area. The demonstration data collection comprises, as an example, a plurality of sub-demonstrations, i.e. demo 1, demo 2, . . . , demo n so that the user can select any one or, alternatively, two or more consecutive ones to retrieve.

In the user data area, the contents repeated by the user in response to, for example, demo 1, demo 2, . . . , demo n are stored as repeat data 1, repeat data 2, . . . , repeat data n, respectively.

For having frequent access between the application program area 120 and the user data area 121, these two areas preferably have a common logic data structure and are identical in file management method with each other, thus making it unnecessary to change the decoding way when retrieving data.

Figure 28:
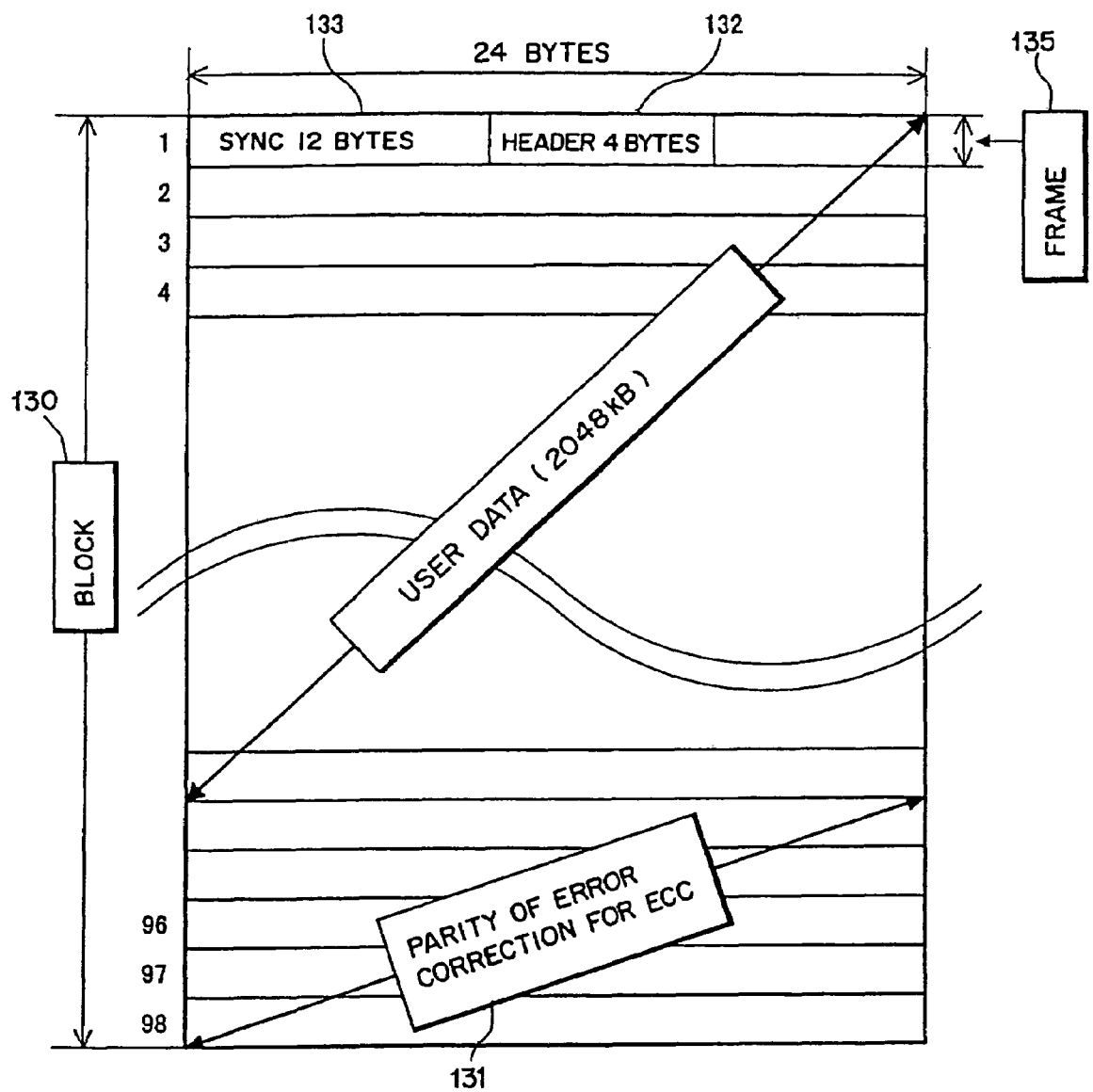
FIG. 28 is a diagram showing the structure of a block in a CD-ROM format.

Particularly in dealing with voice data as described later, in order to cancel a possible difference between the actual data retrieving/transfer rate on the disc and the voice retrieving rate in real time, and in order to make retrieving of sliced application data and recording of the user data one at a time, the data on the disc should preferably have a so-called fixed-length packet structure. Here the fixed-length packet recording on CD-RW will be described. In CD-ROM format, as shown in FIG. 28, data processing is carried out with 2,352-byte data containing 2,048 bytes of the user data and additional data to the user data being treated as a unit block 130. To 1 block 130, there are added 4-byte data (132), called the header and in the form of an ECC code (131) for error collection, containing address information corresponding to ATIP, and an 8-byte synchronization signal (133) needed for coding by ECC-containing data.

Assuming that this 2,352-byte data is divided into a matrix of 24 bytes×98, the data unit (135) of 24 bytes in a single line is called a frame, which is the basic unit when converting into EFM-modulated data, and cannot be controlled by the user. To the 24-byte data belonging to the frame 135, there are also added a parity for error collection, and address information called a sub-code, which are to be recorded on the disc after being EFM modulated.

The fixed-length packet recording of CD-RW was established by OSTA (Optical Storage Technology Association) of the United States as Universal Disc Format (UDF), version 1.5 and Multiread Format with a premise to use the CD-ROM format. The user data of 32 blocks as a single unit, and additional blocks, i.e. a run-in block 141, a run-out block 142 and a link block 143, are called a packet. Namely, 1 packet contains a user data block group 140 in the form of a 64-byte user data.

Figure 29:
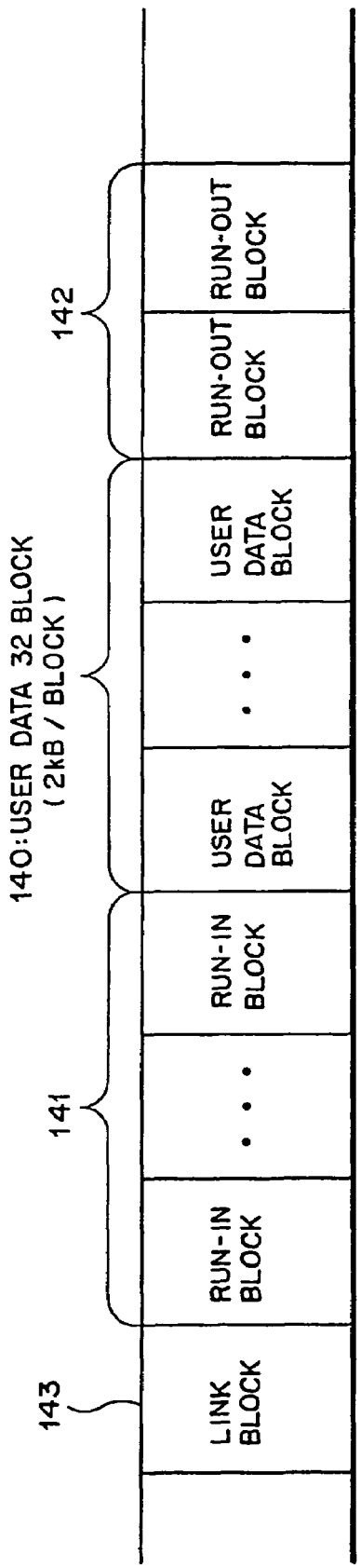
FIG. 29 is a diagram showing the structure of a packet in CD-RW.
Figure 30:
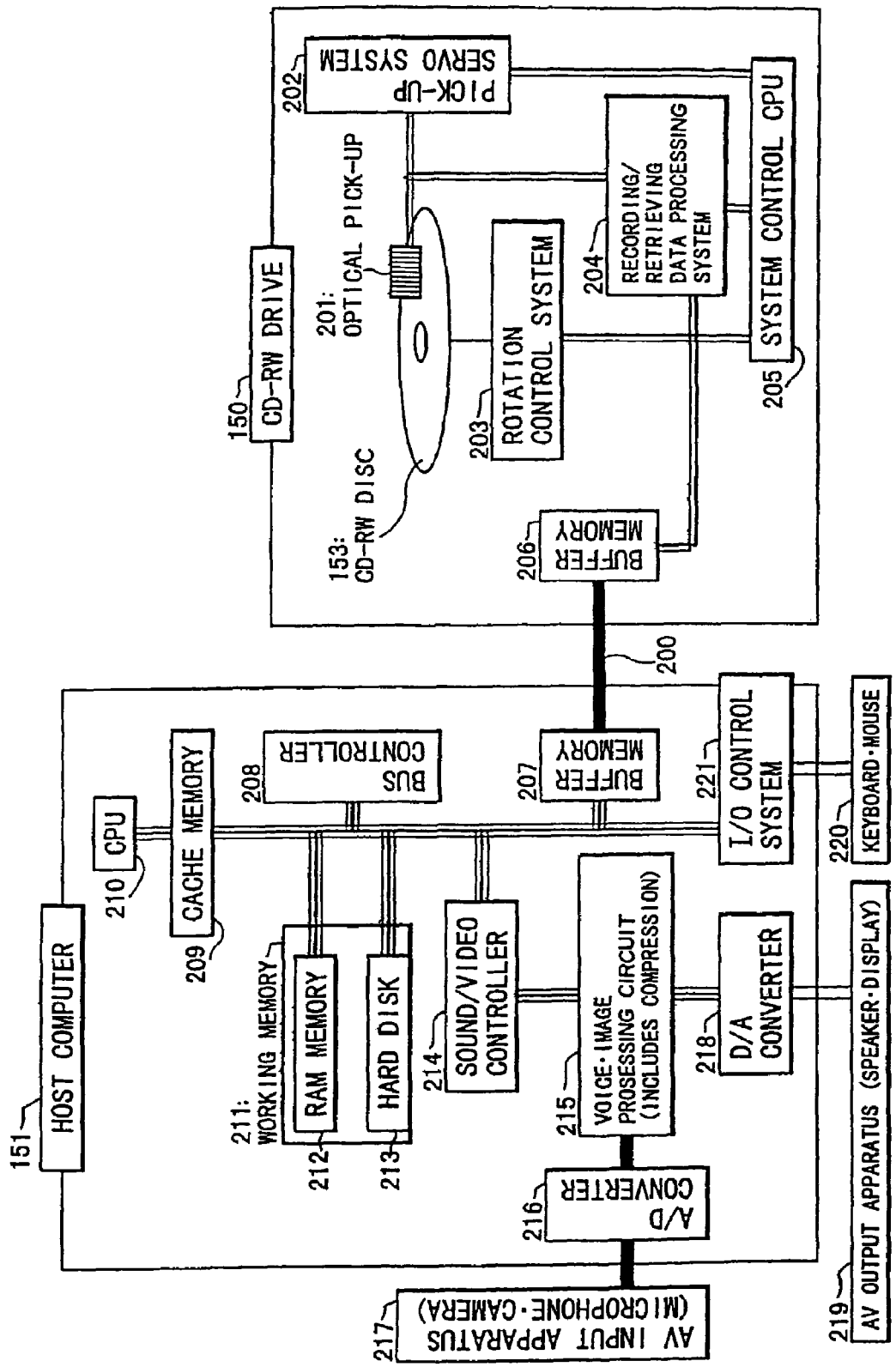
FIG. 30 is a block diagram showing a CD-RW drive and a host computer when P-ROM is used.

This operation flow, for example, as shown in FIG. 30, is realized by a system which comprises a CD-RW disc 153 of the present invention partially having the application program area and the user data area, a CD-RW drive 150 serving as an apparatus for making recording/retrieving on the disc being rotated in CAV mode, and a host computer 151 operatively connected to the recording/retrieving apparatus. The CD-RW drive 150 and the host computer 151 are interconnected by a data transfer line 2000. For the data transfer method, usually ATAPI or SCSI method is employed. In order to cancel a possible difference between data processing rate of the CD-RW drive 150 and that of the host computer 151 during data transfer, and in order to make synchronization of data transfer, the CD-RW drive 150 and the host computer 151 are equipped with data-transfer buffer memories 206, 207, respectively. In the buffer memories 206, 207, data processing is carried out in units of packets such as shown in FIG. 29. And inside the CD-RW drive 150, amplifying EFM-modulated signal, extracting the EFM-modulated signal by a band-pass filter, encoding, decoding, and generating the recorded pulse are performed by a data processing system 204. The rotation of the disc is controlled by a rotation control system 203, and movement of an optical pick-up 201, tracking servo and focusing servo are controlled by a pick-up servo system 202. The cooperation between these mechanical controls and data processing is controlled by a system control CPU 205. CPU 205 is a generic name of the upper-rank system for unifying these mechanical controls, data processing, and recording/retrieving of electrical signals; CPU 205 should by no means be realized by a single IC.

The host computer 151 comprises, as the user interface, an AV (Audio-Visual) input device group 217, such as microphone and camera, an AV output device group 2.19, such as speaker and display, and an other device group 220, such as keyboard and mouse. The input/output data with the user can be processed as digital data via an analog-to-digital converter circuit 216 and a digital-to-analog converter circuit 218. Usually, voice and image data are not processed by only CPU 210 but by an voice/image processing circuit 215. In the voice/image processing circuit 215 and a sound/video controller 214 as an upper-rank device to it, sampling, interpolating, compressing/decompressing of data take place. If object data contains both voice and image data, additional data processing has to be carried out to secure synchronization between voice and image data. Although the voice and image data may be dealt separately by different ICs, they will be treated here as if a single kind of data. Likewise, data from the keyboard and mouse also is processed by a system representing an I/O control circuit 221.

For retrieving data of application, in the drive 150, the disc 153 is scanned by the light beam emitted from the optical pick-up 201 while the disc 153 is rotated at a constant angular velocity, so that data on the disc 153 are retrieved in units of fixed-length packets. The data in units of packets is EFM demodulated and decoded into data in units of blocks (unit of 2 k byte) in accordance with CD-ROM format by the data processing system 204, whereupon the resulting data is transferred to the buffer memory 206 and further to the host computer 151 via the data transfer line 200 of the interface. Data transfer is controlled by cooperation of CPU 210 of the host computer and the system control CPU 205 of the drive. The buffer memories 206, 207 are usually in the form of solid memory devices such as DRAMs and are respectively mounted in the drive 150 and the data-processing host computer system 151, being essential to accomplish synchronization of data transfer. But in a unitary system in which the drive and the host computer system, particularly CPUs 210, 205 are combined in function, it is unnecessary to mount the two buffer memories 206, 207 separately, namely, only a single buffer memory suffices. Since actual data retrieving on the disc takes place at high speed, retrieving is completed only in one of several equal parts of voice data retrieving time. And by employing usual SCSI or ATAPI method as the interface, the transfer time between the two buffer memories 206, 207 can be negligibly short.

Here in the rewritable compact disc 153 of CAV method according to the present invention, the velocity during recording/retrieving ranges, for example, from the 4-times velocity on the innermost track of the program area to the 10-times velocity on the outermost track. In the meantime, retrieving of voice data is usually carried out at the 1-times velocity; therefore it is necessary to pay special attention to this fact. Consequently, in order to cancel a possible difference in the retrieving velocity, it is essential to change the retrieving velocity for adjustment. However, the data of demo 1 read in the above-mentioned reading process is all temporarily held in an job memory 211 and is then transferred to the sound/video controller 214 irrespective of the rotational speed of CD-RW and the data transfer rate of the data transfer line 200. Then the data in the job memory 211 is synchronized with the usual sound sampling rate and is converted into analog data in the digital-to-analog converter 218, whereupon the analog data is retrieved in the speaker 219. Here digital sound data in CD format and digital data in CD-ROM format are different in logic structure; consequently sound data also should be preferably digitalized and recorded in CD-ROM format so that demonstration data and the user's repeat data as well can be recorded in units of fixed-length packets based on the same CD-ROM format. The sound data processing can be sufficiently dealt with by the built-in function of an ordinary personal computer, which is not pertinent to the subject of the present invention, so its detailed description is omitted here.

Figure 31:
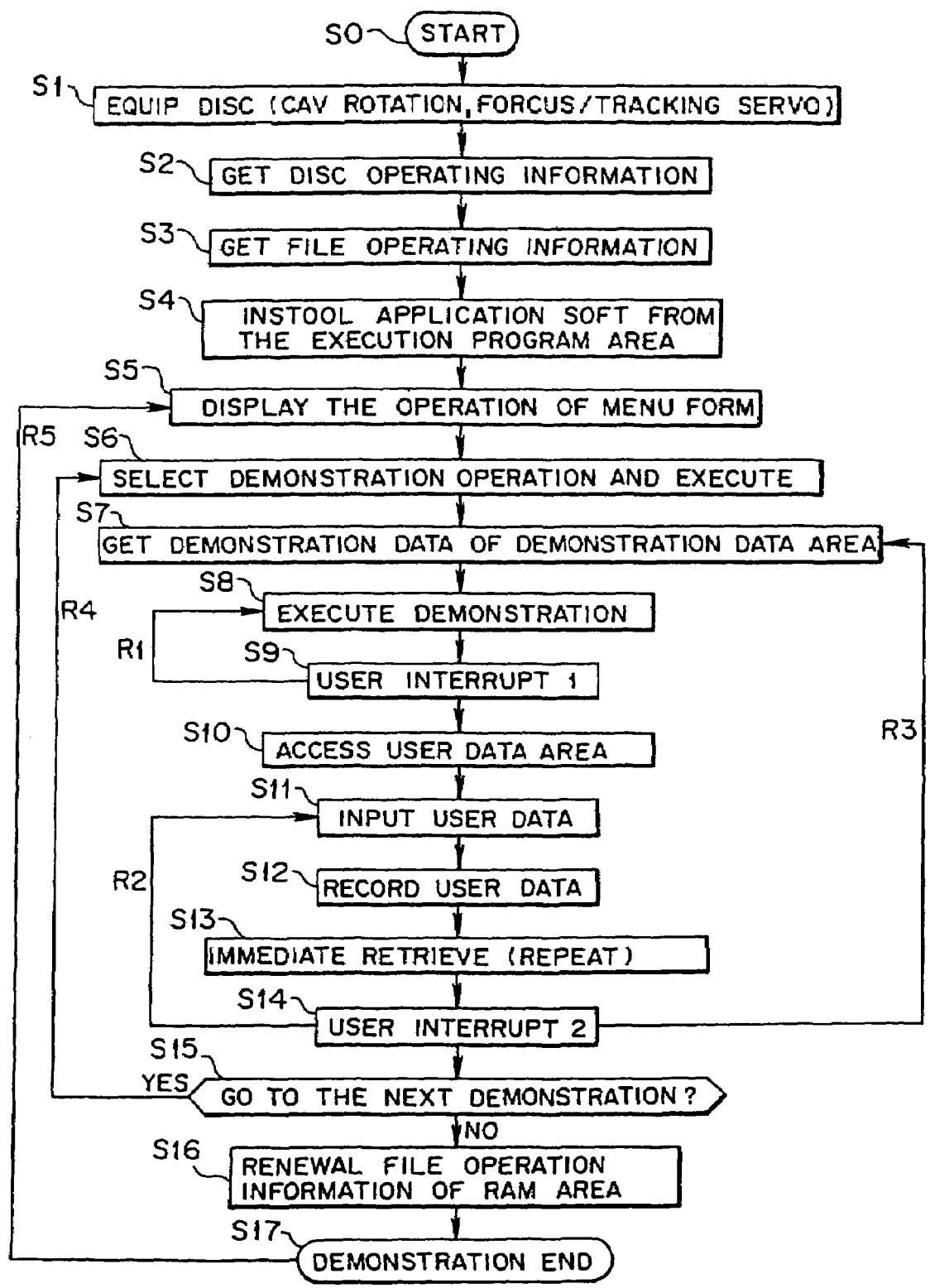
FIG. 31 is a flowchart showing the procedure of recording/retrieving by an CAV operation using P-ROM.

FIG. 31 is a flowchart showing the generalized procedure of recording/retrieving by CAV method using the CAV recordable CD-RW.

When the CD-RW disc 153 is set in the CD-RW drive 150, then from step S1 to step S3 are carried out in the CD-RW drive 150 under the control of the system control CPU 205.

First of all, at step S1, the CD-RW disc 153 of the present invention is set in the CD-RW drive 150. Here, usually under the control of the system control CPU 205, the disc starts rotating and focusing and tracking servo are established. The disc is kept rotating at a predetermined constant angular velocity.

The pick-up 201 firstly has access to the lead-in area 111 and PMA/PCA area 110 at step S2 to read at least disc management information. The disc management information includes information relating to the optimum recording power and linear velocity during recording and identifies the disc type as CD-RW and more particularly as CAV recordable CD-RW disc. And in the PCA area, trial writing is made to determine the optimum recording power.

Subsequently at step S3, file management information is obtained from an address-specifying address toward the leading end of the lead-in area 111 and the program area 112, so file information of the program area 112 is obtained.

If a self-executable application is in the application program area 120, the main routine data 125 of the application program of the disc 153 is soon read by the host computer 151 at step S4. Subsequent steps are executed as data are transferred via the drive 150 and the data transfer line 200 by the CPU 210 of the host computer 151. In the absence of a self-executable program in the application program area 120, the user selects a CD-RW executable file in the application program area 120, whereupon step 4 is started.

Usually, at step S5, first of all, the menu screen as the user interface is started to display the menu on the display of the AV device group 219 so that the user may select the job of subsequent execution program using the keyboard or other input device 220.

Here at step S6, execution of a demonstration and the content of the demonstration to be executed are selected and then the starting the execution of the demonstration is designated by the user. The demonstration selected at first is called demo 1.

At step S7, accessing is made to a specified address of the demo data area 124 of the disc 153, in which address detailed contents 126 of the demonstration is described, to obtain data of demo 1. Usually, this data is temporaily stored in the RAM memory 212 in the host computer or in the job memory 211 of a hard disc 213 so that the data is read from the job memory 211. Then at step S8, the data is converted into sound and image in any device of the AV device group 219 via the sound/video controller 214, the sound/image processing circuit 215 and the digital-to-analog converter circuit 218 so that the object demonstration is executed.

Here during execution of the application program, for example, if a foreign language learning application is supposed, pronunciation demonstration of a specified sentence is retrieved to urge the user to enter information input following the demonstration, namely, to repeat the demonstrated sentence loudly.

At step S9, when the procedure does not shift to the data-input-from-user mode upon receipt of interrupts from the user via the keyboard 220, the demonstration is repeated by route R1.

Otherwise when the interrupt 1 to shift to data-input-from-user mode is executed, the pick-up 201 has access to the user data area 121 of the disc 153 to assume a standby position at step S10. At that time, the CD-RW disc 153 is kept at a constant angular velocity during retrieving so that accessing by the pick-up 201 can be completed in a very short time.

At step S11 data input is made by the user; this corresponds to repeating the content of demo 1 by the user in the example of foreign language learning. The voice data (repeat data 1) is temporarily stored in the job memory 211 in the host computer 151 via the microphone of the AV device group 217, the analog-to-digital converter 216, the voice processing circuit 215 and the sound controller 214. The user data and the data of demo 1 may be respectively allotted to right and left channels to synthesize as stereo sound, facilitating comparison between the content of demo 1 and the user's repeated content.

At step S12, data is transferred from the job memory 211 to the CD-RW drive 150 so that the user data is recorded in the user data area 121 of the disc 153. As demand arises, at step S13, the user's input data is retrieved instantly.

In the user's interrupt 2 of step S14, the route R2 to input the user data again or the route R3 to return to repeating execution of demo 1 can be selected; if such selection is not needed, in step S15, so selection is made whether the procedure should shift to the next demonstration (demo 2) or the demonstration should be terminated. If the procedure shifts to the next demonstration, it returns to step S6 via the route R4 for selection of demonstration.

To terminate the procedure, at step S16, file management information is updated based on the user data newly recorded in the user data area 121 to terminate the demonstration at step S17. Then the procedure returns to the menu screen by the route R5.

Thus the pick-up 201 has access to between the application program area 120 and the user data area 121 with the CAV rotation kept constant. Therefore retrieving the demonstration data and recording repeat data by the user is switched over instantly so that the user can have foreign language learning by smooth hearing and repeating pronunciation without wait long.

The demonstration should by no be limited to sound; alternatively, it may be retrieving music warble after warble and repeating it by the user, or retrieving demonstration animated picture and recording the animated picture taken by a camera that follows the user's motion.

EMBODIMENT

Basic Example

A 1.2 mm thick policarbonate resin substrate was injection-molded on which a spiral groove wobbling or meandering at a reference frequency 22.05 kHz, in terms of the frequency at the 1-times velocity of 1.2 m/s, was formed at a track pitch of 1.6 µm.

The resultant groove was 0.52 µm in width and 37 nm in depth as respectively measured an optical diffraction method in terms of a U-groove resemble using He-Ne laser light whose wavelength is 633 nm.

To the meandering groove geometry (wobble), address information in terms of ATIP was additionally imparted by frequency modulation of ±1 kHz.

Subsequently, on the substrate, a lower protective layer, a phase-change recording layer, an upper protective layer, a reflective layer, and a UV-curable resin layer are deposited one over another in this order. The individual deposited layers, except the UV-curable resin layer, were laid one after another on the substrate in this order by the sputtering method without de-vacuuming. The UV-curable resin layer (approximately 4 µm) was coated by the spin coat method.

Immediately after deposition, the recording layer was amorphous; selecting an appropriate linear velocity within a range of from 3.0 to 6.0 m/s, initialization power of 500-700 mW by laser light having a wavelength of 810-830 nm and focused so as to be approximately 70-90 µm in long axis and approximately 1.3 µm in short axis the amorphous recording layer irradiated the amorphous recording layer to crystallize its entire surface, thus initializing the recording layer in unrecorded state.

After the deposition rate of the individual layer was measured, it was controlled according to the sputter deposition time. For a composition of the recording layer, the fluorescence intensity of each element by fluorescent X-ray was used as corrected in terms of an absolute composition separately obtained by chemical analysis (atomic absorption spectroscopy).

The density of each of the recording layer film and the protective layer film was obtained in terms of variation in weight when it was deposited on the substrate roughly hundreds nm in thickness. The film thickness was corrected using a film thickness value obtained in terms of the fluorescent X-ray intensity measured by a stilus-step meter.

The sheet resistivity of the reflective layer was measured by a four-prove resistance meter (Loresta MP, tradename, product of Mitsubishi Yuka Co., Ltd., a Japanese corporation, now Dia Instrument Co., Ltd., a Japanese corporation).

The resistance measurement was made in the reflective layer deposited on an insulator substrate of glass or polycarbonate resin, or in the reflective layer deposited as an uppermost layer of the above-mentioned quadri-layer structure (lower protective layer/recording layer/upper protective layer/reflective layer). Since the upper protective layer is a dielectric thin film and an insulator, it is not influential on measurement of the sheet resistivity. The measurement was made by bringing probes in contact with a 120-mm-diameter disc substrate, which could be treated as a substantially infinitely large area, at a position of radius 30-40 mm.

Based on the thus obtained resistance value R, a sheet resistivity $\rho_s$ and a volume resistivity $\rho_v$ were calculated from the following formula:

$$\rho_s = F \cdot R \qquad (8)$$

$$\rho_v = \rho_s \cdot t \qquad (9)$$

where t is the film thickness, and F is the correction value to be determined by the shape of the thin film area to be measured, usually in a range of from 4.3 to 4.5; it was 4.4 here.

For evaluation of recording/retrieving, a DDU1000 tester (wavelength of approximately 780 nm) manufactured by PulseTek Corporation were used. The used tester was one selected from: a tester 1 (a circle of approximately 1.25 µm in spot shape, $1/e^2$ in intensity) in the form of a DDU1000 tester with NA=0.55, and a tester 2 (a circle of approximately 1.3 µm in spot shape, $1/e^2$ in intensity) in the form of a DDU1000 tester with NA=0.5.

With a reference linear velocity of 1.2 m/s of CD assumed as the 1-times velocity, overwriting characteristics was evaluated for every one of from the 1-times to 12-times velocities.

The data reference clock period, which was 231 nsec at the 1-times linear velocity, was varied in inverse proportion to the individual linear velocity.

Unless otherwise mentioned, each retrieving was made at the 2-times velocity. After an output signal from the DDU1000 tester was passed through a high-pass filter whose cut-off frequency was in a range of 5-20 kHz, jitter was measured by a time interval analyzer (manufactured by Yokogawa Electric Co., Ltd., a Japanese corporation).

Modulation ml ($=I_{11}/I_{top}$) was read by observing the eye pattern on an oscilloscope. Separately from this, $R_{top}$ was obtained as corrected by a CD reference disc CD5B (put on the market from Philips, a Dutch corporation).

After EFM random data was recorded, 3T mark jitter and 3T space jitter were measured, and the higher jitter whichever was employed as the 3T jitter.

Unless otherwise mentioned, the ratio (Pe/Pw) of the erasure power Pe to the recording power Pw was constant, and Pw was varied stepwise by 1 mW pitch from 9 mW to 20 mW or roughly 25 mW.

Also unless otherwise mentioned, the bias power Pb, like the retrieving light power Pr, was constant at 0.8 mW.

In the measurement of 3T/11T overwriting erase ratio. After a repeating pattern of a 3T mark and a 3T inter-mark space (a 3T pattern) was recorded one time, a repeating pattern of an 11T pattern and an 11T inter-mark space (an 11T pattern) was overwritten, and then the amount of reduction (in units of dB) of carrier level of the 3T mark was measured as an erase ratio (erasability). The measurement of carrier level was made by a spectrum analyzer (TR4171) manufactured by Advantest, or 8567A manufactured by Hewlett-Packard Company, using the output retrieving signal of the tester 1 or tester 2 as an input signal. Overwriting was made at each and every linear velocity, but every retrieving was made at one and the same CD linear velocity (1.2 m/s). The resolution band width of the spectrum analyzer was 30 kHz, the video band width was 100 Hz, and the input impedance was 50 Ω.

Further, the evaluation of overwriting characteristics was made, unless otherwise mentioned, after making overwriting 10 times (overwriting on the same track 9 times after recording in the unrecorded-state recording area for the first time). For evaluation of the recorded signal after acceleration test, the recorded signal overwritten 10 times prior to the acceleration test was only retrieved after the acceleration test, whereupon the evaluation was made.

Embodiment 1

In the foregoing basic example, the disc was manufactured in the following manner, and recording on the disc was carried out:

On the substrate, a lower protective layer of $(ZnS)_{80}(SiO_2)_{20}$, a recording layer of $In_8Ge_5Sb_{66}Te_{21}$, an upper protective layer of $(ZnS)_{80}(SiO_2)_{20}$, a reflective layer of $Al_{99.5}Ta_{0.5}$, and a UV-curable resin layer were deposited 97 nm, 19 nm, 40 nm, 250 nm and approximately 4 μm, respectively in film thickness in this sequence. Thus a rewritable compact disc (CD-RW) was obtained. The volume resistivity $\rho_v$ and the sheet resistivity $\rho_s$ of the $Al_{99.5}Ta_{0.5}$ reflective layer were 100 nΩ·m and 0.4 Ω/□ (quadrature), respectively. Initialization was made by scanning at a linear velocity of approximately 3-4 m/s with laser diode light of approximately 810 nm in wavelength whose spot shape was oval having a long diameter of approximately 70 μm and a short diameter of approximately 1.3 μm. The irradiation power was 600-700 mW.

Using the tester 1 with NA=0.55, trial overwriting of an EFM-modulated signal was made on the obtained disc at each of 1-, 2-, 4-, 6-, 8- and 10-times velocities, and the characteristics of the disc was evaluated.

With the ratio (Pe/Pw) of the erasure power Pe and the recording power Pw kept constant at 0.5, Pw was varied stepwise by 1 mW pitch from 9 mW to 20 mW, during which overwriting was evaluated for every recording power. Each estimation was made in terms of characteristic values after making overwriting 10 times. The divided recording pulse method was as follows:

when the time length of an individual recorded mark was nT (T is the data reference clock period, and n is an integer within a range of from 3 to 11), recording light of erasure power Pe, which is able to crystallize an amorphous-state portion, irradiated inter-mark portions, for the recorded marks, the time length (n−j)T was divided into $\alpha_1 T, \beta_1 T, \alpha_2 T, \beta_2 T, \ldots, \alpha_m T, \beta_m T$ (where m=n−1) in this sequence so as to satisfy $\Sigma_i(\alpha_i+\beta_i)=$n−j (j is a real number within a range of $0.0 \leq j \leq 2.0$), and the recording light of recording power Pw (Pw>Pe), which is able to melt the recording layer within the time length $\alpha_i T$ ($1 \leq i \leq m$), irradiated the recording layer, and the recording light of bias power Pb ($0 < Pb \leq 0.5 Pe$) within the time length $\beta_i T$ ($1 \leq i \leq m$) the recording layer to overwrite; and when a linear velocity of 1.2 m/s was the reference velocity (1-times velocity), (1) for the 4-times velocity, $\alpha_1$=from 0.75 to 0.25, $\alpha_i$=from 0.25 to 0.75 ($2 \leq i \leq m$), $\alpha_i+\beta_{i-1}=1$ ($2 \leq i \leq m$), (2) for a velocity slower than the 4-times velocity, $\alpha_1$=from 0.05 to 1.0, $\alpha_i$=from 0.05 to 0.5 ($2 \leq i \leq m$), $\alpha_i+\beta_{i-1}=1$ ($2 \leq i \leq m$), and (3) for a velocity faster than the 4-times velocity, $\alpha_1$=from 0.5 to 2, $\alpha_i$=from 0.5 to 1 ($2 \leq i \leq m$), $\alpha_i+\beta_{i-1}=1$ ($2 \leq i \leq m$).

Specific figures for $\alpha_1, \alpha_i, \beta_m$ at each velocity are shown in Table-1.

For the 4- through 10-times velocities in particular, recording was made strictly in accordance with the divided pulse method using $\alpha_i, \beta_i$ (FIG. 4) normalized by the current CD-RW specifications (Orange Book Part 3, Version 20).

Figure 10:
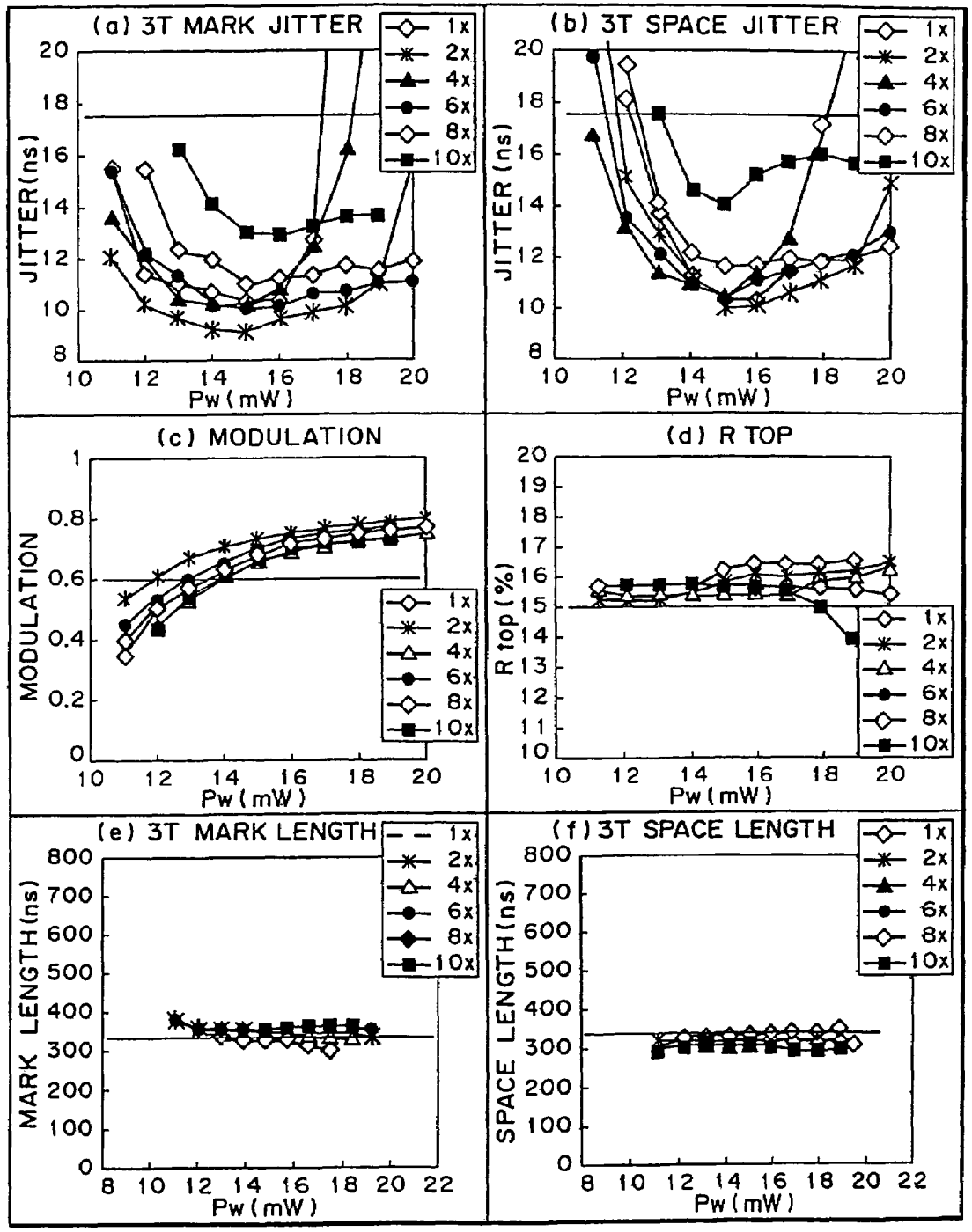
FIGS. 10, (a) through (f), is a set of graphs showing overwriting characteristics according to Embodiment 1.

The result of evaluation of the overwriting characteristics is shown in FIG. 10. (a) depicts a 3T mark jitter; (b), a 3T space jitter; (c), modulation $m_{11}$; (d), $R_{top}$; (e), a 3T mark length; and (f), dependence of the 3T space length on Pw.

As is apparent from Table-1, the optimum recording power was around the range of from 15 to 16 mW, and the overwriting characteristics was evaluated in terms of this power value.

As is indicated by (c) and (d) of FIG. 10, for every linear velocity, the modulation $m_{11}$ was in the range of from 60 to 80% (0.6-0.8), and $R_{top}$ was in the range of from 15 to 25%.

The horizontal line in each of (e) and (f) of FIG. 10 indicates that a 3T mark length during retrieving at the 2-times velocity was 231×3×½=346.5 (nsec). Since the tolerance of each of the mark length and the space length is usually roughly ±10%, such length within the range of ±30-40 nsec suffices; however, FIG. 10 indicates that most of errors of mark length and space length were within the allowance. Likewise, when Pw=from 15 to 16 mW, desired values were obtained within the range of roughly ±10% for 4T to 11T mark lengths and space lengths.

The horizontal line in each of (a) and (b) of FIG. 10 indicates that the maximum value of 3T jitter specifications was equal to 35×½=17.5 (nsec) during retrieving at the 2-times velocity. A good jitter value of 17.5 nsec or less was obtained for every linear velocities.

Thus good recording characteristics were obtained for every linear velocity, and good recording characteristics also for 4- to 10-times velocities were obtained by the divided recording pulse method according to CD-RW specifications.

Figure 11A:
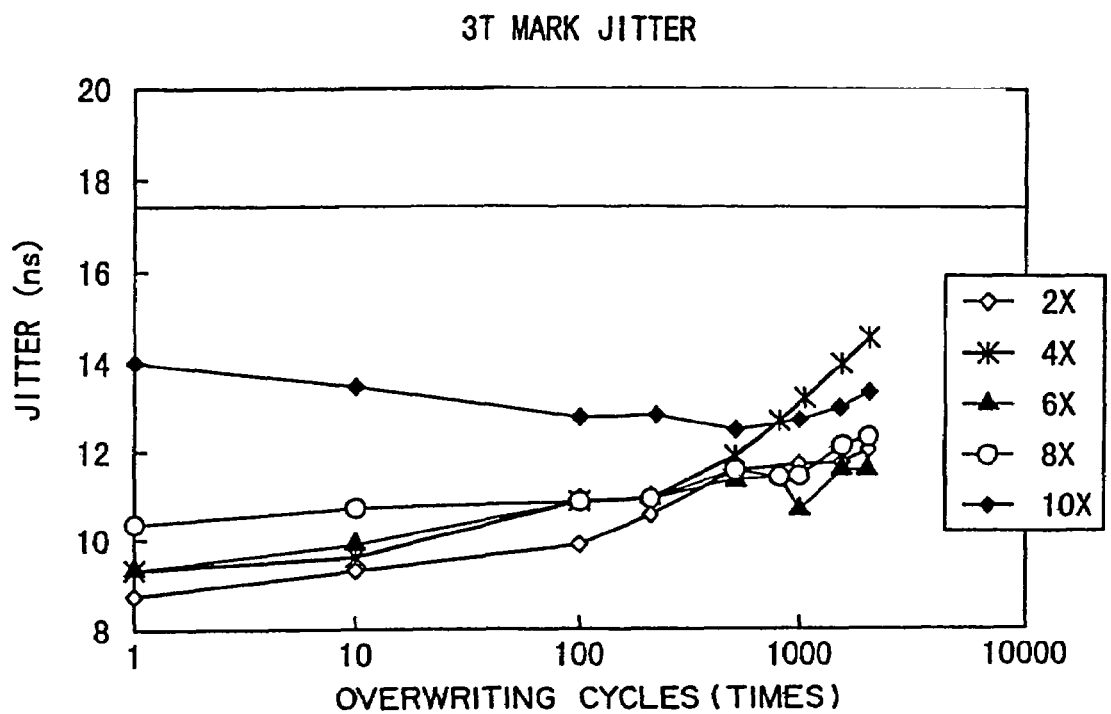
FIGS. 11, (a) and (b), is a pair of graphs showing overwriting durability according to Embodiment 1.
Figure 11B:
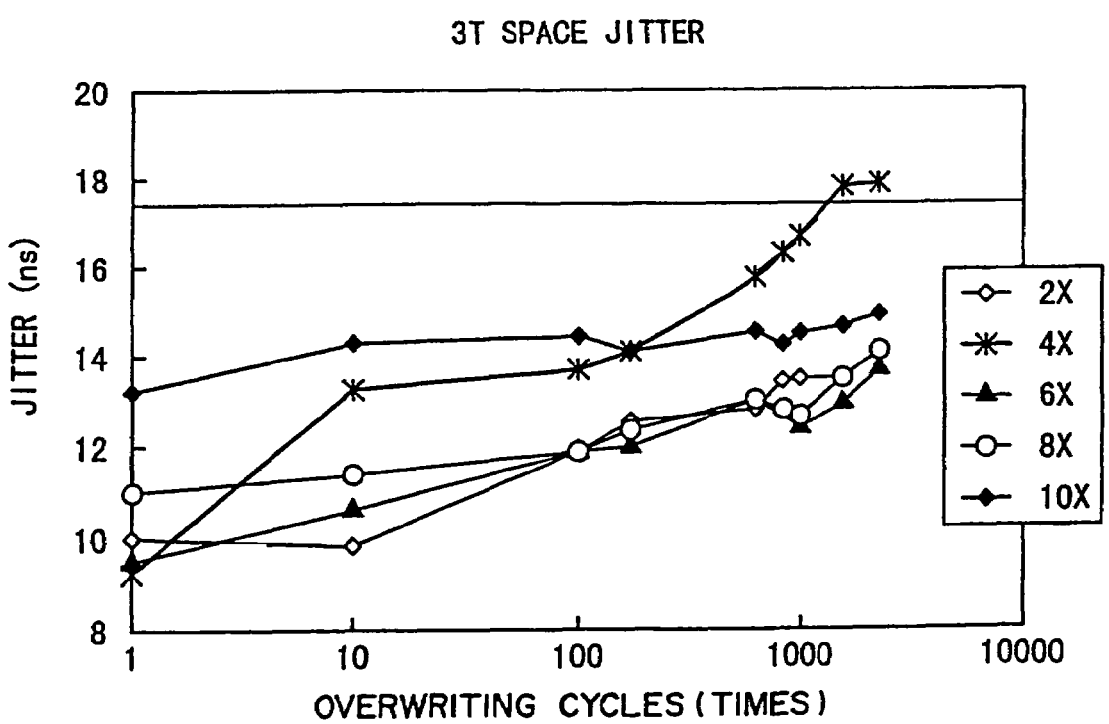

FIG. 11 shows the result of evaluation of overwriting durability at the 2- to 10-times velocities. (a) depicts dependence of a 3T mark jitter on the number of repetition of overwriting when Pw/Pe=15 mW/7.5 mW, and (b) depicts dependence of a 3T space jitter on the number of repetition of overwriting when Pw/Pe=15 mW/7.5 mW.

For every linear velocity, overwriting durability of 1,000 times required to CD-RW was satisfied.

Further, Table-1 integratedly shows divided recording pulse method for every linear velocity, recording power, erasure power, and 3T/11T overwriting erase ratio. The term "3T/211T overwriting erase ratio" means an erase ratio of a 3T signal when a single-period signal of an 11T mark and an 11T space was overwritten after a single-period signal of a 3T mark and a 3T space had been recorded. The linear velocity was expressed in terms of how many times faster it was than the 1-times velocity of 1.2 m/s.

TABLE 1

| Velocity | $\alpha_1$ | $\alpha_I$ ($2 \leq i \leq m$) | $\beta_m$ | Pw/Pe (mW) | 3T/11T overwriting erase ratio (db) |
|---|---|---|---|---|---|
| 1-times | 0.5 | 0.15 | 0.55 | 15/7.5 | 30 dB or more |
| 2-times | 0.5 | 0.25 | 1.0 | 15/7.5 | 30 dB or more |
| 4-times | 1.0 | 0.5 | 0.5 | 15/7.5 | 30 dB or more |
| 6-times | 1.0 | 0.5 | 0.5 | 16/8 | 29 dB |
| 8-times | 1.0 | 0.5 | 0.5 | 16/8 | 28 dB |
| 10-times | 1.0 | 0.5 | 0.5 | 16/8 | 27 dB |

As shown in Table-1, the 3T/11T overwriting erase ratio of 29-30 dB was obtained for each of the 1-times through 6-times velocities, and an adequate erase ratio of 28 dB was obtained when Pw=16 mW and Pe=8 mW even for a high linear velocity, the 8-times velocity. And a high erase ratio of 27 dB was obtained also for the 10-times velocity.

While the disc was rotated in CAV mode at the 4-times velocity on the innermost track (22 mm in radius) of the recording area and at the 10-times velocity on the outermost track of the recording area (58 mm in radius), a data reference clock corresponding to every radial position was recorded on the disc throughout the entire recording area as the radial position was displayed stepwise by a pitch of approximately 5 mm. With the lapse of 500 hours after this disc was placed under an acceleration test environment of 80° C./85% RH (relative humidity), the recorded signal was found scarcely deteriorated. The jitter was 17.5 ns or less during retreiving at the 2-times velocity, and the modulation $m_{11}$ was found scarcely lowered retaining 90% or higher of the initial value.

Embodiment 2

In the above-mentioned basic example, recording was carried out on a disc manufactured in the following manner:

The disc was manufactured in the same manner as Embodiment 1 except that the recording layer comprised a composition of $In_8Ge_5(Sb_xTe_{1-x})_{87}$ where x was 74.4, 75.4 and 76.3. Thus three kinds of layers different in composition were obtained.

The overwriting characteristics was evaluated using the tester 1 with NA=0.55.

At each of the 2-, 4-, 6- and 8-times velocities, the jitter between 3T marks was measured as Pw was varied in the range of 9-20 mW stepwise by a pitch of 1 mW.

The divided recording pulse method was the same as Embodiment 1, in which method $m=n-1$, $\alpha_1=1, \alpha_i=0.5 (2 \leq i \leq m)$, $\beta_m=0.5, \alpha_i+\beta_{i-1}=1.0 (2 \leq i \leq m)$.

Namely this divided pulse method was that of FIG. 4 in accordance with CD-RW specifications.

For any of the described figures of x, the 3T/11T overwriting erase ratio at the 8-times velocity was 30 dB or more when Pw=from 15 to 18 mW.

Figure 12A:
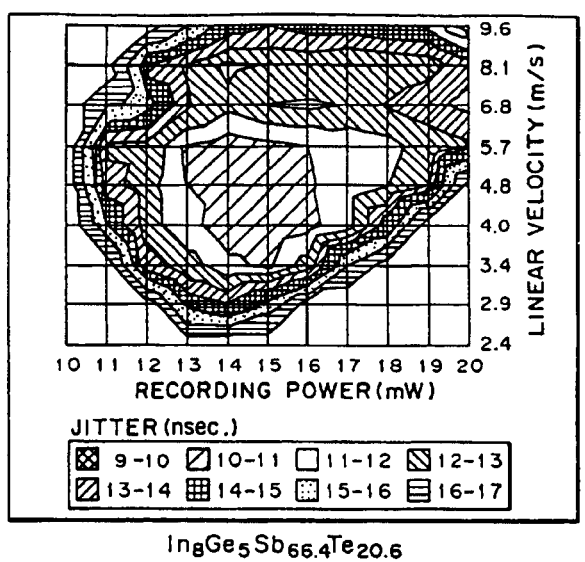
FIGS. 12, (a), (b) and (c), is a set of graphs showing overwriting durability according to Embodiment 1.
Figure 12B:
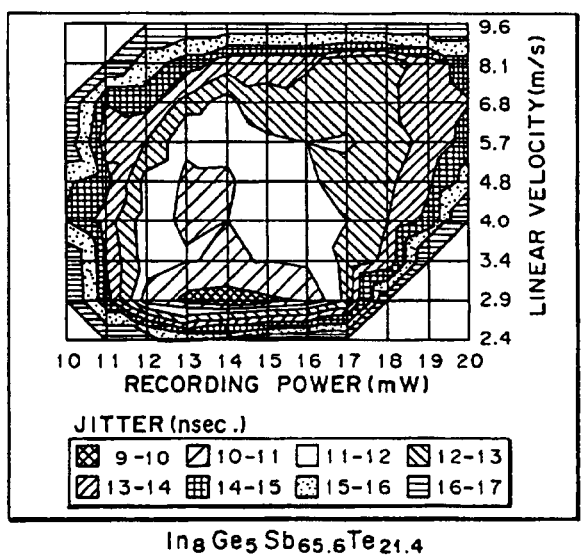
Figure 12C:
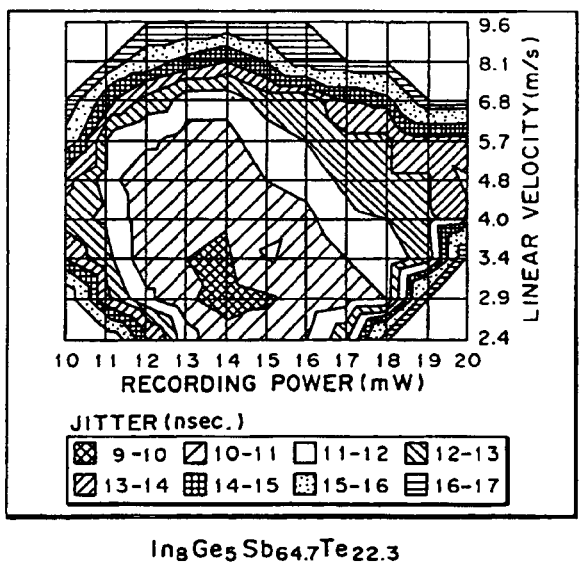

FIG. 12 shows the result of evaluation of overwriting characteristics. (a) depicts dependence of a jitter value on the linear velocity and the recording power when x=76.3, (b) depicts such dependence but when x=75.4, and (c) depicts such dependence but when x=74.4, read at 2-times velocity.

Jitter values were actually measured at the grid points of FIG. 12, and the individual jitter values at the respective measured points were depicted in a contour map (using EXCEL 97, software of Microsoft). The individual contour lines were found locally slightly sunken and distorted due to the data interpolation function of the used software, but these local dents and distortions can be negligible in grasping the whole image.

It turns out from comparison between (a) through (c) of FIG. 12 that the larger the figure of x, the nearer the low-jitter areas existed toward the high linear velocity. In any of (a) through (c), the areas where the jitter is 17 nsec (34 nsec in terms of the jitter at the 1-times velocity) or less can cover the 4- through 8-times velocities (4.8-9.6 m/s). The deviation also is within the range of the specifications.

When recording was made on the disc of (c) of FIG. 12 by each of commercially available 4-times-velocity drives (CRW4416 manufactured by Yamaha, CRX120 manufactured by Sony, and 7040AD manufactured by Ricoh, all Japanese corporations), a good result was found in each test. And also the block error rate of the recorded signal was within the range of only a single figure, so a read-compatibility at least the 4-times velocity could be proved.

With the lapse of 500 hours after this disc was placed under an acceleration test environment of 80° C./85% RH (relative humidity), the recorded signal was found scarcely deteriorated. The modulation $m_{11}$ was found scarcely lowered retaining 90% or higher of the initial value.

Embodiment 3

In the above-mentioned basic example, recording was carried out on a disc manufactured in the following manner:

The disc was manufactured in the same manner as Embodiment 1 except that the recording layer comprised a composition of $Ge_5Sb_{73}Te_{22}$ (Sb/Te≈3.32).

The 3T/11T overwriting erase ratio at the 8-times velocity was 31 dB when Pw/Pe=17 mW/8.5 mW.

Figure 13:
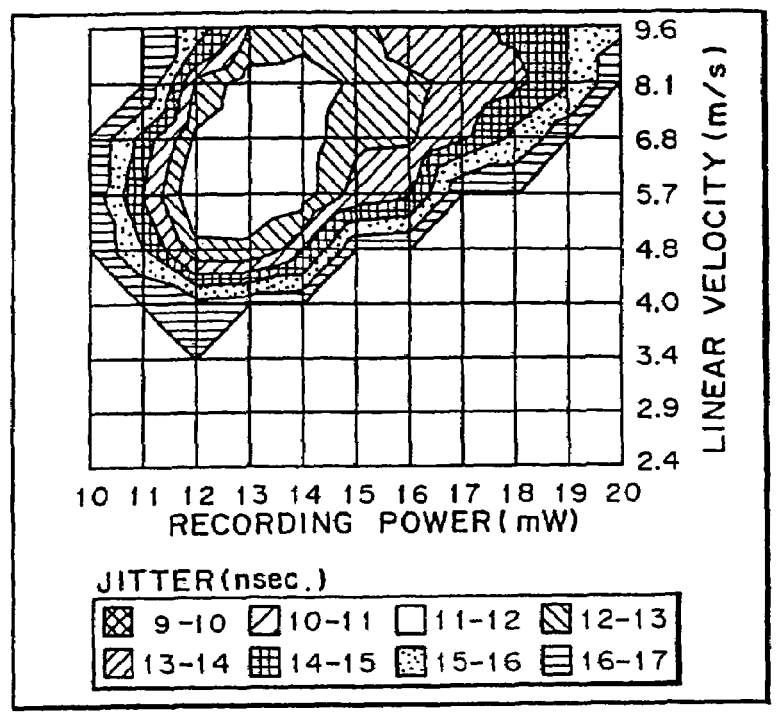
FIG. 13 is a graph showing overwriting durability according to Embodiment 3.

The overwriting characteristics was evaluated in the same manner as in Embodiment 2. FIG. 13 shows a contour map of jitter similar to FIG. 12. The low-jitter areas existed toward the high linear velocity because Sb/Te ratio was higher than Embodiments 1 and 2, but good overwriting characteristics could be realized by the divided pulse method in according to CD-RW specifications at the 4- through 8-times velocities.

Comparative Example 1

The disc was manufactured in the same manner as Embodiment 1 except that the recording layer comprised a composition of $Ge_5Sb_{68}Te_{27}$ (Sb/Te≈2.52<2.57).

The overwriting characteristics was evaluated by the tester 1 in the same manner as in Embodiment 1; as a result, the erase ratio was rather inadequate even at the 4-times velocity, and overwriting was impossible at all at the 8-times velocity.

The 3T/11T overwriting erase ratio at the 8-times velocity was less than 20 dB.

Even though the divided pulse method was modified, the retrieving jitter at the 1-times velocity did not become 35 nsec or less.

Comparative Example 2

The disc was manufactured in the same manner as Embodiment 1 except that the recording layer comprised a composition of $Ge_5Sb_{77}Te_{18}$ (Sb/Te≈4.28>4.0).

The overwriting characteristics was evaluated by the tester 1 in the same manner as in Embodiment 1; as a result, the 3T/11T overwriting erase ratio at the 8-times velocity was 32 dB when Pw/Pe=17 mW/8.5 mW. However, due to high noise related to crystalline grains, jitter exceed 17.5 nsec at 2-times velocity retrieving.

But when the jitter was evaluated by the divided pulse method in accordance with CD-RW at the 4-times velocity, the retrieving jitter at the 2-times velocity did not become 17.5 nsec or less (retrieving jitter at the 1-times velocity: 35 nsec or less) as recrystallization of amorphous marks was remarkable.

Comparative Example 3

The disc was manufactured in the same manner as Embodiment 1 except that the recording layer comprised a composition of $Ge_{12}Sb_{67}Te_2$, (Sb/Te≈3.2).

The overwriting characteristics was evaluated in the same manner as in Embodiment 2; as a result, the 3T/11T overwriting erase ratio at the 8-times velocity was 30 dB when Pw/Pe=17 mW/8.5 mW.

But when the jitter was evaluated by the divided pulse method in accordance with CD-RW at the 4-times velocity, the retrieving jitter at the 2-times velocity did not become 17.5 nsec or less (retrieving jitter at the 1-times velocity: 35 nsec or less) as recrystallization of amorphous marks was remarkable.

Embodiments 4-5, Comparative Examples 4-5

The disc was manufactured in the same manner as Embodiment 1 except that the recording layer comprised an InGeSbTe alloy or an InAgSbTe alloy, which is conventional, as a recording layer for CD-RW.

The compositions of various concrete recording layers are shown in Table-1:

TABLE 2

| Embodiment 4 | Embodiment 5 | Comparative Example 4 | Comparative Example 5 |
|---|---|---|---|
| $In_8Ge_5Sb_{65}Te_{22}$ | $In_8Ag_5Sb_{65}Te_{22}$ | $In_8Ge_5Sb_{62}Te_{26}$ | $In_8Ag_5Sb_{62}Te_{25}$ |
| (Sb/Te = 2.95) | (Sb/Te = 2.95) | (Sb/Te = 2.48) | (Sb/Te = 2.48) |

The recording layers of Comparative Examples 4 and 5 are recording layers that satisfy the current CD-RW specifications and has a read-compatibility with the 1- through 4-times velocities in accordance with CD-RW specifications (specified by Orange Book Part 3, Version 2.0). For 2- through 4-times velocities, the same divided pulse method as Embodiment 2 was employed.

In either of an InGeSbTe alloy and an InAgSbTe alloy, its dependence on the linear velocity is univocally determined by the Sb/Te ratio. The recording layers of Embodiments 4 and 5 were obtained by relatively increasing an amount of Sb in the recording layers of Comparative Examples 4 and 5 to satisfy Sb/Te=2.95.

On the media of Embodiments 4 and 5, good overwriting characteristics was possible at the 4-times through 8-times velocities in the same divided pulse method as in Embodiment 2.

With the medium of each of Embodiments 5 and 6, the 3T/11T overwriting erase ratio at the 8-times velocity was 28 dB; with either medium, Pw/Pe=0.5.

Table-3 and Table-4 integratedly show the various characteristics before and after the lapse of 500 hours since these discs were placed under an acceleration test environment of 80° C./85% RH (relative humidity).

Specifically, Table-3 reevaluates the characteristics of the recorded signal after the lapse of 100 hours after the medium was place in an acceleration test environment on which recording had previously been made at the 4-times velocity, and Table-4 reevaluates such characteristics after the lapse of 100 hours after the medium was place in an acceleration test environment on which recording had previously been made at the 8-times velocity. (Either recording had been made by overwriting 10 times.)

TABLE 3

| | Recording at 4-times velocity | | | | |
|---|---|---|---|---|---|
| | Acceleration Time (hours) | 3T Jitter (nsec) | $R_{top}$ (%) | $m_{11}$ | Recording Power (mW) |
| Embodiment 4 | 0 | 10.8 | 16.4 | 0.63 | 13 |
| | 100 | 11 | 15.1 | 0.65 | |
| Embodiment 5 | 0 | 11.8 | 16.6 | 0.65 | 13 |
| | 100 | >17.5 | 15.3 | 0.41 | |
| Comparative Example 4 | 0 | 11.7 | 16.2 | 0.73 | 12 |
| | 100 | 11.6 | 15.0 | 0.74 | |
| Comparative Example 5 | 0 | 12 | 17.3 | 0.73 | 12 |
| | 100 | 12.3 | 16.2 | 0.73 | |

TABLE 4

| | Recording at 8-times velocity | | | | |
|---|---|---|---|---|---|
| | Acceleration Time (hours) | 3T Jitter (nsec) | $R_{top}$ (%) | $m_{11}$ | Recording Power (mW) |
| Embodiment 4 | 0 | 15.4 | 16.2 | 0.67 | 14 |
| | 100 | 15.4 | 15.1 | 0.66 | |
| Embodiment 5 | 0 | 13.9 | 16.8 | 0.69 | 14 |
| | 100 | 21.2 | 15.1 | 0.64 | |

TABLE 4-continued

| | Recording at 8-times velocity | | | |
|---|---|---|---|---|
| | Acceleration Time (hours) | 3T Jitter (nsec) | $R_{top}$ (%) | $m_{11}$ | Recording Power (mW) |
| Comparative Example 4 | 0 | — | — | — | Unable to overwrite |
| | 100 | — | — | — | |
| Comparative Example 5 | 0 | — | — | — | Unable to overwrite |
| | 100 | — | — | — | |

As is understood from Table-3 and Table-4, the disc according to Embodiment 4 is excellent not only in initial characteristics but in archival stability even if the Sb/Te ratio is increased in order to make the existing medium (Comparative Examples 4 and 5) read-compatible with the 1- through 4-times velocities to cope with higher linear velocities.

On the other hand, in the disc according to Embodiment 5 in which the Sb/Te ratio was likewise increased, reduction of modulation and increase of jitter were remarkable after the 100-hour acceleration test at either of the 4- and 8-times velocities. And the signal amplitude was reduced as amorphous marks disappeared; accordingly the disc of Embodiment 4 is superior in archival stability of amorphous marks as compared to that of Embodiment 5.

With continued making the acceleration test of the medium of Embodiment 4 to 500 more hours, the initial recorded signal was found scarcely deteriorated, and the modulation $m_{11}$ remained 90% or more of the initial value.

It turns out from these facts that merely increasing the Sb/Te ratio of the medium read-compatible with the 1-through 4-times velocities do not suffice to achieve a medium read-compatible with high linear velocities. Consequently the present inventors applied these recording layer materials to CD-RWs read-compatible with the 8-times velocity and then made comparison and studies, and as a result, discovered that the recording layers in a GeSbTe alloy according to their concept have a unique effect.

Embodiment 6

In the foregoing basic example, the disc was manufactured in the following manner and recording on the disc was carried out:

The disc was manufactured in the same manner as in Embodiment 1 except that on the substrate, a lower protective layer of $(ZnS)_{80}(SiO_2)_{20}$, a recording layer of $In_8Ge_5Sb_{66}Te_{21}$, and an upper protective layer of $(ZnS)_{80}(SiO_2)_{20}$, were deposited 105 nm, 19 nm and 45 nm, respectively in film thickness in this sequence, and thereover, a reflective layer were deposited in a double-layer structure of an $Al_{99.5}Ta_{0.5}$ layer (10 nm) and an Ag layer (200 nm) in this sequence.

During that time, after the AlTa reflective layer had been deposited, the resulting semi-manufacture was placed open to atmosphere for several hours until its surface became naturally oxidized to form an interfacial oxidation layer, whereupon the Ag layer was sputtered thereover. This interfacial oxidation layer serves to prevent mutual diffusion between Al and Ag. Finally, on the double-layer reflective layer, a UV-curable resin layer was deposited approximately 4 μm in film thickness. The sheet resistivity $\rho_s$ of the whole double-layer structure was 0.23 Ω/□ (quadrature).

Figure 14:
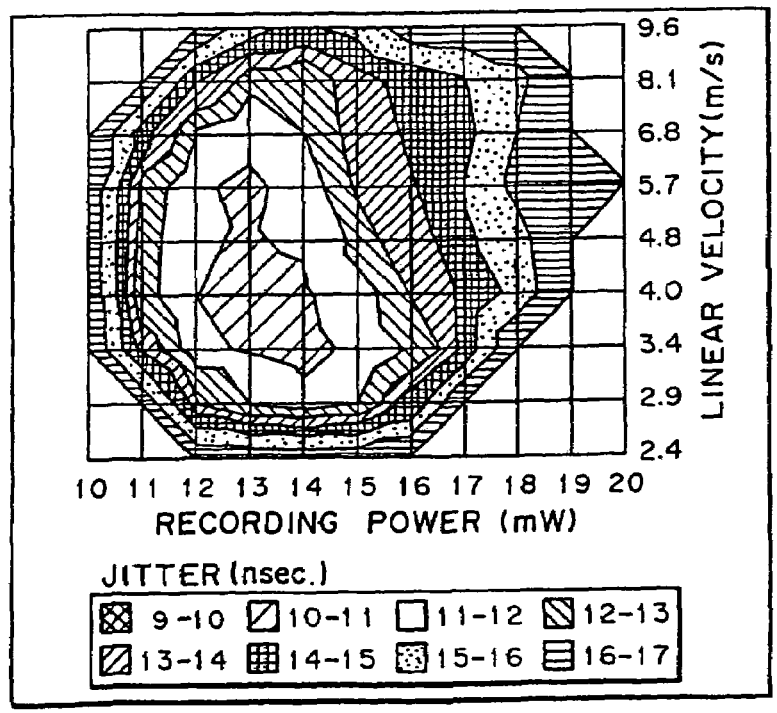
FIG. 14 is a graph showing overwriting durability according to Embodiment 6.

FIG. 14 shows the result of evaluation conducted in the same manner as in Embodiment 2 using the tester 1. Good overwriting characteristics similar to that of Embodiment 2 was obtained.

At the 8-times velocity, the 3T/11T overwriting erase ratio was 31 dB when Pw/Pe=16 mW/8 mW. And $R_{top}$=17% and $m_{11}$=0.71. At the 4-times velocity, $R_{top}$=17% and $m_{11}$=0.65 when Pw/Pe=15 mW/7.5 mW.

Embodiment 7

In the foregoing basic example, the disc was manufactured in the following manner, and recording on the disc was carried out:

On the substrate, a lower protective layer of $(ZnS)_{80}(SiO_2)_{20}$, a recording layer of $In_8Ge_5Sb_{67}Te_{23}$, an upper protective layer of $(ZnS)_{80}(SiO_2)_{20}$, a reflective layer of $Al_{99.5}Ta_{0.5}$, and a UV-curable resin layer were deposited 100 nm, 21 nm, 40 nm, 50 nm and approximately 4 μm, respectively in film thickness in this sequence. Thus a rewritable compact disc (CD-RW) was obtained. The volume resistivity $\rho_v$ and the sheet resistivity $\rho_s$ of the $Al_{99.5}Ta_{0.5}$ reflective layer were 100 nΩ·m and 0.4 Ω/□ (quadrature), respectively.

An EFM-modulated signal was overwritten on the obtained disc at each of 1-, 2-, 4-, 6-, 8- and 10-times velocities, using the tester 1 with NA=0.55. The recording pulse strategy was such that, likewise Embodiment 2, m=n−1, T was varied in proportion to the linear velocity to keep the recording density constant, $\alpha_1T$ and $\alpha_iT$ (2≦i≦m) and $\alpha_i+\beta_{i-1}$ (2≦i≦m) were kept constant irrespective of the linear velocity, and only $\beta_mT$ was varied according to the linear velocity. Namely, $\alpha_1T$=23.1 ns, $\alpha_iT$=13.9 ns (2≦i≦m). The overwriting characteristics was evaluated by measuring the 3T jitter, the mark length and the modulation after making overwriting 10 times. The recording pulse strategies for the individual linear velocities were integratedly shown in Table-5. The linear velocity was expressed in terms of how many times faster it was than the 1-times velocity of 1.2 m/s. When the 1-times velocity was 1.2 m/s, T=231 nsec.

TABLE 5

| Velocity | $\alpha_1$ | $\alpha_i$ (2 ≦ i ≦ m) | $\beta_m$ | 3T/11T overwriting erase ratio (dB) | Pw/Pe (mW) | 3T jitter (nsec) |
|---|---|---|---|---|---|---|
| 1-times | 0.1 | 0.06 | 1.0 | 30 dB or more | 15/7.5 | 24.5 |
| 2-times | 0.2 | 0.12 | 0.9 | 30 dB or more | 15/7.5 | 20.9 |
| 4-times | 1.4 | 0.24 | 0.7 | 30 dB or more | 15/7.5 | 22.8 |
| 6-times | 1.6 | 0.36 | 0.55 | 29 dB | 15/7.5 | 23.0 |
| 8-times | 1.8 | 0.48 | 0.4 | 28 dB | 15/7.5 | 22.7 |
| 10-times | 1.0 | 0.6 | 0.3 | 27 dB | 15/7.5 | 24.0 |

For every linear velocity, in the above-mentioned Pw, the refectivity $R_{top}$ of 17%, the modulation m11 of 65-70%, and the asymmetry within the range of ±10% were obtained.

For the 10-times velocity, when $\alpha_i$ (i=from 2 to m) was 0.5, the 3T jitter was 25 nsec; thus the overwriting characteristics substantially similar to that when $\alpha_i$ (i=from 2 to m) was 0.6.

It is understood from Table-5 that, by employing such a divided pulse method that the recording pulse width per se is fixed, the clock period is varied according to the linear velocity, and the tail end off-pulse section $\beta_m$ becomes larger for the slower linear velocity, it is possible to cope with a wide range of linear velocities using the relatively simple recording pulse generator circuit.

Embodiment 8

In the foregoing basic example, the disc was manufactured in the following manner, and recording on the disc was carried out:

On the substrate, a lower protective layer of $(ZnS)_{80}(SiO_2)_{20}$, a recording layer of $In_8Ge_5Sb_{66}Te_{21}$, an upper protective layer of $(ZnS)_{85}(SiO_2)_{15}$, a reflective layer of $Al_{99.5}Ta_{0.5}$, and a UV-curable resin layer were deposited 97 nm, 19 nm, 40 nm, 250 nm and approximately 4 μm, respectively in film thickness in this sequence. The volume resistivity $\rho_v$ and the sheet resistivity $\rho_s$ of the $Al_{99.5}Ta_{0.5}$ reflective layer were 100 nΩ·m and 0.4 Ω/□ (quadrature), respectively.

Figure 17A:
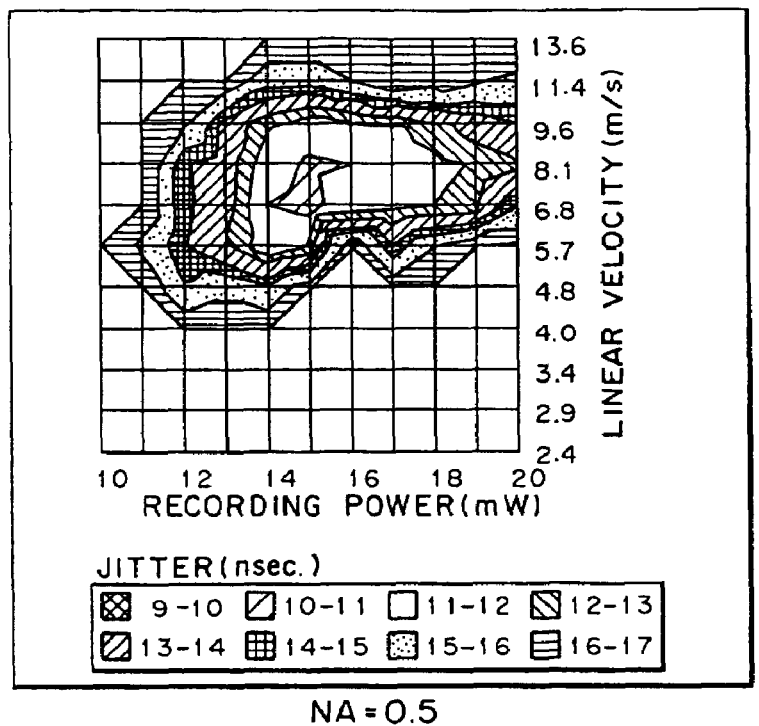
FIGS. 17, (a) and (b), is a set of graphs showing overwriting characteristic according to Embodiment 8.
Figure 17B:
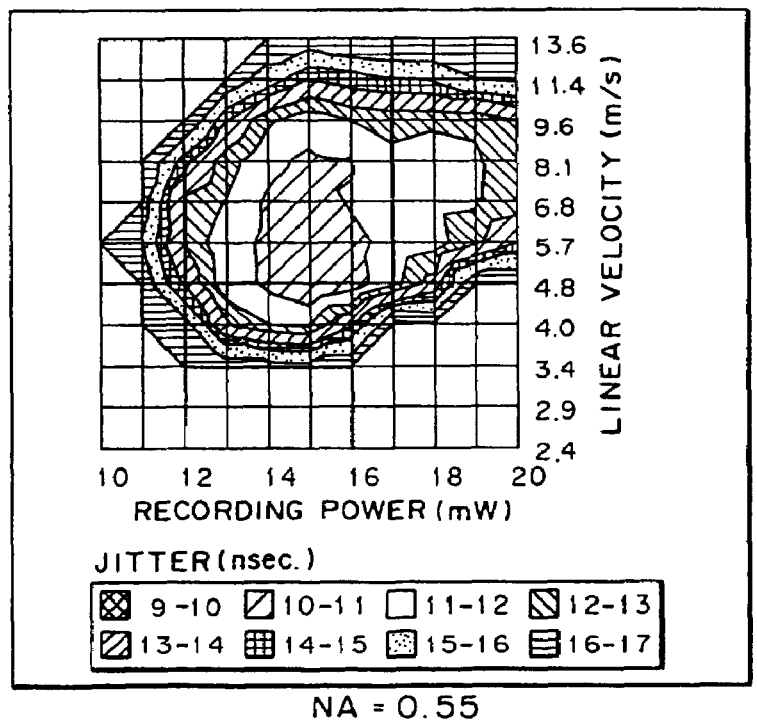

The overwriting characteristics was evaluated using the tester 1 with NA=0.55 and the tester 2 with NA=0.5. For the 2-, 4-, 6-, 8- and 10-times velocities, the jitter between 3T marks was intermittently measured while Pw was varied from 9 to 20 mW stepwise by a pitch of 1 mW with Pe/Pw kept constant at 0.5. For any of these linear velocities, the 3T/11T overwriting erase ratio was 25 dB or more when Pw=from 15 to 20 mW. While the pulse strategy was fixed to the strategy of FIG. 4 and only the data reference clock period was varied in inverse proportion to the linear velocity, the 3T jitter was measured. The result of measurement is shown in FIG. 17 in the same contour map as that of FIG. 13. (a) of FIG. 17 shows the contour map when NA=0.5, and (b), the contour map when NA=0.55.

In either case, the areas less than 17.5 ns in jitter were obtained in the range from 4- to 10-times velocities. The larger NA, the wider the read-compatible linear velocity range was obtained.

Embodiment 9

In the foregoing basic example, the disc was manufactured in the following manner, and recording on the disc was carried out:

On the substrate, a lower protective layer of $(ZnS)_{80}(SiO)_{20}$, a recording layer of $Ga_5Ge_5Sb_{68}Te_{22}$, an upper protective layer of $(ZnS)_{80}(SiO)_{20}$, a reflective layer of $Al_{99.5}Ta_{0.5}$, and a UV-curable resin layer were deposited 100 nm, 20 nm, 40 nm, 250 nm and approximately 4 μm, respectively in film thickness in this sequence. Thus a rewritable compact disc (CD-RW) was obtained. The volume resistivity $\rho_v$ and the sheet resistivity $\rho_s$ of the $Al_{99.5}Ta_{0.5}$ reflective layer were 100 nΩ·m and 0.4 Ω/□ (quadrature), respectively.

Using the tester 1 with NA=0.55, the overwriting erase ratio was measured; as a result, the 3T/11T overwriting erase ratio was 25 dB or more for the 8- and 10-times velocities.

Figure 18:
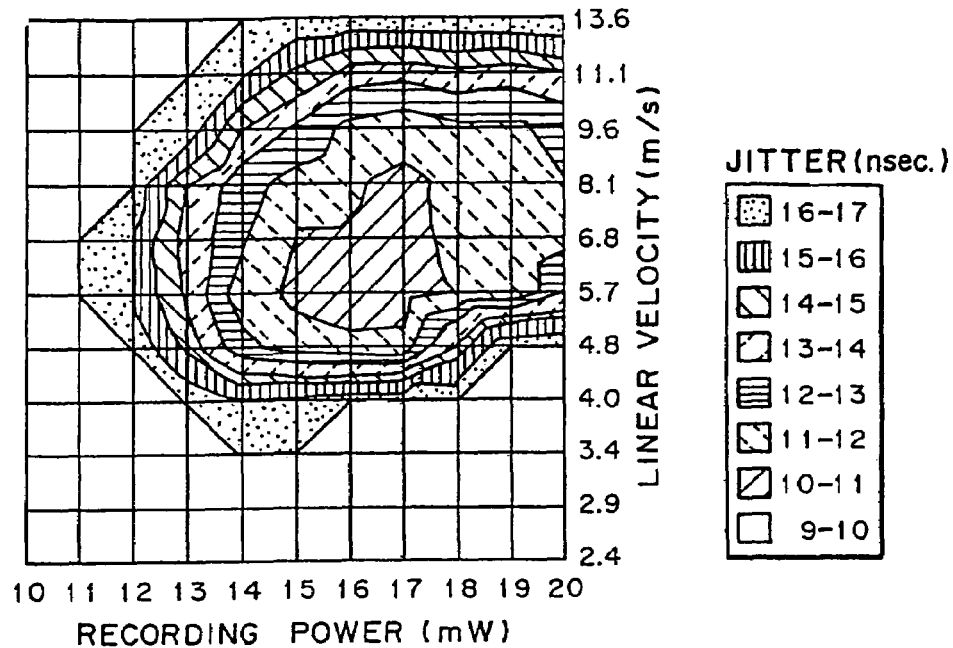
FIG. 18 is a graph showing overwriting durability according to Embodiment 9.
Figure 19:
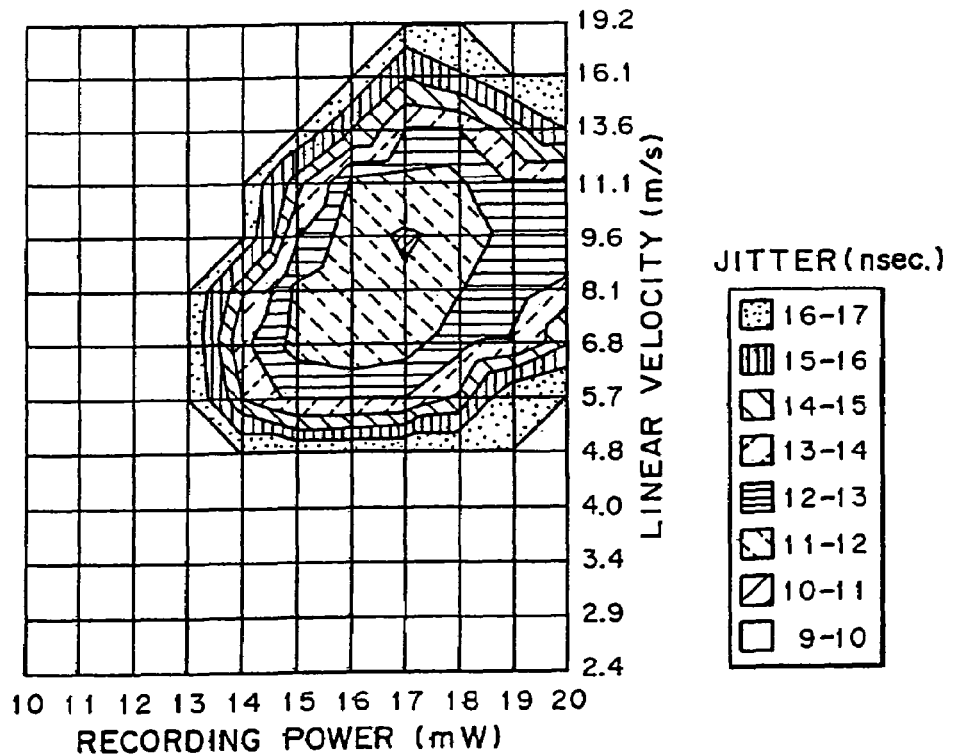
FIG. 19 is a graph showing overwriting durability according to Embodiment 10.

The dependence of jitter on the linear velocity and recording power was measured in the same manner as in Embodiment 9; the result of measurement is shown in FIG. 18. The used recording pulse strategy was such that m=n−1, $\alpha_{1=1}$, $\alpha_i$=0.5, $\beta_m$=0.5, $\alpha_i+\beta_{i-1}$=1 (constant with respect to i $(2 \leq i \leq m)$), and Pe/Pw was constant at 6.5.

For the 4-times linear velocity (4.8 m/s) through 10-times linear velocity (12 m/s), a good jitter was obtained. For the recording power such that the jitter was minimal, the modulation was in a range of from 0.6 to 0.8, $R_{top}$ was approximately 17%, and the asymmetry was within a range of ±10%.

The medium on which recording had been made was placed in an acceleration test environment of 80° C./85% for 500 hours, whereupon retrieving was made; as a result, substantially no variation was found in the modulation of the recorded signal, $R_{top}$, jitter and asymmetry. The modulation in particular remained 90% or more of the value before the acceleration test.

Embodiment 10

In the foregoing basic example, the disc was manufactured in the following manner, and recording on the disc was carried out:

On the substrate same as above, a lower protective layer of $(ZnS)_{80}(SiO_2)_{20}$, a recording layer of $In_3Ge_5Sb_{71}Te_{21}$, an upper protective layer of $(ZnS)_{80}(SiO_2)_{20}$, a reflective layer of an Al alloy (containing Mg of 1.01 atomic %, Si of 0.85 atomic %, Mn of 0.33 atomic %, Ti of 0.002 atomic %, and unavoidable impurities of at most 0.01 atomic %, or Ag of 0.91 weight %, Si of 0.88 weight %, Mn of 0.67 weight %, and Ti of 0.014 weight %), and a UV-curable resin layer were deposited 95 nm, 16 nm, 38 nm, 250 nm and approximately 4 μm, respectively in film thickness in this sequence. Thus a rewritable compact disc (CD-RW) was obtained. The volume resistivity $\rho_v$ and the sheet resistivity $\rho_s$ of the Al-alloy reflective layer were 90 nΩ·m and 0.36 Ω/□ (quadrature), respectively.

Using the tester 1 with NA=0.55, the overwriting erase ratio was measured; as a result, the 3T/11T overwriting erase ratio was 25 dB or more for the 8-, 10- and 12-times velocities.

The dependence of jitter on the linear velocity and recording power was measured in the same manner as in Embodiment 8; the result of measurement is shown in FIG. 18. The used recording pulse strategy was such that m=n−1, $\alpha_1$=1, $\alpha_i$=0.5, $\beta_m$=0.5, $\alpha_i+\beta_{i-1}$=1 (constant with respect to i $(2 \leq i \leq m)$), and Pe/Pw was constant at 0.5.

For the 6-times linear velocity (4.8 m/s) through 12-times linear velocity (14.4 m/s), a good jitter was obtained. For the recording power such that the jitter was minimal, the modulation was in a range of from 0.6 to 0.8, $R_{top}$ was approximately 17%, and the asymmetry was within a range of ±10%.

Embodiment 11

In the foregoing basic example, the disc was manufactured in the following manner, and recording on the disc was carried out:

On the substrate same as above, a lower protective layer of $(ZnS)_{80}(SiO_2)_{20}$, a recording layer of $In_3Ge_5Sb_{72}Te_{20}$, an upper protective layer of $(ZnS)_{80}(SiO_2)_{20}$, a reflective layer of an $Al_{99.5}Ta_{0.5}$, and a UV-curable resin layer were deposited 97 nm, 15 nm, 38 nm, 250 nm and approximately 4 μm, respectively in film thickness in this sequence. Thus a rewritable compact disc (CD-RW) was obtained. The volume resistivity $\rho_v$ and the sheet resistivity $\rho_s$ of the $Al_{99.5}Ta_{0.5}$ reflective layer were 100 nΩ·m and 0.4 Ω/□ (quadrature), respectively.

Laser light, having a wavelength of approximately 830 nm and focused so as to be approximately 100 μm in long axis (radial direction) and approximately 1.3 μm in short axis (circumferential direction) the amorphous recording layer, irradiated the recording layer to crystallize its entire surface, thus initializing the recording layer in unrecorded state. With the disc being rotated so as to be scanned by the focused light beam at 2.5 m/s, the focused light beam was moved radially by approximately 50 mm for every rotation of the disc, and 700-900 mW powder continuously irradiated the recording layer. This is, irradiation was made twice on the same area. By this initializing crystallization, the reflectivity of the recording layer in unrecorded state became almost the same as that of the recording layer in erased state during recording by overwriting described later.

The following evaluation of this embodiment was made using the tester 2 having an optical system with NA=0.5.

The data reference clock period, which was 231 nsec at the 1-times velocity, was varied in inverse proportion to the individual linear velocity.

Figure 20:
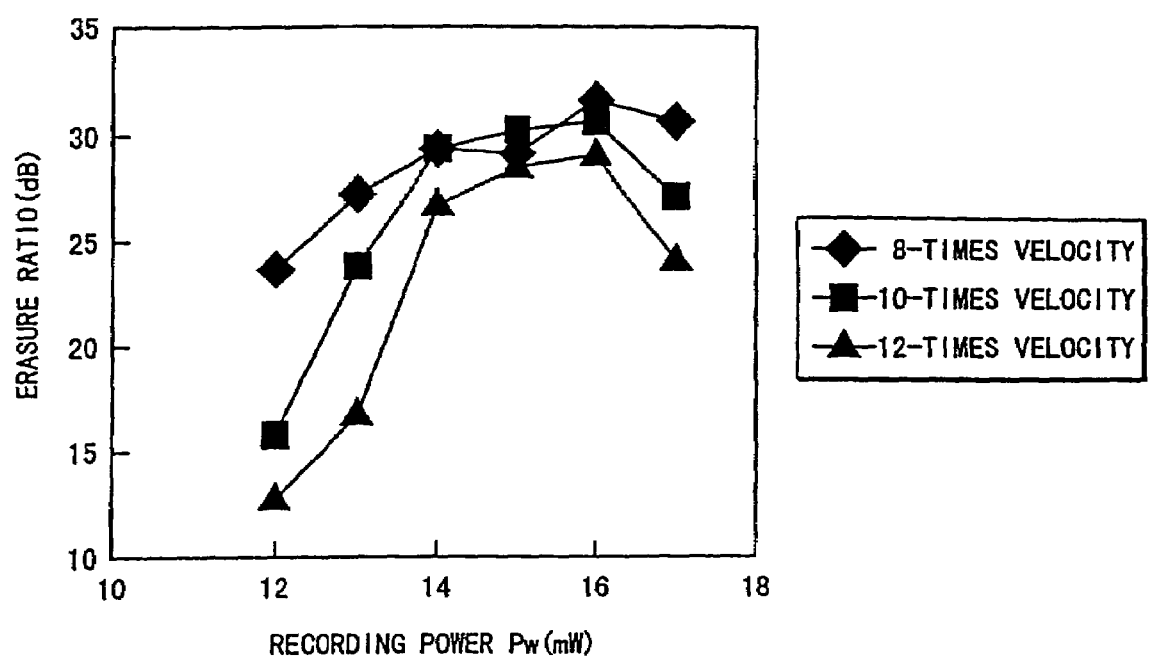
FIG. 20 is a graph showing the dependency of overwrite erase ratio on Pw.

First of all, a 3T pattern was recorded on the unrecorded area by overwriting 9 times, and then an 11T pattern was overwritten, whereupon the 3T/11T overwriting erase ratio was measured. The dependence of the overwriting erase ratio was evaluated when Pw was varied with Pe/Pw kept constant at 0.5; the result of this evaluation is shown in FIG. 20. Retrieving was made at the 1-times velocity. As shown in FIG. 20, since the overwriting erase ratio of 25 dB or more was retained for up to the 12-times velocity in particular, the disc can be used for up to 12-times velocity. For up to the 10-times velocity, especially for the 10-times velocity, the erasure power range was widen.

Noting from FIG. 20 that when Pw is 14-18 mW, Pe/Pw=0.5, the overwriting erase ratio of 25 db or move can be obtained, the present inventors considered the following recording pulse strategy then with Pw=15 mW and Pe/Pw=0.5.

The present inventors discovered the optimum divided recording pulse method, for every linear velocity, such that: m=n−1, $\alpha_1$=1, and $\alpha_i+\beta_{i-1}$=1 (2≦i≦m), all were fixed; $\alpha_i$ (2≦i≦m, kept constant) and bm were variable; the worse value (3T jitter) of the 3T mark and the inter-mark (space) jitter were substantially minimal; the modulation was 0.6 or more; and the asymmetry was within ±10%.

Figure 21A:
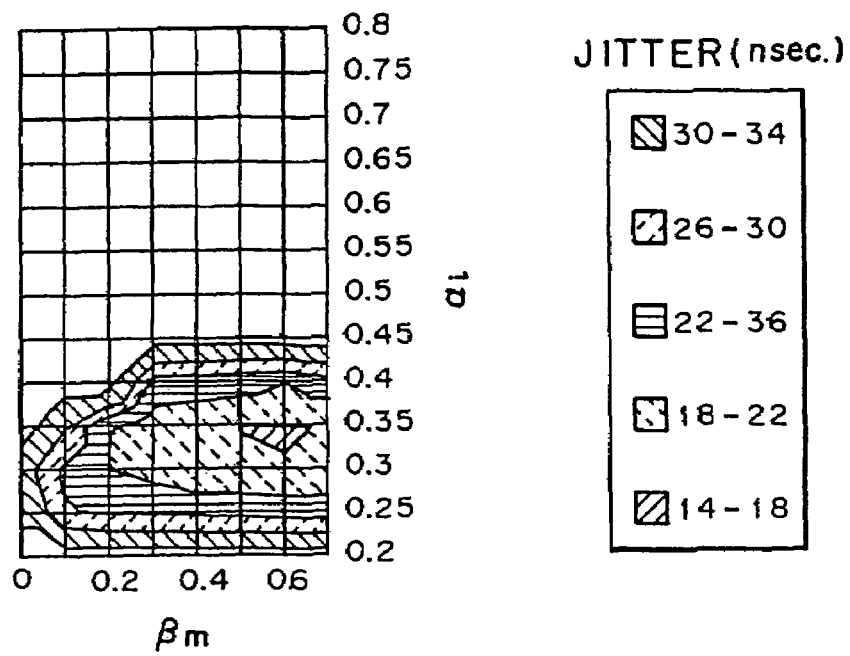
FIGS. 21, (a) and (b), is a pair of graphs showing overwriting durability according to Embodiment 11.
Figure 21B:
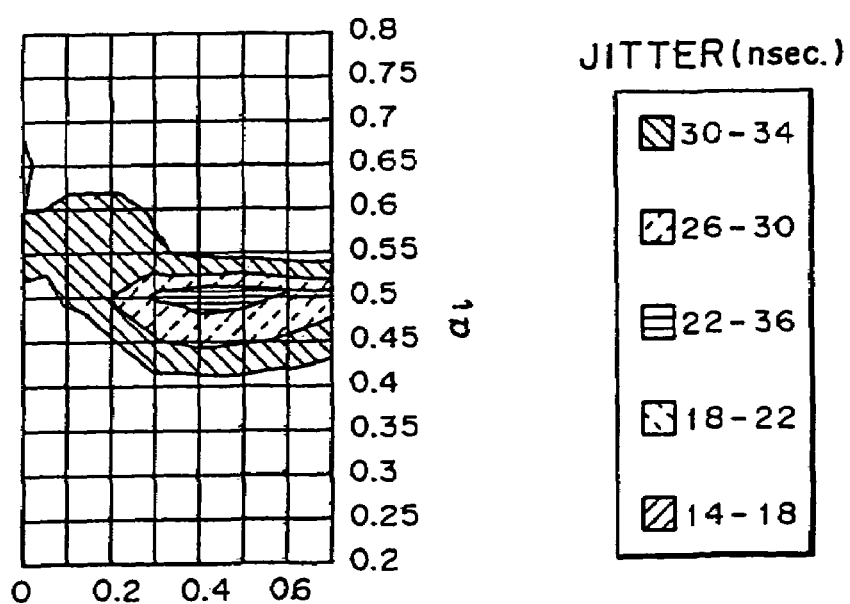

FIG. 21 shows a contour map (equi-level lines) of dependence of 3T jitter on $\alpha_i$ and $\beta_m$ at the 4- and 10-times velocities. Jitter values were actually measured at the grid points and were automatically interpolated using EXCEL 97, software of Microsoft. This measurement was made after an EFM random pattern had been overwritten 10 times, with taking the erasing performance into consideration. Retrieving was made at the 1-times velocity.

For the 10-times velocity, the minimum value of jitter was obtained when $\alpha_i$=around 0.5 and $\beta_m$=from 0.3 to 0.6. And for the 4-times velocity, the minimum value of jitter was obtained when $\alpha_i$=from 0.3 to 0.35 and $\beta_m$=from 0.5 to 0.6.

Then with Pe/Pw and Pw being varied instead of Pe/Pw=0.5, variation of 3T jitter was observed in the following conditions: for the 4-times velocity, $\alpha_1$=1, $\alpha_i$=0.3, $\beta_m$=0.5, and for the 10-times velocity, $\alpha_1$=1, $\alpha_i$=0.5, $\beta_m$=0.3, all constant. The result is shown in FIG. 22.

Figure 22A:
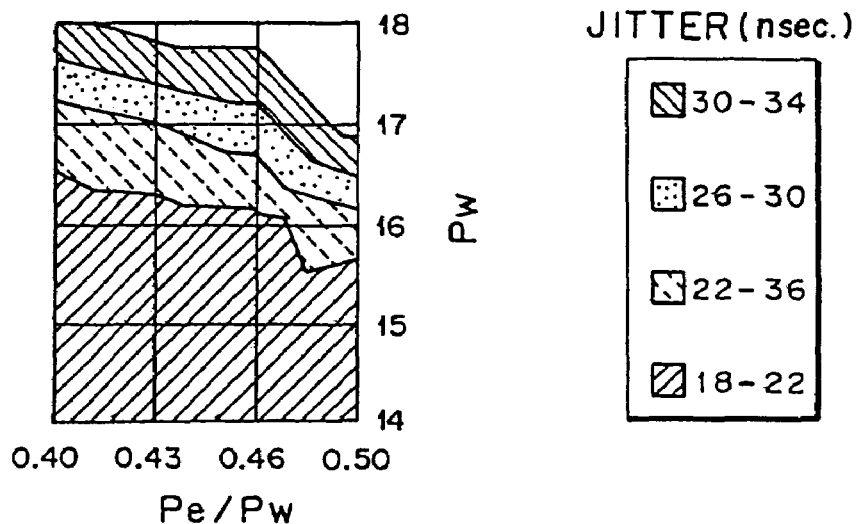
FIGS. 22, (a) and (b), is a pair of graphs showing overwriting durability in an alternative according to Embodiment 11.
Figure 22B:
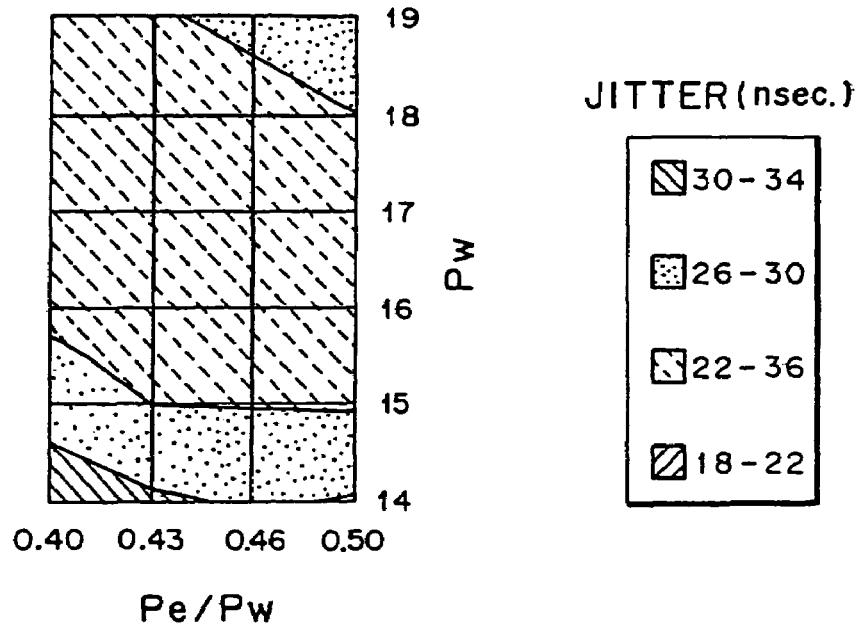

It turns out from FIG. 22 that the Pe/Pw ratio should be smaller than 0.5 for either of the 4- and 10-times velocities and preferably Pe/Pw=0.4-0.5 can allow a wide Pw range. Though it is not illustrated in FIG. 22, when Pe/Pw was larger than 0.6, the jitter values were wholly large; particularly toward the high values of Pw, the characteristics were drastically deteriorated. Consequently Pe/Pw=0.43 was selected so that a wide recording power range could be obtained for either of the 4- and 10-times velocities.

Further, as the recording power, 17 mW was selected for every velocity.

Figure 23A:
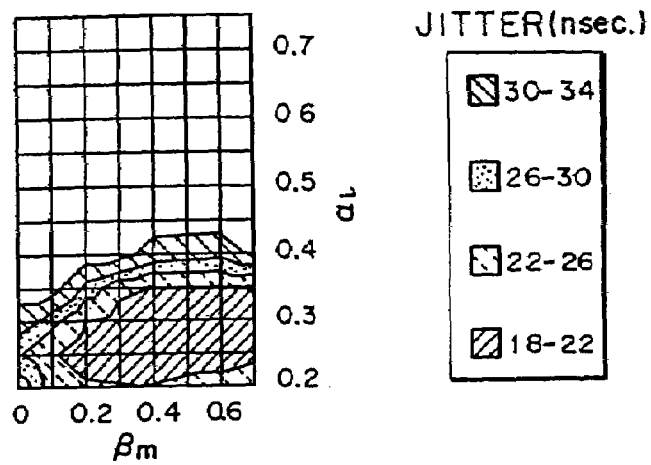
FIGS. 23, (a), (b) and (c), is a set of graphs showing overwriting durability in another alternative according to Embodiment 11.
Figure 23B:
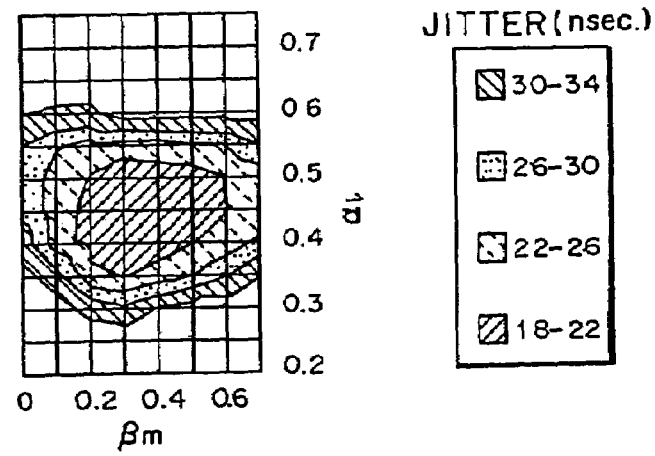
Figure 23C:
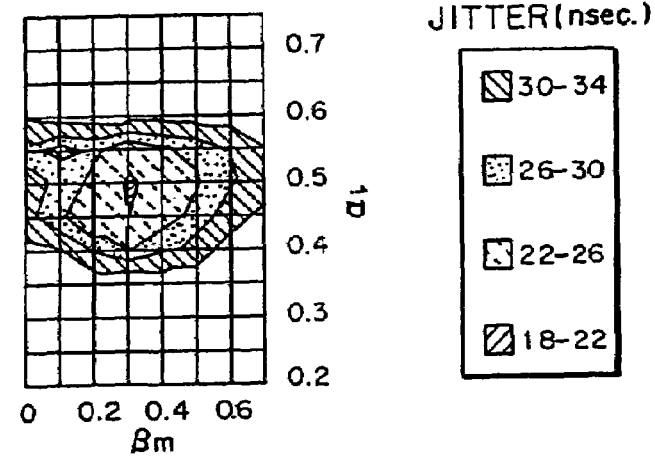

Under this condition, dependence of jitter on $\alpha_i$ and $\beta_m$ for the 4-, 8- and 10-times velocities was measured once more; the result of this measurement is shown in FIG. 23, where retrieving was done at 1-times velocity. The optimum range of $\alpha_i$ and $\beta_m$ for the 4- and 10-times velocities was substantially the same as in FIG. 21, particularly for the 10-times velocity the jitter decreased so that a wider range was obtained as $\alpha_i$ was varied. For the 8-times velocity, the minimum value of jitter was obtained when $\alpha_i$=from 0.4 to 0.5 and $\beta_m$=from 0.2 to 0.5.

For the 6-times velocity, the same result was obtained. It turns out from these results that according to the medium of this embodiment, when $\alpha_1$=1 was constant, $\alpha_i$ and bm were optimized within a range of 0.25 around a reference value of 0.5 for each velocity, thus obtaining an optimum recording pulse strategy for each velocity. It also turns out that when $\alpha_i$ is constant, a pulse strategy such as to decrease $\alpha_i$ further for the lower linear velocity should preferably be used, and $\beta_m$ should be constant at roughly 0.3 or should increase further for the lower linear velocity.

To this end, the overwriting characteristics of the EFM random pattern was evaluated when $\alpha_1$=1, $\alpha_i$=0.25 (2≦i≦m), $\beta_m$=0.5 for the 4-times velocity, $\alpha_1$=1, $\alpha_i$=0.4, $\beta_m$=0.3 for the 8-times velocity, $\alpha_1$=1, $\alpha_i$=0.5 (2≦i≦m), $\beta_m$=0.3 for the 10-times velocity, Pw=17 mW, Pe/Pw=0.43 for every linear velocity. As a result, 3T jitter of 35 nsec or less, $R_{top}$=from 16 to 18%, modulation m11=roughly 0.7, and asymmetry of from 0 to 10% were obtained for every linear velocity. The quality of this signal was such a level that the signal could be retrieved at a low error rate by a retrieving system read-compatible with the existing CD-RW.

It was demonstrated that such recording pulse strategy could be realized with ease by a recording pulse generator circuit designed based on the current specifications. Thus with the existing technology, this recording pulse strategy is suitable for recording at the 4-, 6-, 8- and 10-times velocity in CLV method.

Figure 24A:
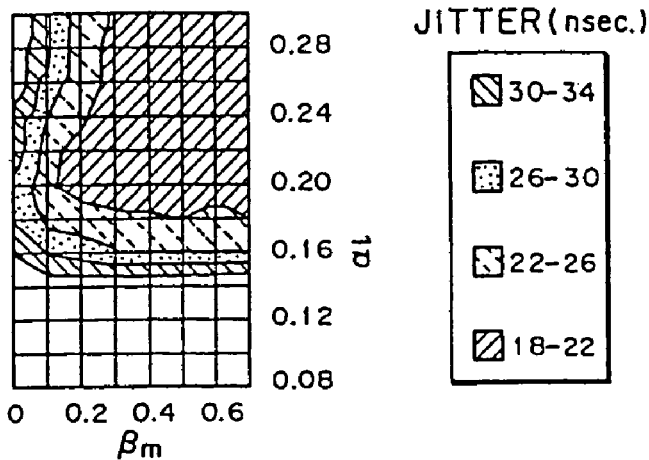
FIGS. 24, (a), (b) and (c), is a set of graphs showing overwriting durability in still another alternative according to Embodiment 11.
Figure 24B:
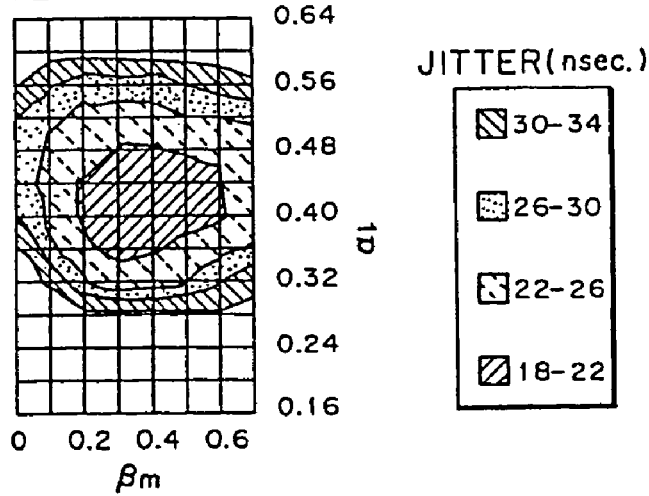
Figure 24C:
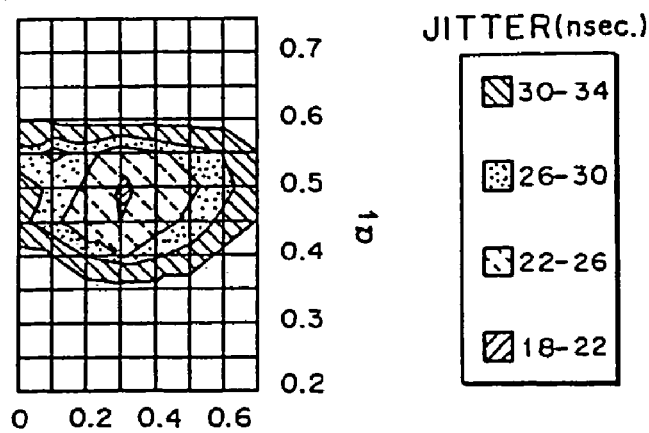

On the other hand, when $\alpha_1$=1 at the 10-times velocity, namely, when $\alpha_1$T=23.1 ns and $\alpha_1$ was varied such that this time length would become constant at each velocity, $\alpha_1$=0.4 at the 4-times velocity and $\alpha_1$=0.8 at the 8-times velocity. FIG. 24 shows the dependence of 3T jitter on $\alpha_I$ (2≦i≦m) and $\beta_m$ when $\alpha_1$=1 at the 10-times velocity and $\alpha_1$=0.4 at the 8-times velocity, where retrieving was done at 1-times velocity. Here Pe/Pw=0.43 and Pw=17 mW for each of the 4-, 8- and 10-times velocities. For the 10-times velocity, the condition was the same as in FIG. 21. Namely, at the 10-times velocity, $\alpha_i$=from 0.45 to 0.55 and $\beta_m$=roughly 0.3, and the jitter was minimal likewise in FIG. 21. Here $\alpha_i$=from 0.35 to 0.45 and $\beta_m$=from 0.3 to 0.5 at the 8-times velocity, and $\alpha_i$=0.2 or more (up to 0.3 as actually measured) and $\beta_m$=approximately 0.3 or more (up to 0.65 as actually measured) at the 4-times velocity, and the jitter was minimal was obtained.

Assuming that, for each of the 4-, 8- and 10-times velocities, with $\alpha_i$T=23.1 nsec and $\alpha_i$T=11.6 nsec (2≦i≦m), both kept constant, $\beta_m$=0.3 is constant or $\beta_m$ is increased stepwise for the lower linear velocities, namely, $\beta_m$=0.5 at the 4-times velocity, $\beta_m$=0.35 at the 8-times velocity and $\beta_m$=0.3 at the 10-times velocity, it is possible to make good overwriting in the range of from the 4- to 10-times velocities.

Thus the medium of this embodiment enables a wide variety of applications that can cope with any of the recording pulse strategies of CAV method proposed by the present invention.

With reference to the result of FIG. 24, the following description focues on the recording pulse strategies suitable to CAV method in which $a_i$T=23.1 nsec and aiT=11.6 nsec are constant.

Further, the disc was rotated at approximately 2,000 r.p.m. in CAV mode in a way that the velocity in the position of the radius 23 mm would be just the 4-times velocity. The outermost track of the recording area was approximately 58 mm in radius where the linear velocity was approximately the 10-times velocity.

While the linear velocity and data reference clock period on the individual radius were varied as shown in Table-6, a CD-read-compatible signal was recorded in CAV mode. m=n−1, Pw=17 mW, Pe/Pw=0.43, $\alpha_i$T=23.1 nsec, $\alpha_i$T=11.6 nsec (2≦i≦m, all constant) were constant on every radius. Only bm was varied commensurate with the linear velocity. Namely, bm=0.3 on the outermost track at the 10-times velocity, bm=0.5 on the innermost track at the 4-times velocity, and the intermediate values were univocally interpolated on the intermediate track (linear velocity).

Likewise the recording pulse strategy for each radius was shown in Table-6 in terms of a ratio value, i.e. $\alpha_1$, $\alpha_i$, $\beta_m$, with respect to the (data reference) clock period T.

Table-6 additionally shows 3T jitter, modulation and asymmetry during retrieving of the recorded EFM random signal at the 1-times velocity. The reflectivity $R_{top}$ was constant at roughly 18% for every radius. And deviations in mark length of each mark and in inter-mark length were less than ±40 nsec, which was good result. The push-pull signal and wobble signal were determined by the groove geometry in the substrate and were obtained as the same values as the existing CD-RW.

Several discs with the same composition and thicknesses and then the same overwriting characteristics as embodiment 11 were prepared and various initializing conditions for each disc was applied.

Focused laser light with long-axis (along radial direction) of approximately 100 µm, short-axis (along circumferential direction) of approximately 1.3 µm irradiated and initialized the recording layer through substrate, by changing scanning speed of laser beam to the disc from 2, 2.5, 3, 7 10 m/s for each disc. Laser beam was moved along radial direction approximately 50 µm per one revolution. Initializing laser power was chosen between 500-1,500 mW so that melt-erasing initialization could be realized at each speed and the value of above-mentioned formula (F1) was below 10%. The discs initialized at 10 m/s showed significant low reflectivity of R2, in which the recording layer was partially amorphized after melting.

TABLE 6

| Radius (mm) | m/s | Velocity | Clock Period (ns) | $\alpha_1$ | $\alpha_i$ | $\beta_m$ | 3T space jetter (ns) | Modulation | Asymmetry |
|---|---|---|---|---|---|---|---|---|---|
| 22.5 | 4.8 | 4 | 57.8 | 0.40 | 0.20 | 0.50 | 20.4 | 0.680 | 0.027 |
| 25.3 | 5.4 | 4.5 | 51.3 | 0.45 | 0.23 | 0.48 | 20.3 | 0.678 | 0.015 |
| 28.1 | 6 | 5 | 46.2 | 0.50 | 0.25 | 0.47 | 19.8 | 0.668 | 0.000 |
| 30.9 | 6.6 | 5.5 | 42 | 0.55 | 0.28 | 0.45 | 19 | 0.669 | −0.010 |
| 33.8 | 7.2 | 6 | 38.5 | 0.60 | 0.30 | 0.43 | 18.7 | 0.671 | −0.018 |
| 36.6 | 7.8 | 6.5 | 35.5 | 0.65 | 0.33 | 0.42 | 18.3 | 0.662 | −0.024 |
| 39.4 | 8.4 | 7 | 33 | 0.70 | 0.35 | 0.40 | 18.4 | 0.660 | −0.035 |
| 42.2 | 9 | 7.5 | 30.8 | 0.75 | 0.38 | 0.38 | 17.9 | 0.655 | −0.049 |
| 45.0 | 9.6 | 8 | 28.9 | 0.80 | 0.40 | 0.37 | 18.3 | 0.653 | −0.056 |
| 47.8 | 10.2 | 8.5 | 27.2 | 0.85 | 0.43 | 0.35 | 19.2 | 0.654 | −0.070 |
| 50.6 | 10.8 | 9 | 25.7 | 0.90 | 0.45 | 0.33 | 20.1 | 0.647 | −0.075 |
| 53.4 | 11.4 | 9.5 | 24.3 | 0.95 | 0.48 | 0.32 | 21.7 | 0.636 | −0.083 |
| 56.3 | 12 | 10 | 23.1 | 1.00 | 0.50 | 0.30 | 22.9 | 0.628 | −0.096 |

As is understood from Table-6, an extremely simple recording pulse strategy could cover a wide range of linear velocities so that recording by CAV method to meet approximately 4-times velocity on the innermost track was realized. If access was made to an address on a different radius, without changing r.p.m. or by adjusting only the clock period bm of the recording pulse strategy, it is possible to make recording with the recording power kept constant, improving the access performance remarkably.

Even if bm=0.3 is constant, the degree of deterioration of the jitter at the 4- through 6-times velocities is at most 2-3 nsec, so recording by CAV method is possible.

On the medium of this embodiment, an EFM random pattern was recorded by the recording method suitable to the above-mentioned CAV at the 4- and 10-times velocities, after which the medium was placed in an environment of 80° C./85% for 500 hours, whereupon the recorded signal was measured once again; as a result, substantially no variation was found in jitter, deviation, $R_{top}$, and modulation. The modulation in particular remained 90% or more of the initial value.

Further, for the 4- and 10-times velocities, using the tester 2 and employing the recording pulse strategies shown in Table-5 at the respective linear velocities, under Pw=18 mW, Pe/Pw=0.5, Pb=0.8 mW, overwriting was repeatedly carried out. After overwriting 1,000 times, the 3T space jitter during retrieving at the 1-times velocity was less than 35 nsec, showing good repeat overwriting durability.

For the other discs, EFM random pattern was initially recorded, and one time overwriting and 10 times overwritten at 10 m/s using tester 2 and the same recording condition as the case of 56.3 mm in Table-6.

For all scanning speed between 2-7 m/s, 3T space jitter at initial recording and after 10 times overwriting were 18-22 nsec and 20-25 nsec, respectively, where no significant dependency on the scanning speed in initialization was observed.

In contract, 3T space jitter at 1st (one time) overwriting for the discs initialized at 2 m/s, 2.5 m/s, 3 m/s, and 7 m/s was 45 nsec, 33 nsec, 28 nsec, and 23 nsec, respectively. The jitter increased after 1st overwriting was through to be due to a difference in crystalline structure, size, and/or orientation between initialized and erased states, and after 10 times overwriting, almost all portions become erased state so that the jitter could be reduced. From this viewpoint, scanning speed at initialization is preferably 2-7 m/s.

Embodiment 12

On the medium of Embodiment 11, overwriting was tried at the 1-times velocity (1.2 m/s, T=231 ns) and the 2-times velocity (2.4 m/s, T=116 nsec) with $\alpha_1$T=23.1 nsec and $\alpha_i$T=11.6 nsec (2≦i≦m−1) being kept the same in figures as in Table-6. Pw=17 mW and Pe/Pw=0.43 mW were the same in figures as in Table-6 for either linear velocity. Further, studies were made also when $\alpha_1$=1 was fixed and $\alpha_i$ (2≦i≦g m) and $\beta_m$ were optimized for the individual linear velocities.

At that time, the r.p.m. of the disc was adjusted in the recording radial position of approximately 40 mm in a way that the linear velocity became the 1- and 2-times velocities in the above-mentioned radial position. The values of 3T jitter, $\beta_m$, modulation and asymmetry, when retrieving was carried out at the 1-times velocity, are shown in Table-7, likewise in Table-6.

In each method, when $\beta_m$ was adjusted, good overwriting was possible.

TABLE 7

| m/s | velocity | clock period (ns) | $\alpha_1$ | $\alpha_i$ | $\beta_m$ | 3T space jitter (ns) | Modulation | Asymmetry |
|---|---|---|---|---|---|---|---|---|
| 1.2 | 1 | 231 | 0.10 | 0.05 | 1.2 | 20.8 | 0.70 | −0.005 |
| 1.2 | 1 | 231 | 1 | 0.1 | 2 | 23.0 | 0.70 | 0.033 |
| 2.4 | 2 | 116 | 0.20 | 0.10 | 1 | 19.8 | 0.70 | −0.026 |
| 2.4 | 2 | 116 | 1 | 0.15 | 1 | 22.0 | 0.66 | −0.036 |

Further, on the medium of Embodiment 11, using the tester 2, overwriting was carried out at the 12-times velocity (14.4 m/s, T=19.3 nsec). Employing the recording pulse strategies that m=n−1, $\alpha_1$=0.5, $\beta_m$=0.3, $\alpha_i+\beta_{i-1}$=1 (2≦i≦m), Pw=18 mW, Pe/Pw=0.4, overwriting was carried out 10 times, whereupon retrieving was made at the 1-times velocity.

When 3T space jitter was 29.3 nsec, 11T space jitter was 31.8 nsec, modulation was 0.61, and asymmetry was 0.093, good overwriting was possible.

Figure 33:
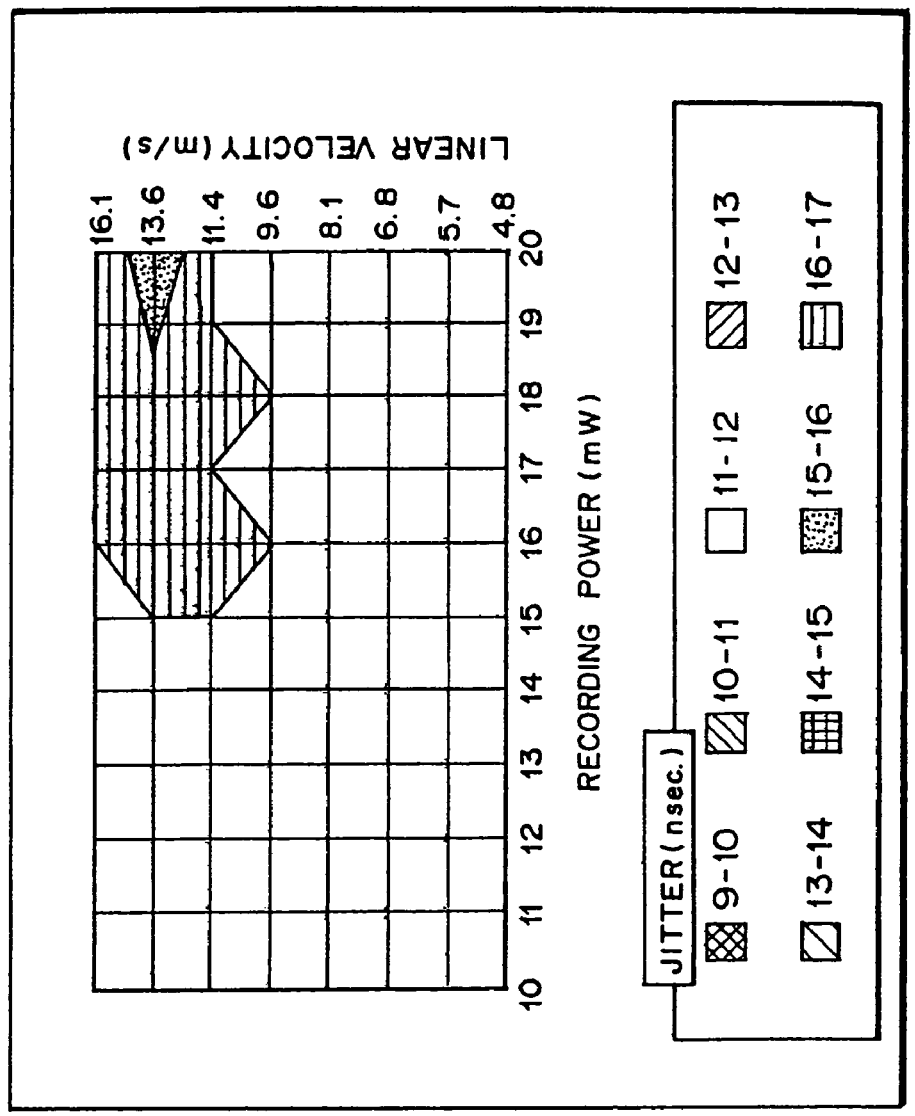
FIG. 33 is a graph showing an overwriting characteristic according to Comparative Example 6.

In the above-mentioned embodiments, the disc was manufactured in the following manner, and recording on the disc was carried but:

On the substrate same as above, a lower protective layer of $(ZnS)_{80}(SiO_2)_{20}$, a recording layer of In3Ge5Sb72Te20, an upper protective layer of $(ZnS)_{80}(Si_2)_{20}$, a reflective layer of an $Al_{97.5}Ta_{2.5}$ (volume resistivity: 270 nΩ·m and sheet resistivity: 1.1 Ω/□) and a UV-curable resin layer were deposited 97 nm, 20 nm, 40 nm, 250 nm and approximately 4 mm, respectively in film thickness in this sequence. Thus a rewritable compact disc (CD-RW) was obtained. The overwriting characteristics was evaluated in the same manner as in Embodiment 2. FIG. 33 shows the result of this evaluation.

As shown in FIG. 33, the areas of above-mentioned CD-RW where the jitter is 17 nsec or less is extremely narrow and the areas cannot cover the wide range of 4- through 8-times velocities.

According to the present invention, it is possible to realize high-speed recording at the 8-times or faster velocity with retaining a read-compatibility with the conventional CD-RW specifications at least the 4-times velocity. Further, it is possible to increase the recording speed and data transfer rate of CD-RW so that a wide variety of CD-RW applications can be guaranteed as bulk data recording such as music and video and an external storage device of computer.

Also according to the present invention, it is possible to make CAV-mode recording on CD-RW that has hitherto been recordable only in CLV mode, reducing power consumption of the drive remarkably and improving the access and seek performance of CD-RW medium by a considerable degree. In addition, since random access packet recording can be performed efficiently, it is possible to far increase the performance of the medium as an external storage device of computer.

What is claimed is:

1. A method of recording various mark and inter-mark lengths in terms of EFM-modulated information on a rewritable disc-shaped optical recording medium comprising a substrate having a wobble groove, and a phase-change recording layer, wherein a crystal state of the recording layer is an unrecorded or erased state and an amorphous state of the recording layer is a recorded state, and amorphous marks corresponding to the recorded state are formed by recording light, wherein the phase-change recording layer comprises an alloy composition containing an excessive amount of Sb as compared to a eutectic composition of SbTe, and Sb/Te ratio of the eutectic composition of SbTe is from 2.6 to 3.6, allowing recording of an EFM-modulated signal by an overwriting operation in the recording layer at up to 12-times velocity V without loss of read compatibility of the rewritable compact disc medium, wherein a modulation $m_{11}$ of a retrieving waveform of the EFM-modulated signal (eye pattern) of the recorded signal obtained as retrieved at the 1-times velocity is 60-80%, a topmost level $R_{top}$ of reflectivity corresponding to a maximum value $I_{top}$ of the eye pattern obtained as retrieved at the 1-times velocity is 15-25%, and a jitter of the individual length of amorphous marks and inter-marks obtained as retrieved at the 1-times velocity are equal to or less than 35 ns, said rewritable optical recording medium having a predetermined recording area by CAV (constant angular velocity) operation, in which the recording medium is rotated at a constant angular velocity, said method being carried out in the following manner:

when a linear velocity within a range of from 1.2 m/s to 1.4 m/s is a reference velocity (1-times velocity), the disc-shaped optical recording medium is rotated in a way that a linear velocity at an outermost periphery of the recording area is as high as 10 times of the reference velocity, if a time length of an individual recorded mark is nT (T is a data reference clock period varying according to its radial position in a way that a product VT (V is a linear velocity in the radial position) is constant, and n is an integer within a range of from 3 to 11), recording light of erasure power Pe, which is able to crystallize an amorphous-state portion, irradiates inter-mark portions, for the recorded marks, the time length (n−j)T is divided into $\alpha_1 T, \beta_1 T, \alpha_2 T, \beta_2 T, \ldots, \alpha_m T, \beta_m T$ (where m=n−1, $\alpha_1$=from 0.75 to 1.25, $\alpha_i$=from 0.25 to 0.75 (2≦i≦m), $\alpha_i+\beta_{i-1}$=from 1 to 1.5 (3≦i≦m)) in this sequence so as to satisfy $\Sigma_i(\alpha_i+\beta_i)$=n−j (j is a real number within a range of 0.0≦j≦2.0), within the time length $\alpha_i T$ (1≦i≦m), the recording light, whose record power Pw (Pw>Pe) is enough to melt said recording layer, irradiates the recording layer, and within the time length $\beta_i T$ (1≦i≦m), the recording light of bias power Pb (0≦Pb≦0.5Pe) irradiates the recording layer, and each of $\alpha_i$ and $\alpha_i+\beta_{i-1}$ (i=from 3 to m) is constant for any radial position, and $\alpha_i$ (i=from 3 to m) is reduced monotonically for the radially inner position.

2. A recording method according to claim 1, wherein said recording area is divided into a plurality of virtual zones for every radial position, $\beta_m$=from 0 to 1.5, and $\beta_m$ is monotonically increased for the radially inner zone.

3. A recording method according to claim 1, wherein said rewritable disc-shaped optical recording medium is a rewritable compact disc (CD-RW) in which at least an radius ranging from 23 to 58 mm is defined as said recording area.

4. A recording method according to claim 1, wherein each of $\alpha_i T$ (1≦i≦m) and $\beta_i T$ (1≦i≦m) is 10 ns or more for any radial position.

5. A recording method according to claim 1, wherein for any linear velocity in use, a value of each of Pb, Pw, and Pe/Pw is substantially constant.

6. A recording method according to claim 1, wherein said rewritable disc-shaped optical recording medium has on a substrate a wobble groove having a wobble signal whose frequency is modulated by ±1 kHz according to ATIP (absolute time in pre-groove) information with a carrier frequency of approximately 22.05 kHz in terms of the frequency at the 1-times velocity, said carrier frequency is detected while said rewritable disc-shaped optical recording medium is rotated at a constant angular velocity, and a data reference clock according to a disc radius is obtained by multiplying the detected frequency with 196, and an ATIP (absolute time in pre-groove) signal, which is the ATIP information, is detected, and a data reference clock, which is in synchronism with a synchronization pattern in the detected ATIP signal and a disc rotation, is obtained.

7. A recording method according claim 1, wherein said rewritable disc-shaped optical recording medium has on a substrate a wobble groove that has a wobble signal, whose frequency is modulated by ±1 kHz according to ATIP information with a carrier frequency of approximately 22.05 kHz in terms of the frequency at the 1-times velocity, and also clock marks arranged along the groove at a repeating frequency in a range of from 2 to 8 times of 22.05 kHz, and the individual clock mark is detected while said rewritable disc-shaped optical recording medium is rotated at a constant angular velocity, and a data reference clock is obtained by multiplying said repeating frequency of the clock mark with a predetermined multiplier.

8. A recording method according to claim 1, wherein said wobble groove has a wobble signal, whose carrier frequency is constant when the linear velocity is constant, and also has address information and a synchronization pattern in terms of whether the wobble is modulated in phase or whether a specified position is devoid of wobble, and said carrier frequency is detected while said rewritable disc-shaped optical recording medium is rotated at a constant angular velocity, and a data reference clock is obtained by multiplying the detected frequency with a predetermined multiplier.

9. A recording method according to claim 1, wherein said rewritable disc-shaped optical recording medium has absolute time information in terms of a sub-code Q channel signal recorded previously in the entire recording area as an EFM-modulated signal, and said EFM-modulated signal is detected while said rewritable disc-shaped optical recording medium is rotated at a constant angular velocity, and a data reference lock and address information are obtained from said EFM-modulated signal.

10. A recording method according to claim 1, wherein said rewritable disc-shaped optical recording medium has a block data structure according to CD-ROM specifications recorded previously in the entire recording area as EFM-modulated signal, and said EFM-modulated signal is detected while said rewritable disc-shaped optical recording medium is rotated at a constant angular velocity, and a data reference clock and address information are obtained from the detected EFM-modulated signal.

11. A recording/retrieving method of a rewritable optical medium according to claim 1, wherein in recording/retrieving of said rewritable optical recording medium, recording and retrieving to and from an information area are made at the same angular velocity.

* * * * *